United States Patent
Orio et al.

(10) Patent No.: US 9,747,665 B2
(45) Date of Patent: Aug. 29, 2017

(54) DEVICE AND METHOD FOR DIVISIONAL IMAGE SCALING

(71) Applicant: Synaptics Japan GK, Tokyo (JP)

(72) Inventors: Masao Orio, Tokyo (JP); Hirobumi Furihata, Tokyo (JP); Takashi Nose, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 46 days.

(21) Appl. No.: 14/835,467

(22) Filed: Aug. 25, 2015

(65) Prior Publication Data
US 2016/0225124 A1    Aug. 4, 2016

(30) Foreign Application Priority Data
Feb. 4, 2015  (JP) ................. 2015-020654

(51) Int. Cl.
*G09G 5/02* (2006.01)
*G06T 3/40* (2006.01)
*G09G 3/20* (2006.01)
*G09G 3/36* (2006.01)

(52) U.S. Cl.
CPC ............ *G06T 3/40* (2013.01); *G09G 3/20* (2013.01); *G09G 3/3696* (2013.01); *G09G 5/026* (2013.01); *G09G 2300/0426* (2013.01); *G09G 2310/027* (2013.01); *G09G 2310/0267* (2013.01); *G09G 2310/0297* (2013.01); *G09G 2340/0457* (2013.01); *G09G 2360/18* (2013.01)

(58) Field of Classification Search
CPC ..................................... G06T 3/40
USPC ......................................... 345/660
See application file for complete search history.

(56) References Cited

U.S. PATENT DOCUMENTS 5,029,017 A * 7/1991 Abe ............... H04N 1/3935
                                                  358/448
5,335,296 A * 8/1994 Larkin ............ G06F 15/7864
                                                  345/663

(Continued)

FOREIGN PATENT DOCUMENTS

JP    2005164347 A    6/2005
JP    2007193508 A    8/2007

(Continued)

*Primary Examiner* — Javid A Amini
(74) *Attorney, Agent, or Firm* — Patterson + Sheridan, LLP

(57) ABSTRACT

A display panel driver includes first and second scaler circuits and a pixel data feeding section which feeds to the first scaler circuit first divisional image pixel data corresponding to a first divisional image and feeds to the second scaler circuit second divisional image pixel data corresponding to a second divisional image. The pixel data feeding section also feeds to the first scaler circuit first boundary pixel data corresponding to pixels in a portion of the second divisional image, adjacent to the first divisional image and feeds to the second scaler circuit second boundary pixel data corresponding to pixels in a portion of the first divisional image, adjacent to the second divisional image. The first scaler circuit performs image scaling on the basis of the first divisional image pixel data and the first boundary pixel data and the second scaler circuit performs image scaling on the basis of the second divisional pixel image data and the second boundary pixel data.

14 Claims, 40 Drawing Sheets

(56) References Cited

U.S. PATENT DOCUMENTS

| | | | | |
|---|---|---|---|---|
| 6,002,810 A * | 12/1999 | Wakisawa | G06T 3/4007 | 345/660 |
| 6,219,465 B1 * | 4/2001 | Nacman | H04N 1/3935 | 348/581 |
| 7,268,903 B2 * | 9/2007 | Kojima | G06T 9/005 | 358/1.15 |
| 8,233,012 B2 * | 7/2012 | Mochizuki | G06T 3/4023 | 345/419 |
| 8,305,366 B2 * | 11/2012 | Huang | G09G 3/3611 | 345/204 |
| 8,872,856 B1 * | 10/2014 | Masterson | G09G 5/393 | 345/660 |
| 9,323,037 B2 * | 4/2016 | Yoshioka | G02B 21/16 | |
| 2001/0035969 A1 * | 11/2001 | Kishimoto | G06K 15/028 | 358/1.9 |
| 2003/0128374 A1 * | 7/2003 | Brothers | G06T 3/4023 | 358/1.2 |
| 2003/0174354 A1 * | 9/2003 | Oteki | H04N 1/32101 | 358/1.13 |
| 2004/0052432 A1 * | 3/2004 | Lee | G06T 3/4023 | 382/298 |
| 2004/0257623 A1 * | 12/2004 | Suzuki | H04N 1/405 | 358/3.03 |
| 2005/0063611 A1 * | 3/2005 | Toki | A61B 6/032 | 382/299 |
| 2006/0050093 A1 * | 3/2006 | Soroushi | G09G 5/391 | 345/667 |
| 2006/0126952 A1 * | 6/2006 | Suzuki | G06T 5/002 | 382/233 |
| 2006/0204139 A1 * | 9/2006 | Hayashi | G06T 3/4023 | 382/298 |
| 2007/0104394 A1 * | 5/2007 | Chou | G06T 3/4007 | 382/300 |
| 2007/0258661 A1 * | 11/2007 | Koshi | H04N 1/40068 | 382/298 |
| 2008/0272994 A1 * | 11/2008 | Chen | G09G 5/001 | 345/87 |
| 2009/0103603 A1 * | 4/2009 | Hamano | H04N 21/235 | 375/240.01 |
| 2009/0316048 A1 * | 12/2009 | Rumreich | G09G 3/007 | 348/607 |
| 2010/0054538 A1 * | 3/2010 | Boon | G06K 9/00798 | 382/104 |
| 2010/0124380 A1 * | 5/2010 | Shiraishi | H04N 1/41 | 382/239 |
| 2010/0315556 A1 * | 12/2010 | Lin | G06T 3/40 | 348/581 |
| 2011/0316972 A1 * | 12/2011 | Demas | H04N 13/0003 | 348/43 |
| 2012/0206505 A1 * | 8/2012 | Huang | G09G 3/002 | 345/690 |
| 2012/0242707 A1 * | 9/2012 | Song | G09G 5/373 | 345/667 |
| 2012/0301052 A1 * | 11/2012 | Tsukada | H04N 13/0029 | 382/284 |
| 2013/0038625 A1 * | 2/2013 | Nakajima | G06T 11/203 | 345/611 |
| 2013/0088509 A1 * | 4/2013 | Yoshimoto | G09G 3/2003 | 345/600 |
| 2013/0147805 A1 * | 6/2013 | Chang | H04N 7/0117 | 345/428 |
| 2013/0314494 A1 * | 11/2013 | Chen | G06T 7/0071 | 348/43 |
| 2014/0104283 A1 * | 4/2014 | Dyke | G06T 1/60 | 345/501 |
| 2014/0132805 A1 * | 5/2014 | Inoue | H04N 5/23296 | 348/240.99 |
| 2015/0043015 A1 * | 2/2015 | Warren | G06K 15/1856 | 358/1.2 |
| 2015/0296175 A1 * | 10/2015 | Wallace | H04N 7/0125 | 348/445 |
| 2016/0180803 A1 * | 6/2016 | Hui | G09G 5/005 | 715/744 |

FOREIGN PATENT DOCUMENTS

| | | |
|---|---|---|
| JP | 2009093442 A | 4/2009 |
| JP | 2009294273 A | 12/2009 |
| JP | 2009296410 A | 12/2009 |
| WO | 2014077024 A1 | 5/2014 |

* cited by examiner

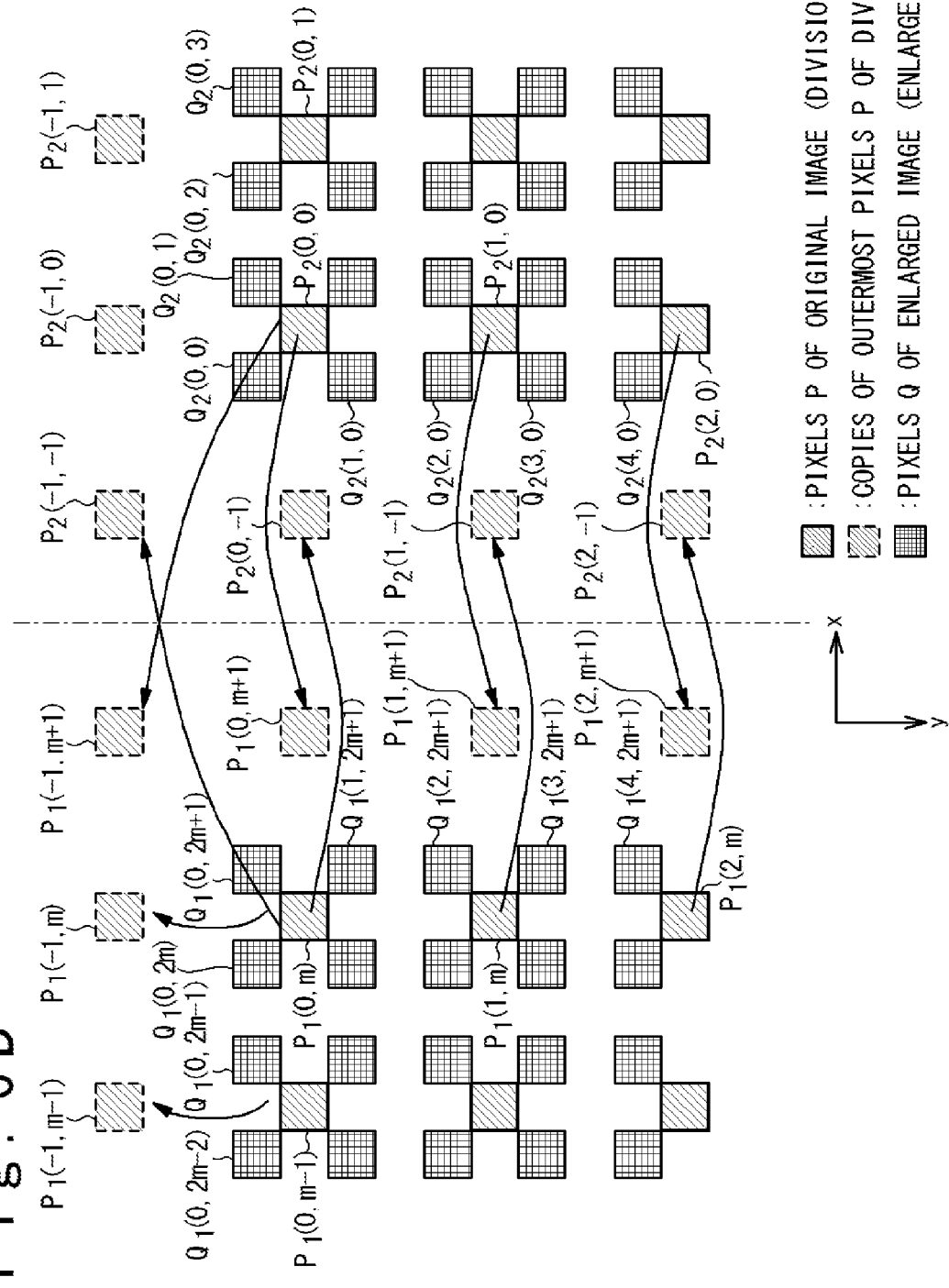

Fig. 11A

| Hsync | PixelValid | X |
|---|---|---|
| 0 | – | −1 |
| 1 | 0 | Out+1 |
| 1 | 1 | Out |

Fig. 11B

| Vsync | Hsync | Y |
|---|---|---|
| 0 | – | −1 |
| 1 | 0 | Out+1 |
| 1 | 1 | Out |

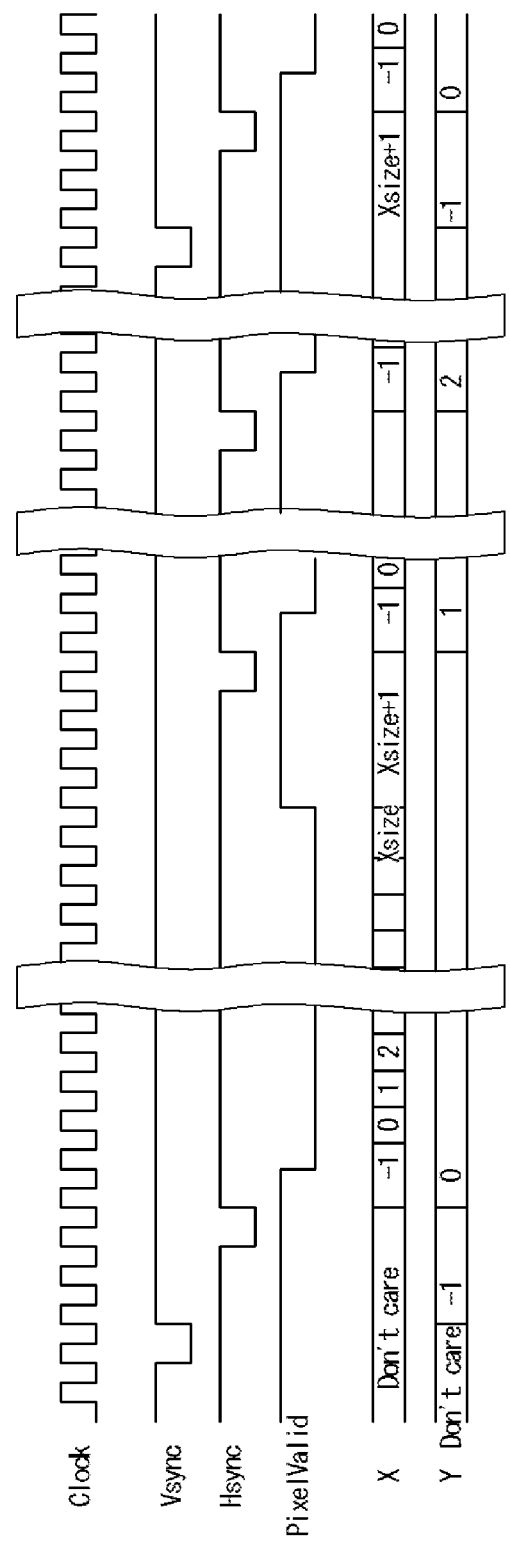

Fig. 13A

| Y | L0adr | X | L1adr | L2adr |
|---|---|---|---|---|
| Ysize-1 | L1adr+(Xsize*Y/2) | Xsize-1 | (X/2) | (X/2) |
| OTHERS | L1adr+(Xsize*(Y+1)/2) | -1 | ((Xsize-1)/2) | ((Xsize-1)/2) |
| | | OTHERS | ((X+1)/2) | ((X+1)/2) |

Fig. 13B

| Y | R0adr | X | R1adr | R2adr |
|---|---|---|---|---|
| Ysize-1 | R1adr+(Xsize*Y/2) | Xsize-1 | (X/2) | (X/2) |
| OTHERS | R1adr+(Xsize*(Y+1)/2) | -1 | ((Xsize-1)/2) | ((Xsize-1)/2) |
| | | OTHERS | ((X+1)/2) | ((X+1)/2) |

Fig. 14A

| Y | LLB0 | LLB1 | RLB0 | RLB1 |
|---|---|---|---|---|
| 0 | Write | – | Write | – |
| Y%4=1 | Read | Write | Read | Write |
| Y%4=2 | Read | – | Read | – |
| Y%4=3 | Write | Read | Write | Read |
| Y%4=0 | – | Read | – | Read |

Fig. 14B

| Y | LLB0 | LLB1 | RLB0 | RLB1 |
|---|---|---|---|---|
| 0 | Write | – | Write | – |
| ((Y-1)/2)%2=0 | Read | Write | Read | Write |
| ((Y-1)/2)%2=1 | Write | Read | Write | Read |

Fig. 16A

| XBuf | LBuf0 | LBuf1 | LP00 | LP01 | LP10 | LP11 |
|---|---|---|---|---|---|---|
| XBuf=-1 | L0 | L0 | – | – | – | – |
| XBuf=Xsize-1 | – | – | RBuf0 | LP00 | RBuf1 | LP10 |
| XBuf=0 | – | – | L0 | L0 | L0 | L0 |
| XBuf%2=1 | – | – | L0 | LP00 | L0 | LP10 |
| XBuf%2=0 | – | – | – | – | – | – |

Fig. 16B

| XBuf | RBuf0 | RBuf1 | RP00 | RP01 | RP10 | RP11 |
|---|---|---|---|---|---|---|
| XBuf=-1 | – | – | – | – | – | – |
| XBuf=0 | R0 | R0 | R0 | LBuf0 | R0 | LBuf1 |
| XBuf%2=1 | – | – | R0 | RP00 | R0 | RP10 |
| XBuf%2=0 | – | – | – | – | – | – |

Fig. 17A

| XBuf | LBuf0 | LBuf1 | LP00 | LP01 | LP10 | LP11 |
|---|---|---|---|---|---|---|
| XBuf=-1 | L1 | L0 | - | - | - | - |
| XBuf=Xsize-1 | - | - | RBuf0 | LP00 | RBuf1 | LP10 |
| XBuf=0 | - | - | L1 | L1 | L0 | L0 |
| XBuf%2=1 | - | - | L1 | LP00 | L0 | LP10 |
| XBuf%2=0 | - | - | - | - | - | - |

Fig. 17B

| XBuf | RBuf0 | RBuf1 | RP00 | RP01 | RP10 | RP11 |
|---|---|---|---|---|---|---|
| XBuf=-1 | - | - | - | - | - | - |
| XBuf=0 | R1 | R0 | R1 | LBuf0 | R0 | LBuf1 |
| XBuf%2=1 | - | - | R1 | RP00 | R0 | RP10 |
| XBuf%2=0 | - | - | - | - | - | - |

Fig. 18A

| XBuf | LBuf0 | LBuf1 | LP00 | LP01 | LP10 | LP11 |
|---|---|---|---|---|---|---|
| XBuf=-1 | L2 | L0 | - | - | - | - |
| XBuf=Xsize-1 | - | - | RBuf0 | LP00 | RBuf1 | LP10 |
| XBuf=0 | - | - | L2 | L2 | L0 | L0 |
| XBuf%2=1 | - | - | L2 | LP00 | L0 | LP10 |
| XBuf%2=0 | - | - | - | - | - | - |

Fig. 18B

| XBuf | RBuf0 | RBuf1 | RP00 | RP01 | RP10 | RP11 |
|---|---|---|---|---|---|---|
| XBuf=-1 | - | - | - | - | - | - |
| XBuf=0 | R2 | R0 | R2 | LBuf0 | R0 | LBuf1 |
| XBuf%2=1 | - | - | R2 | RP00 | R0 | RP10 |
| XBuf%2=0 | - | - | - | - | - | - |

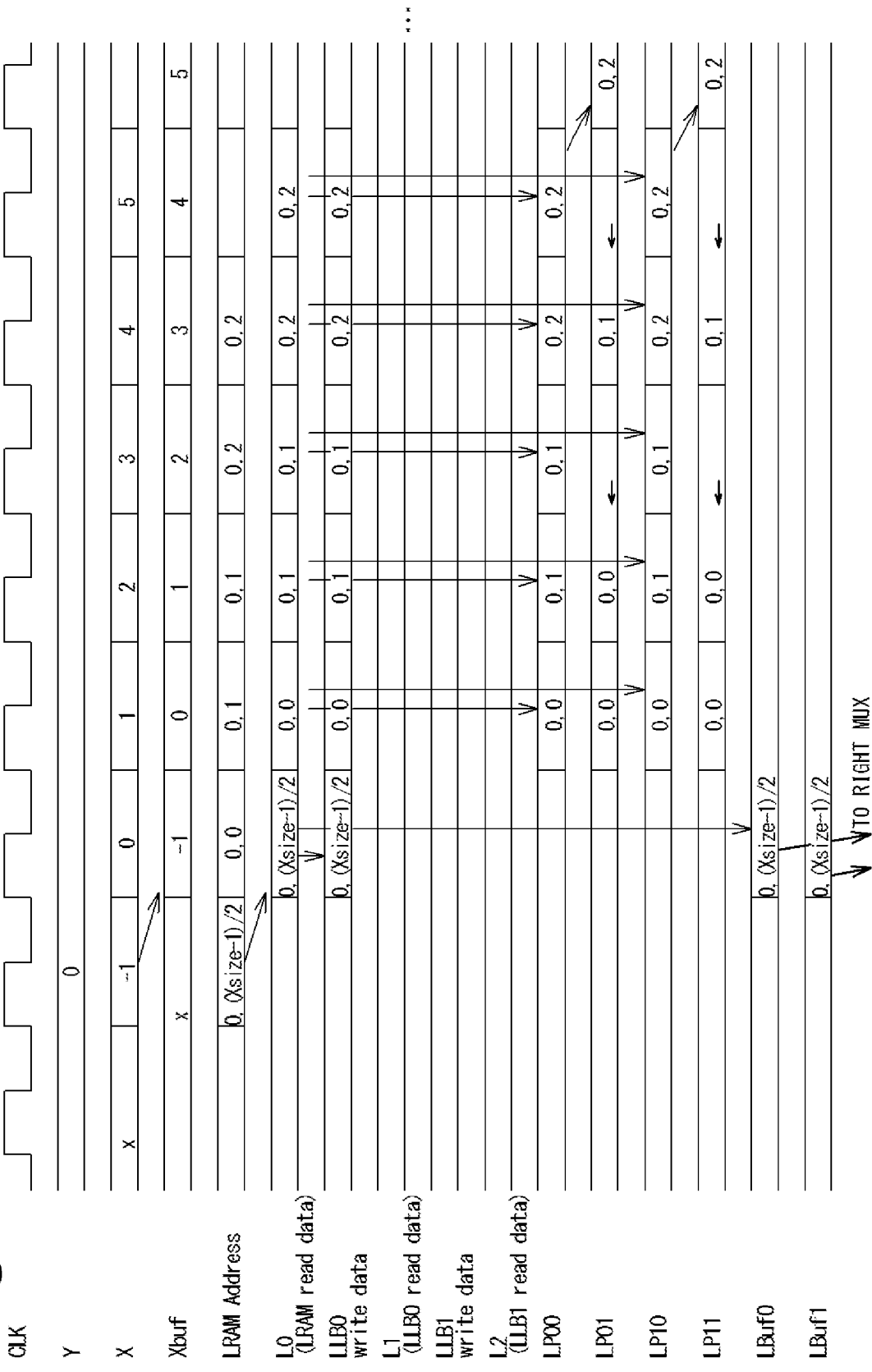

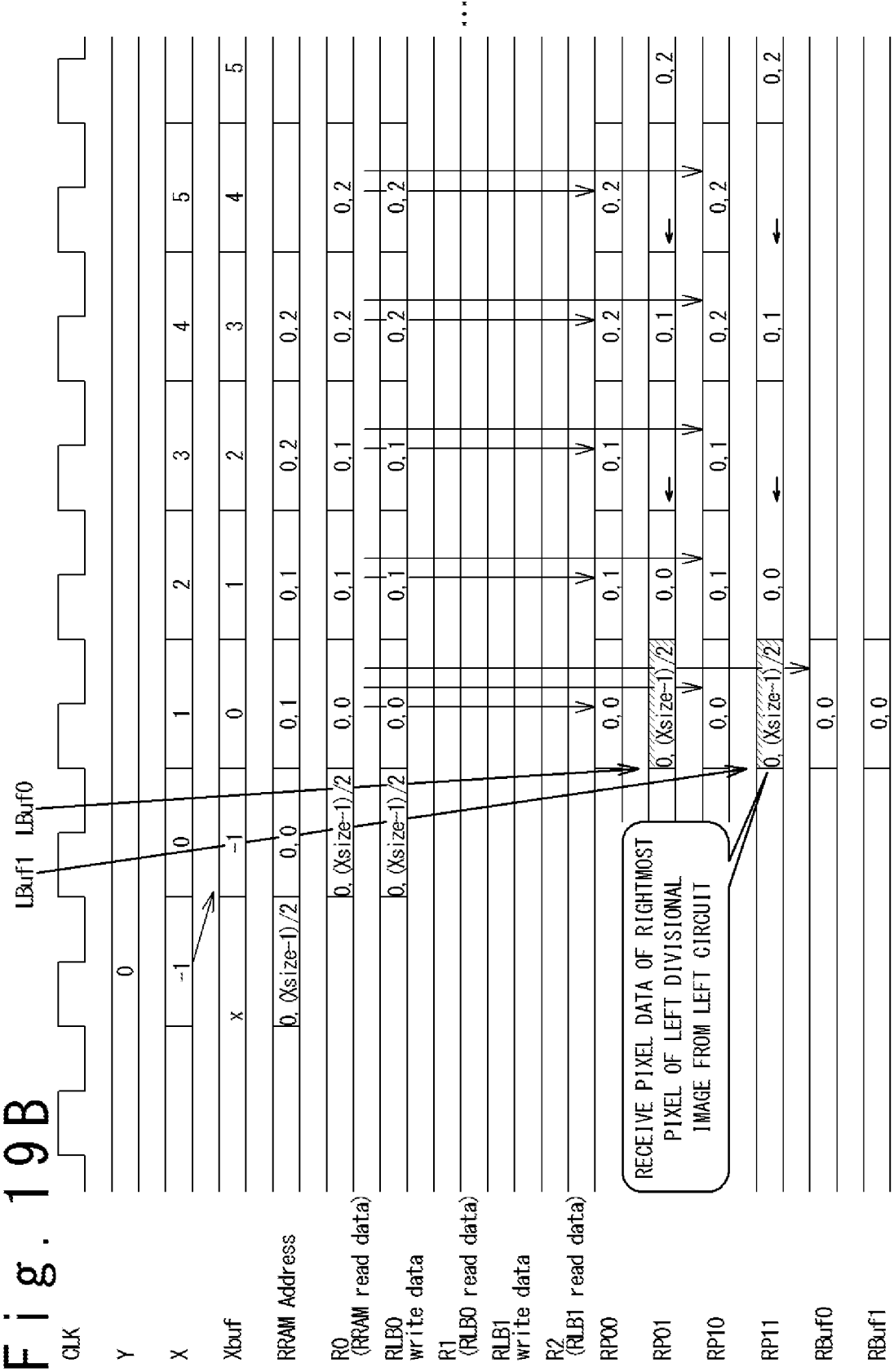

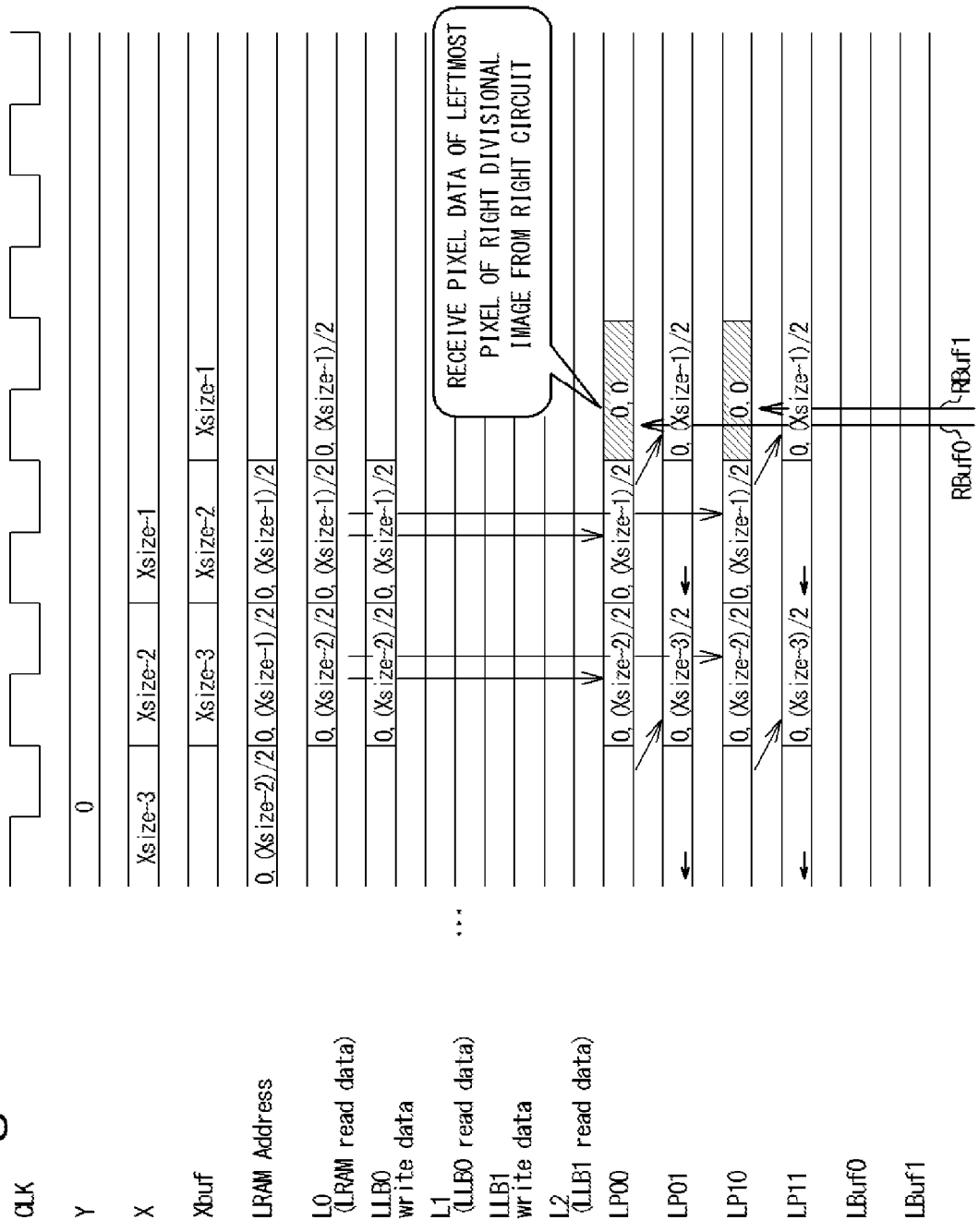

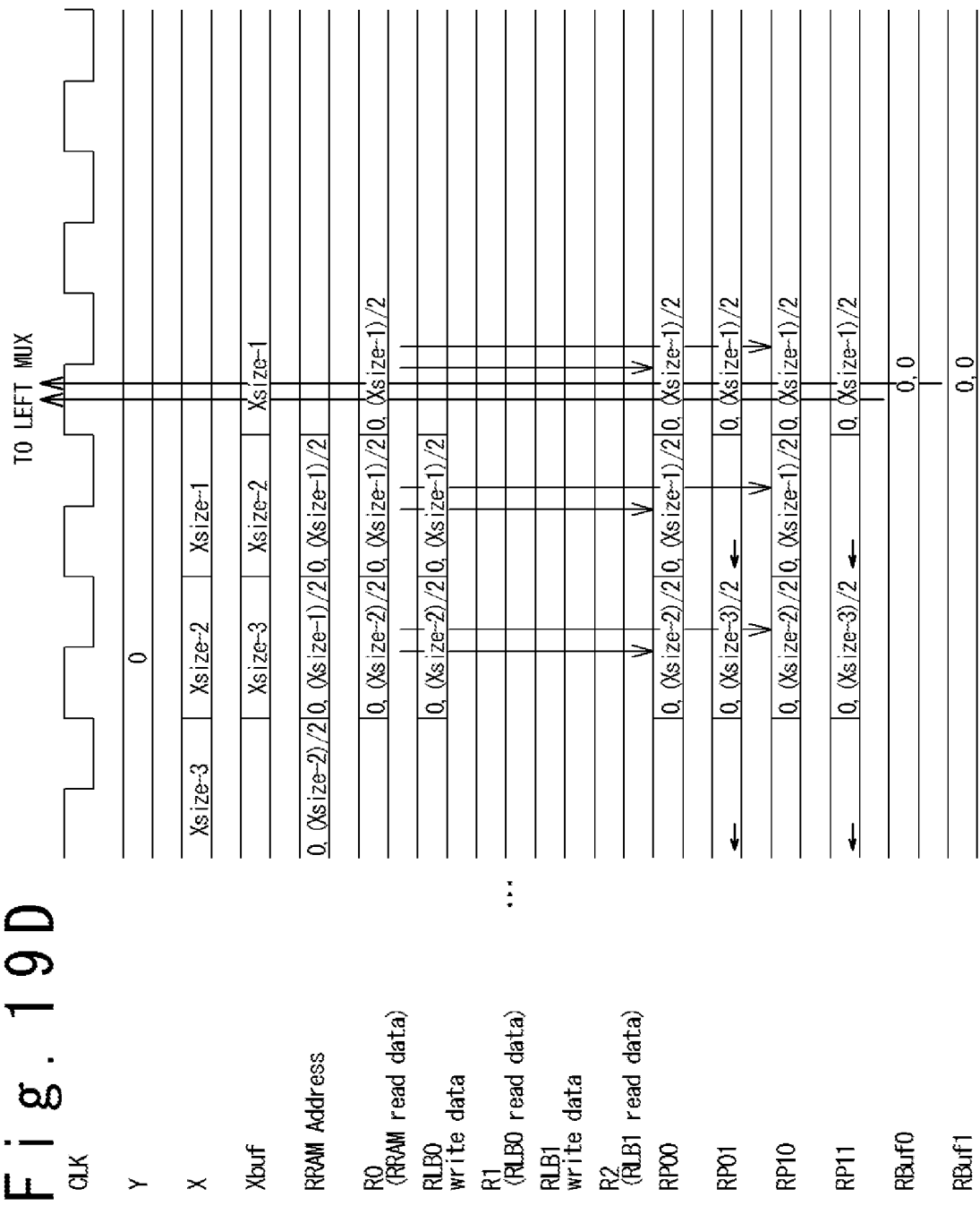

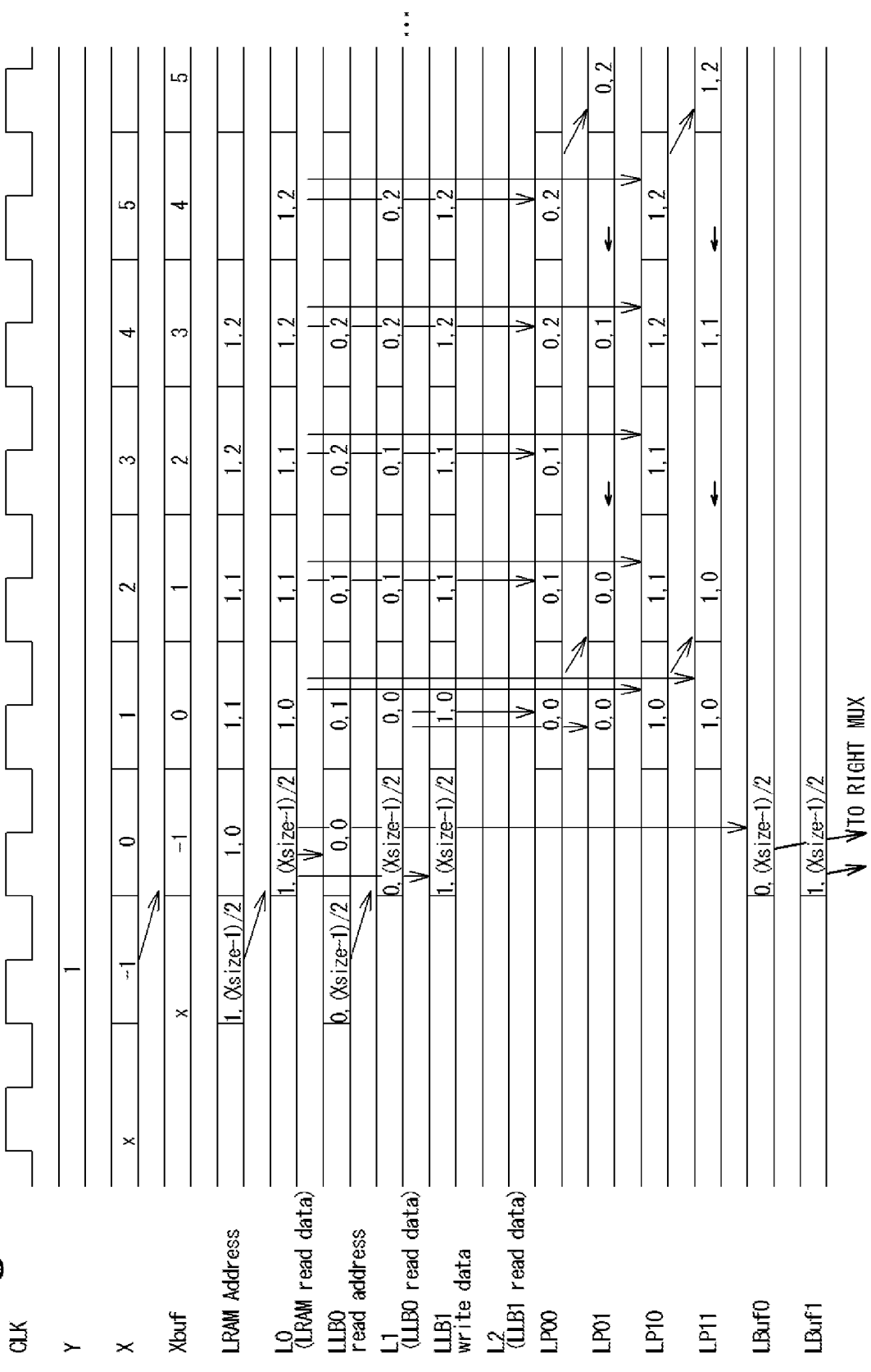

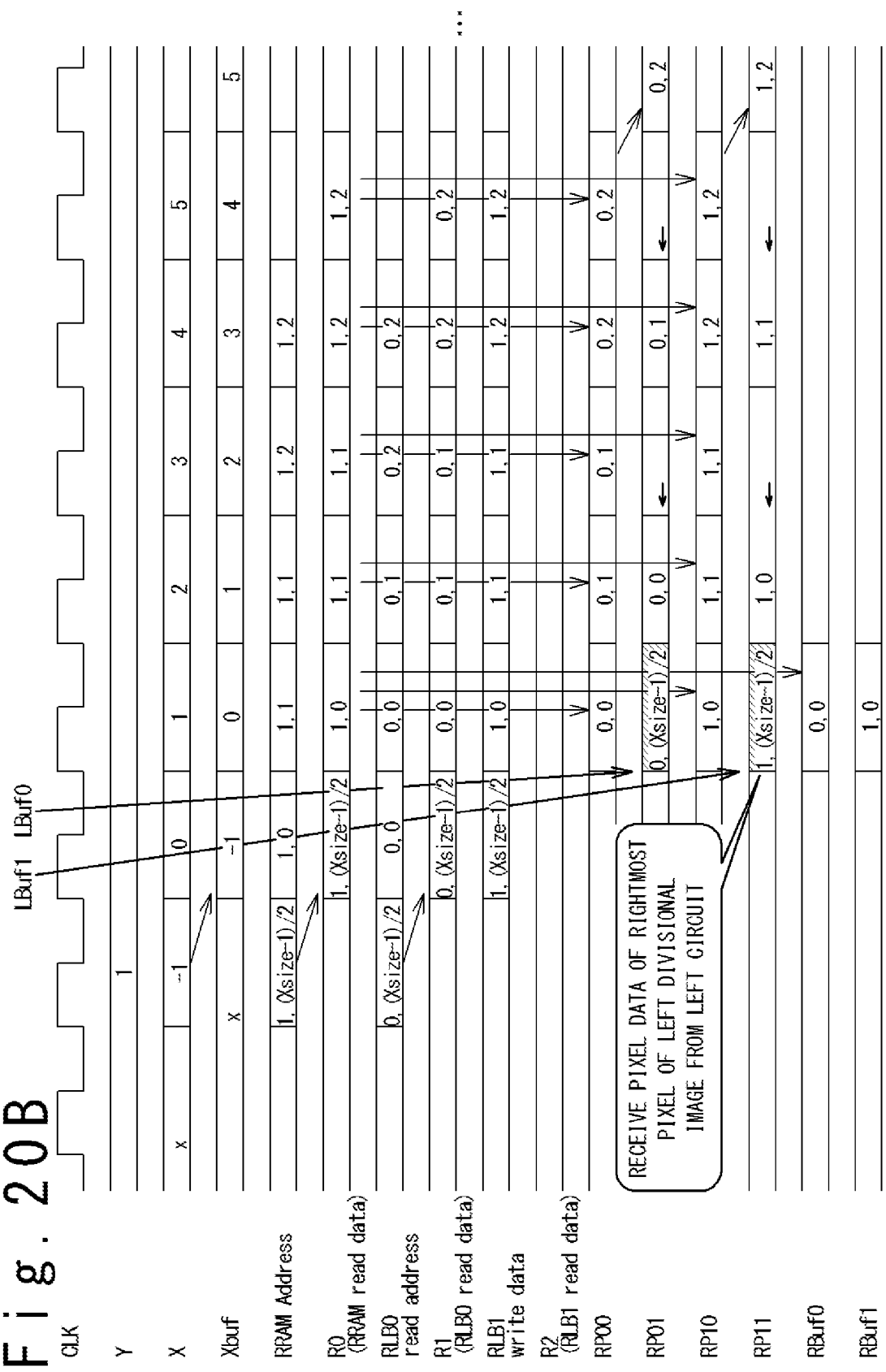

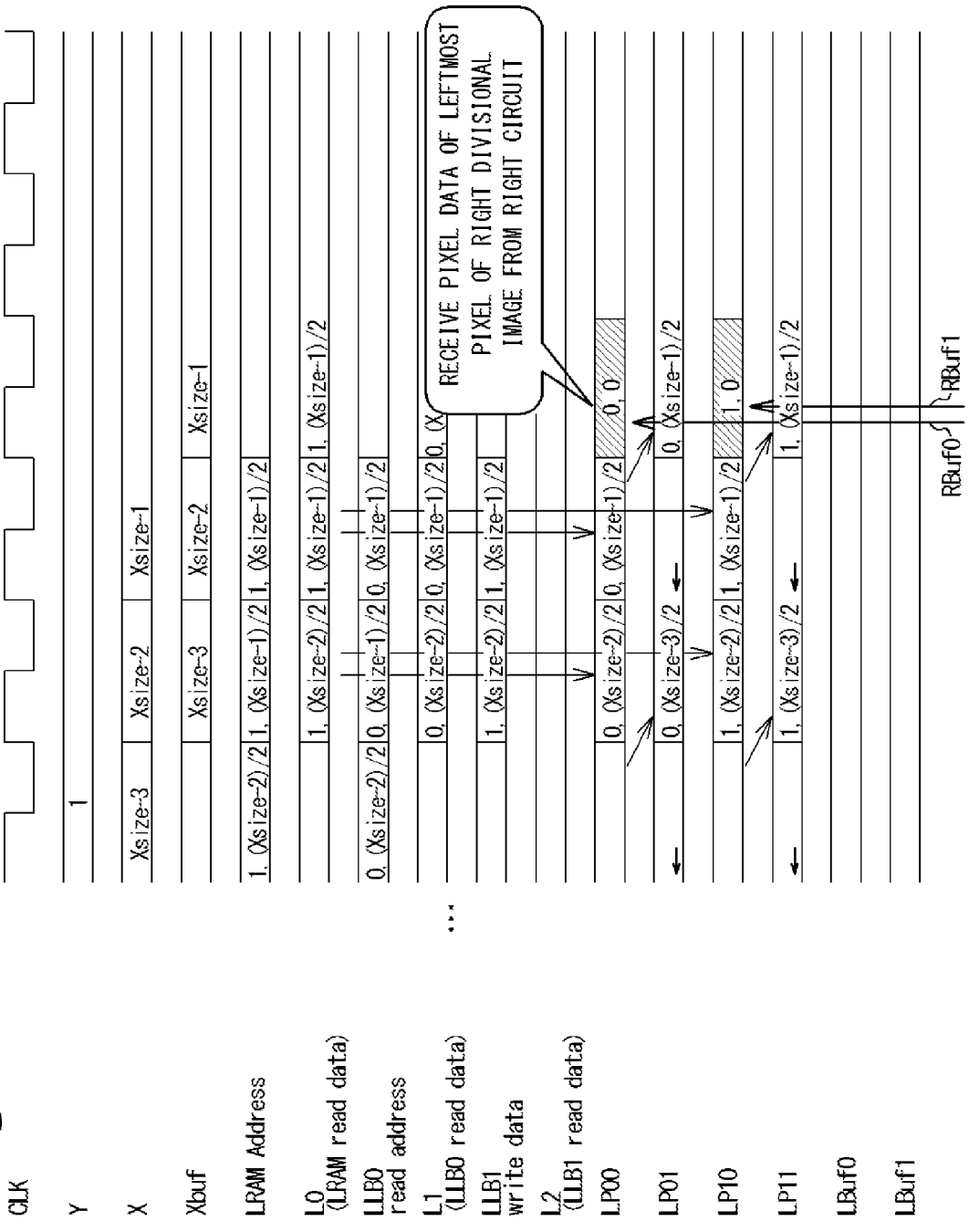

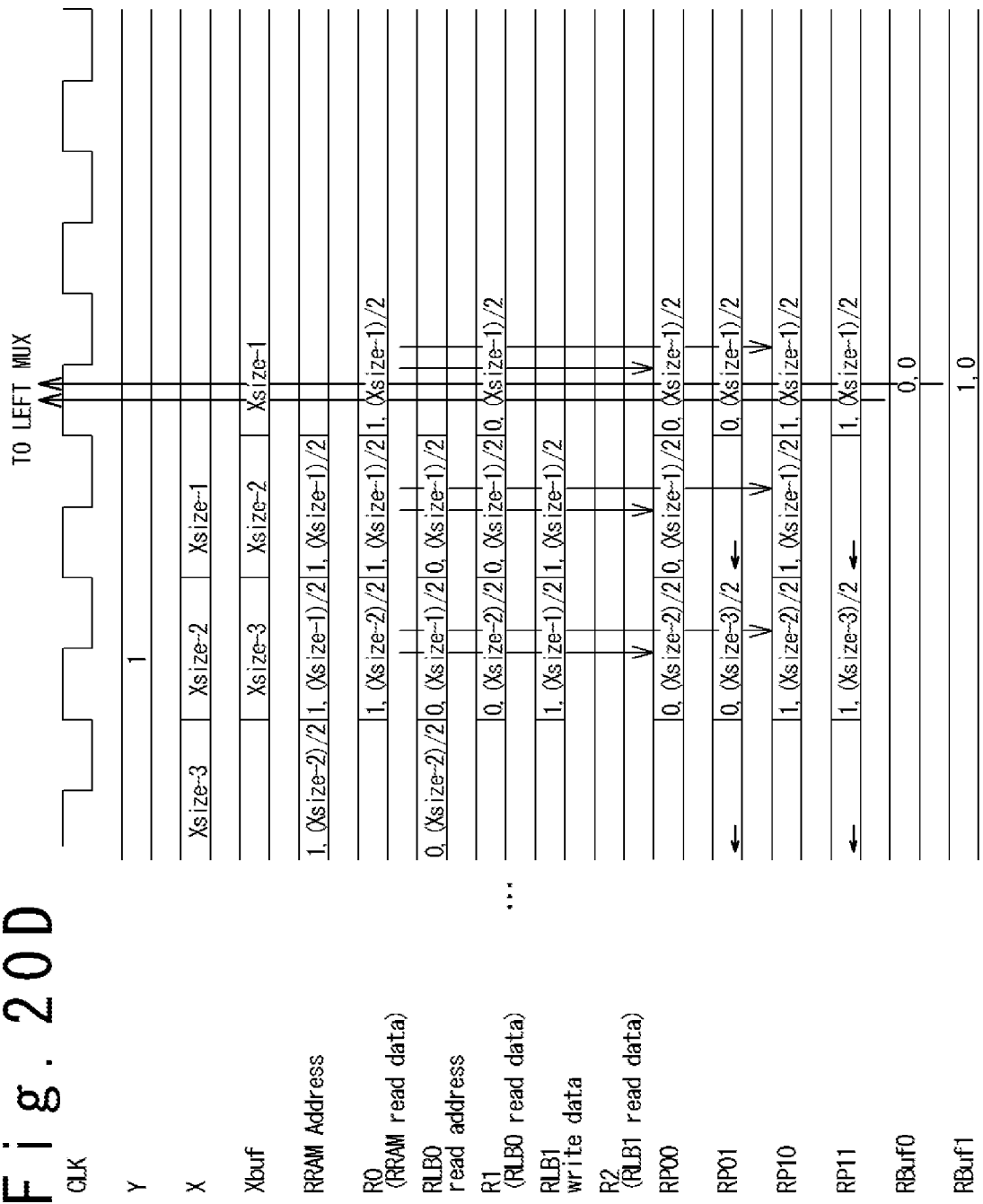

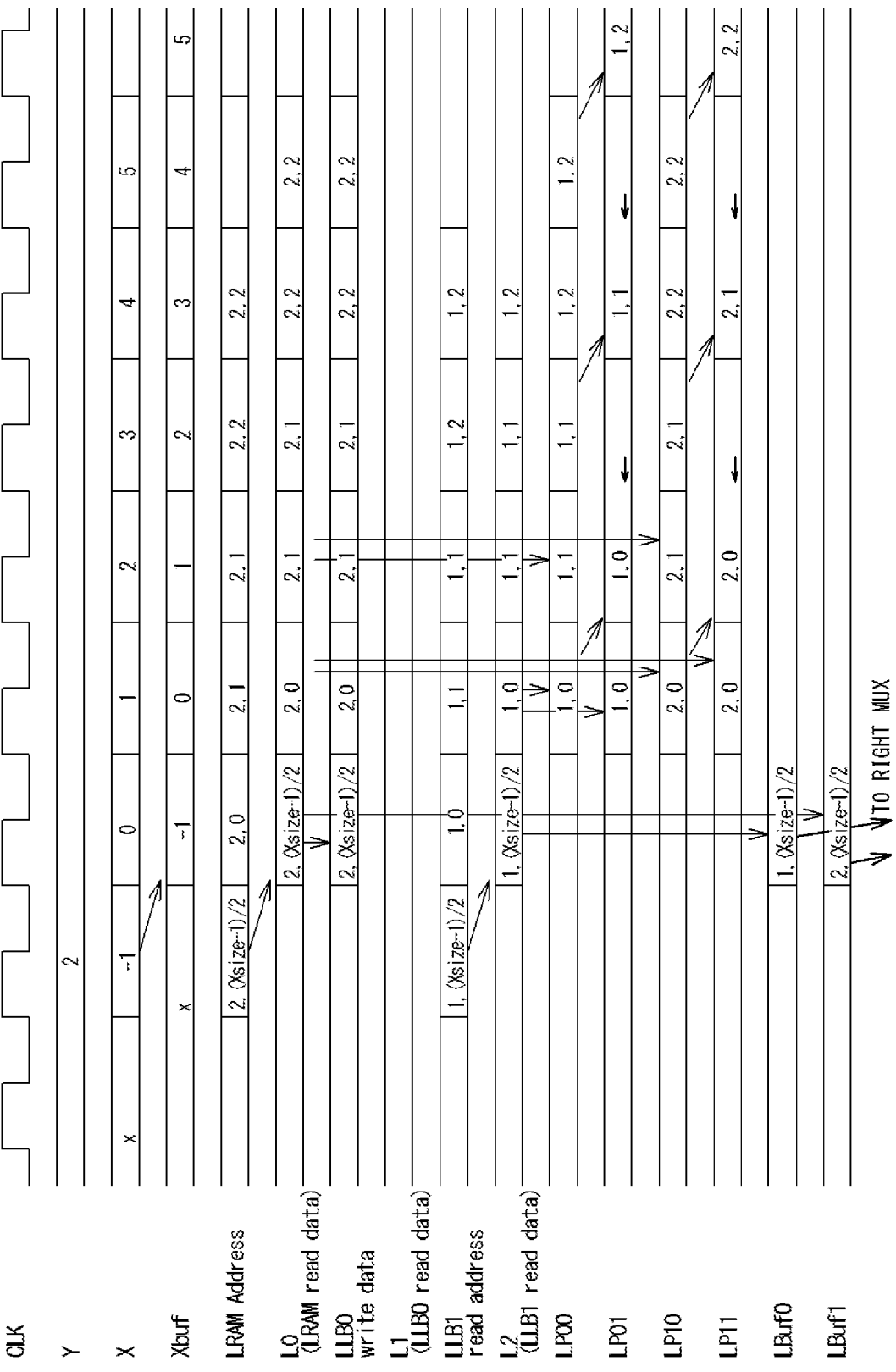

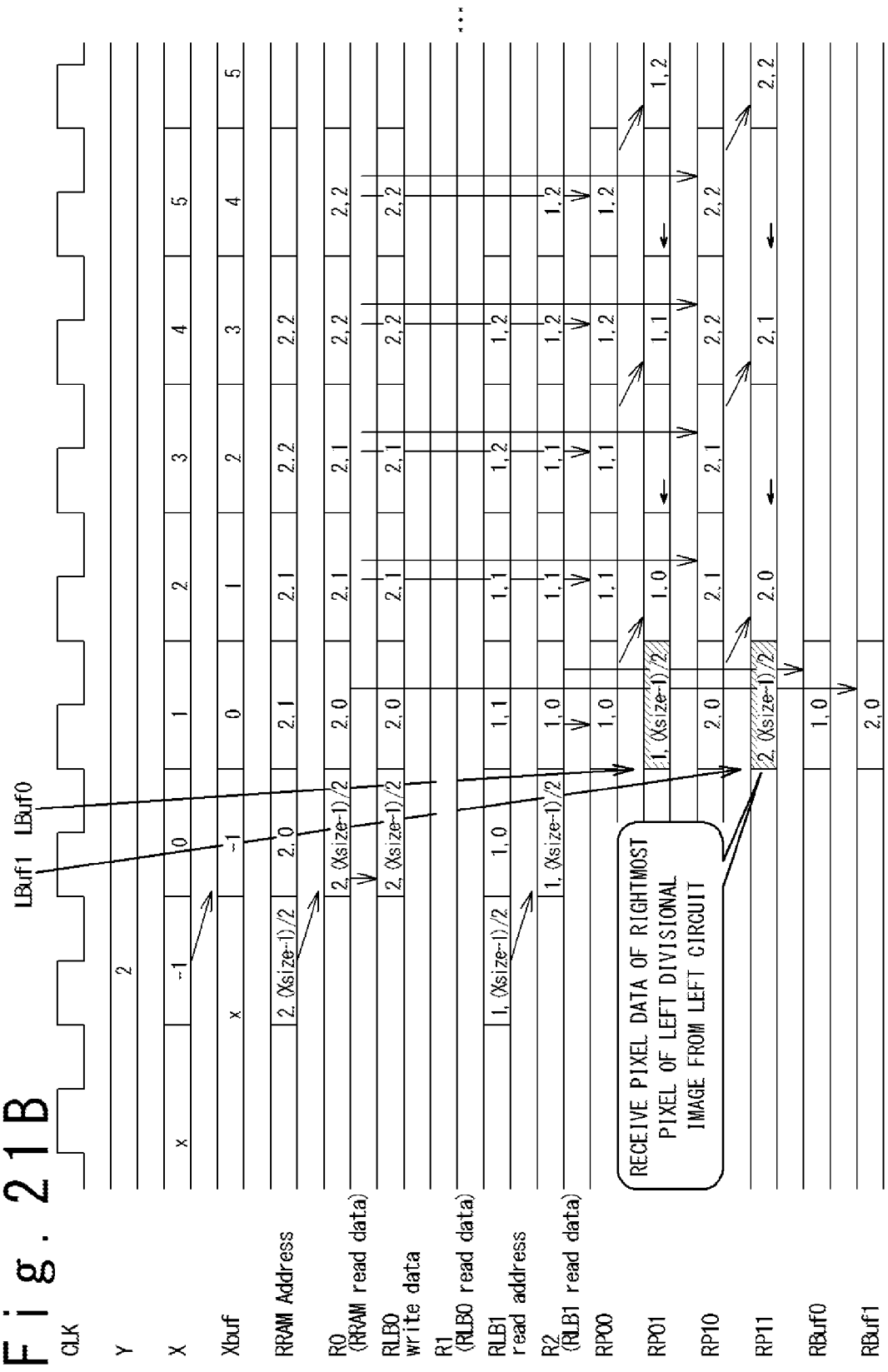

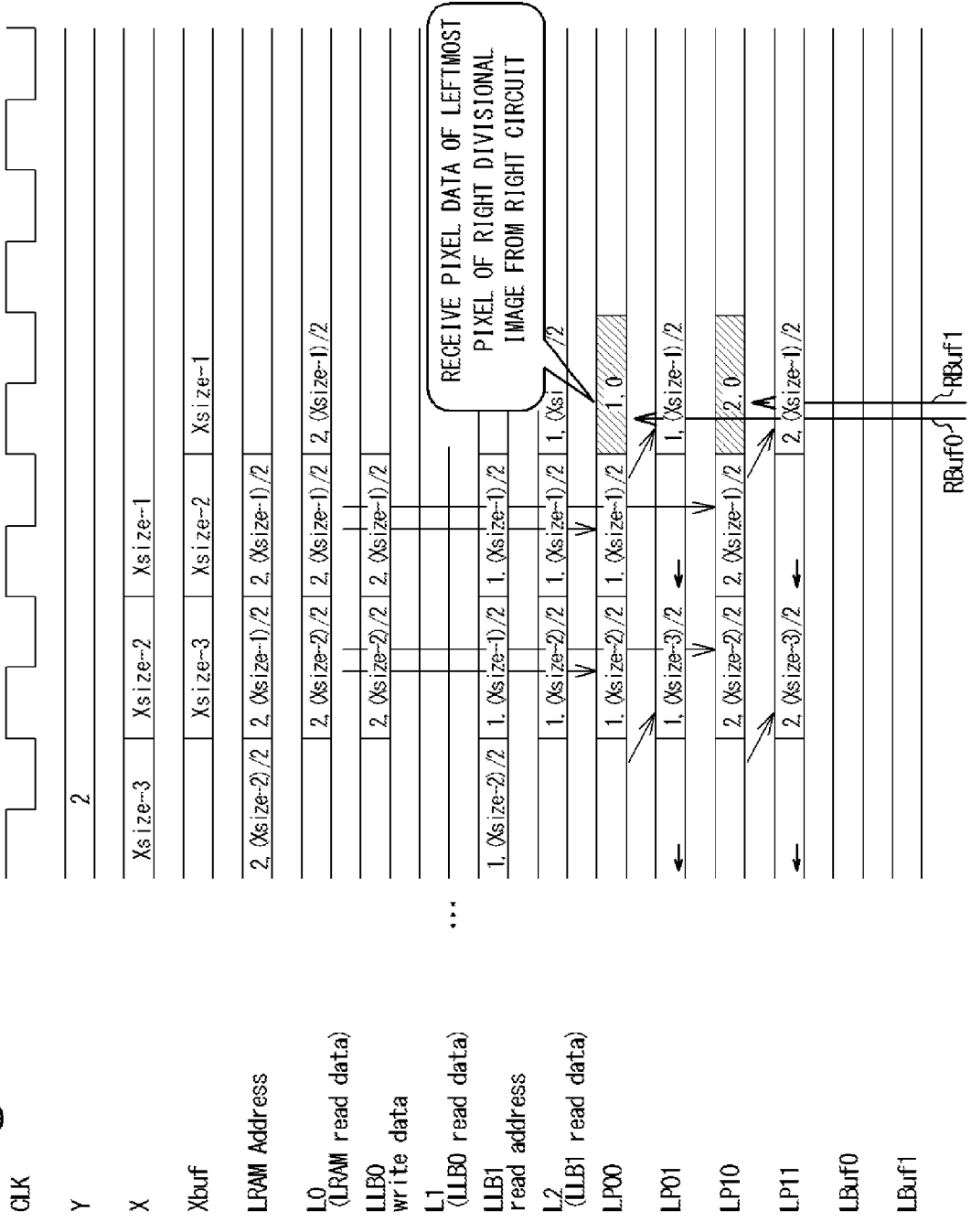

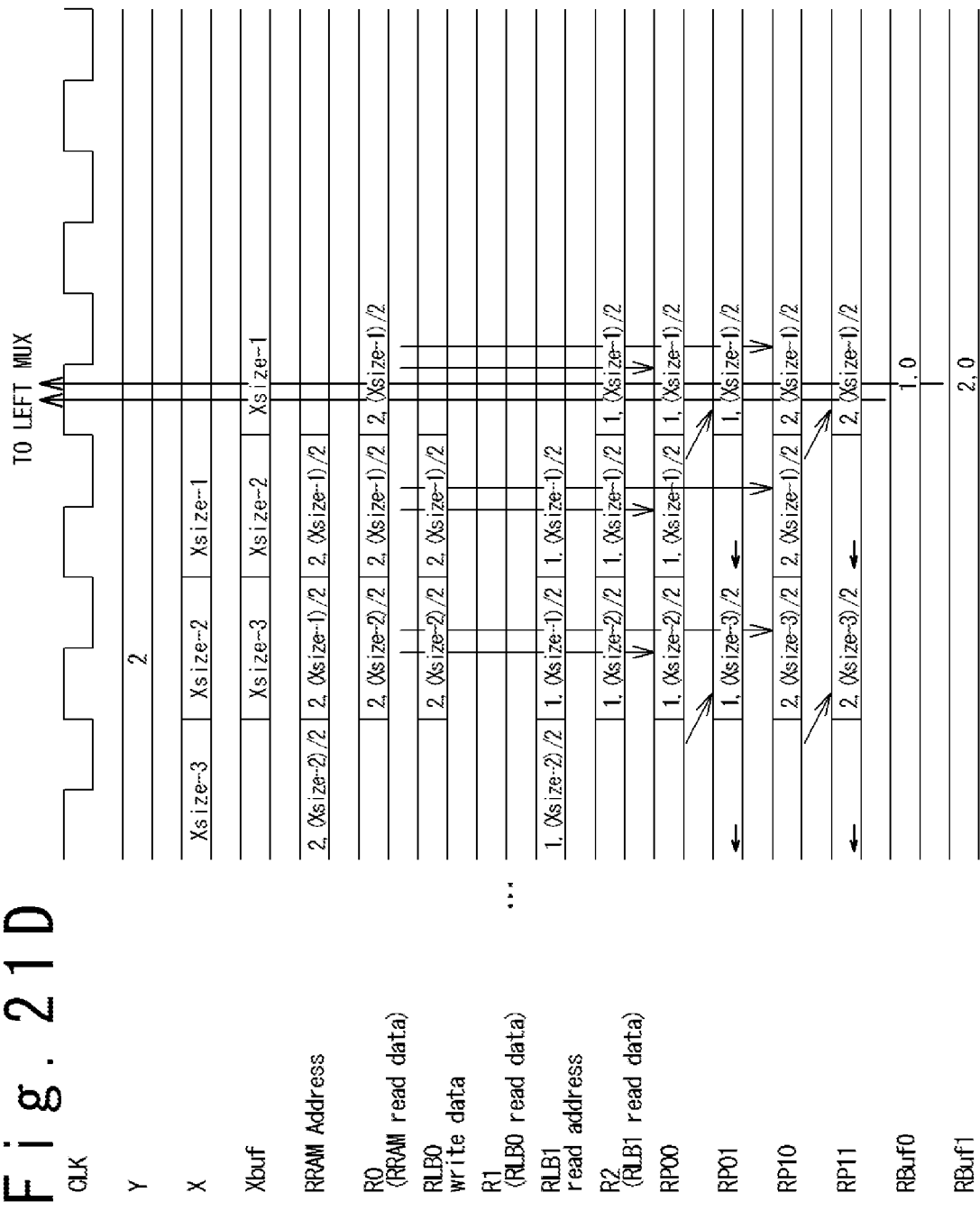

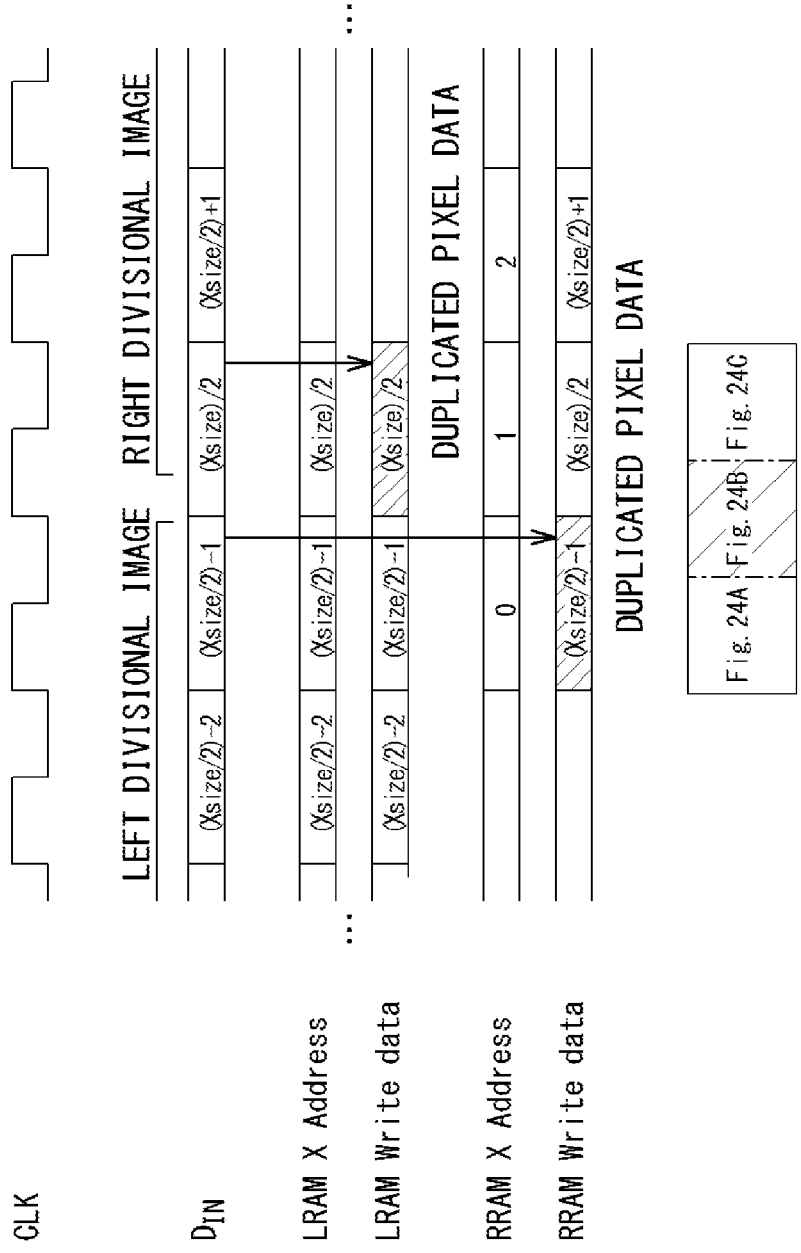

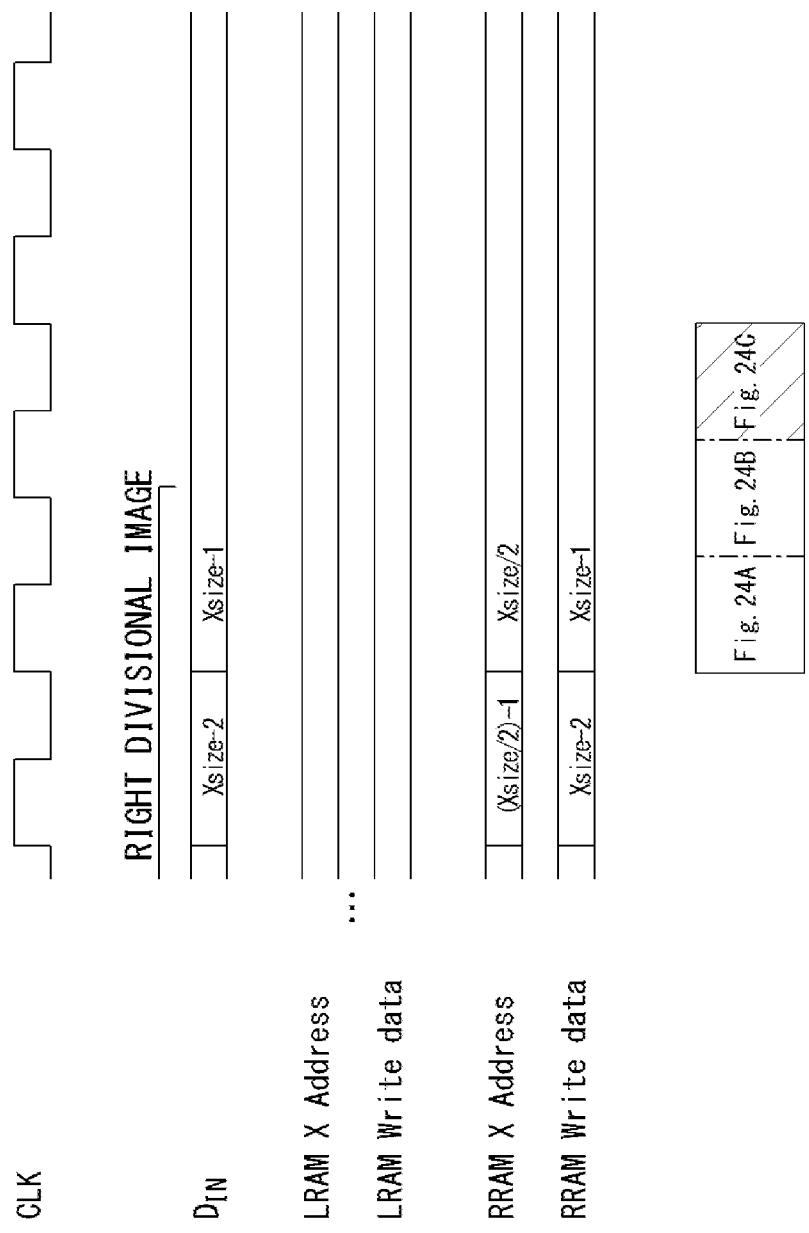

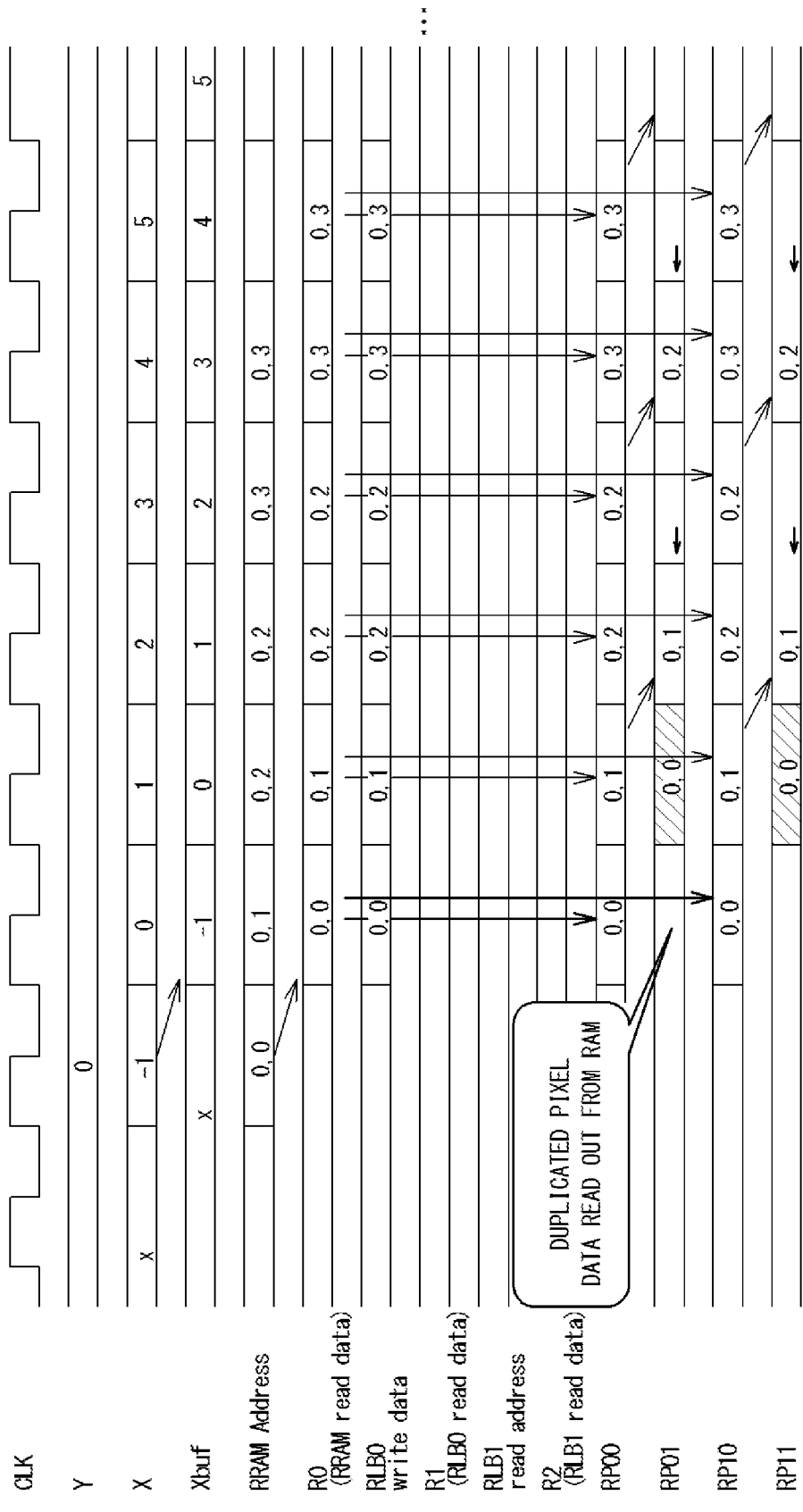

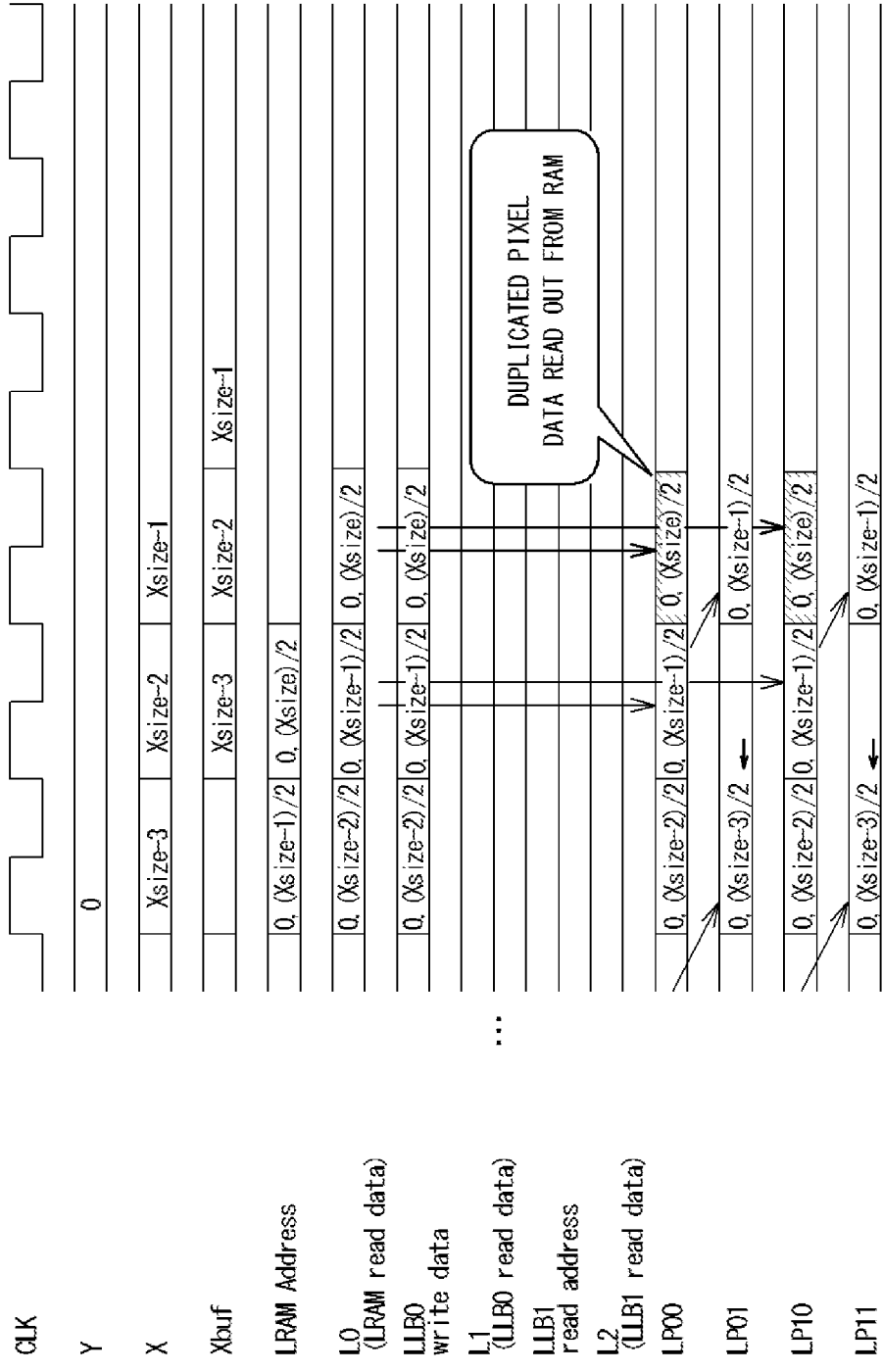

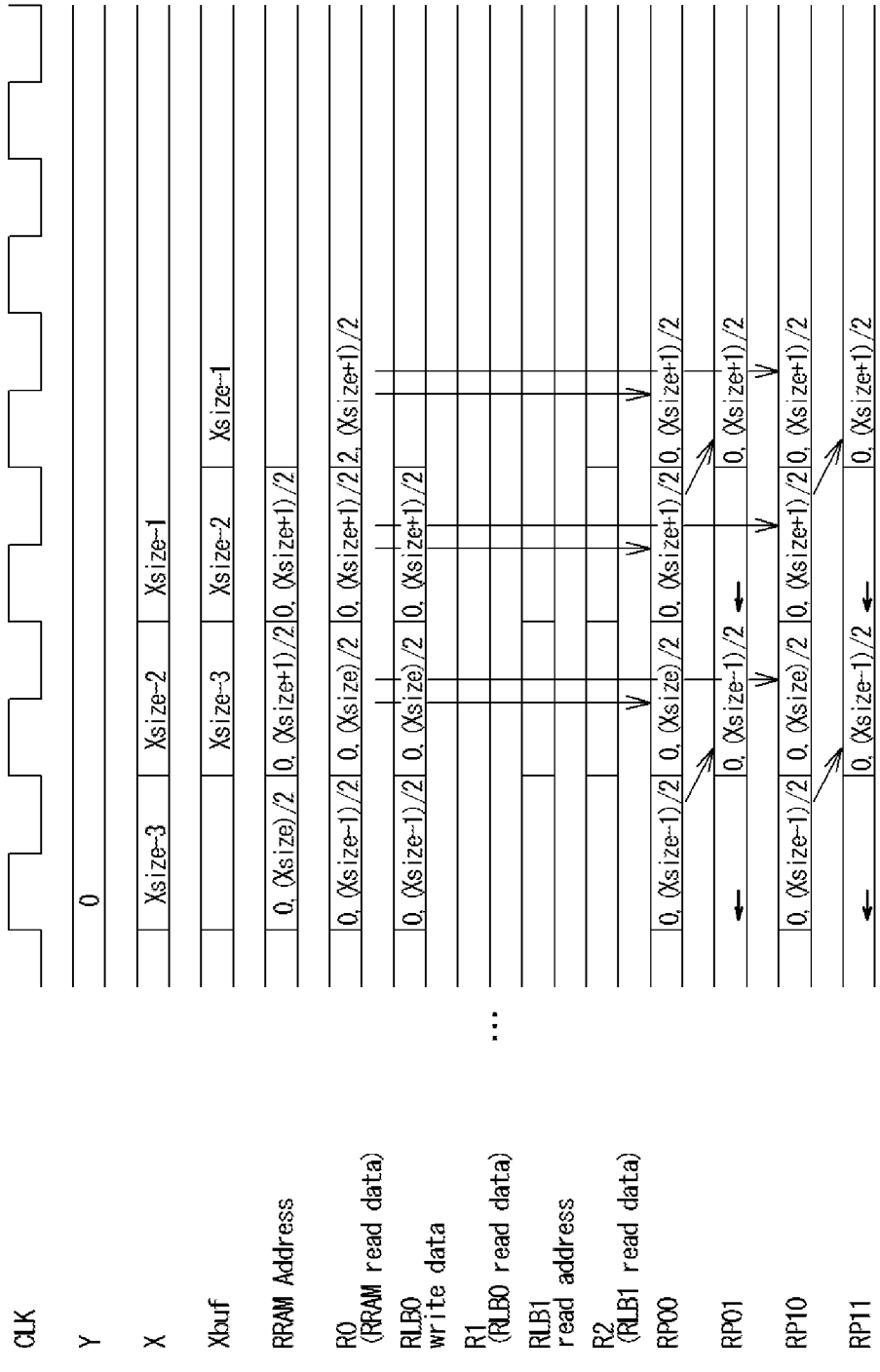

DEVICE AND METHOD FOR DIVISIONAL IMAGE SCALING

CROSS REFERENCE

This application claims priority of Japanese Patent Application No. Japanese Patent Application No. 2015-020654, filed on Feb. 4, 2015, the disclosure which is incorporated herein by reference.

TECHNICAL FIELD

The present technology relates to a display device, a display panel driver and a display panel drive method, more particularly, to a display device, a display panel driver and a display panel drive method adapted to image scaling.

BACKGROUND ART

A display panel driver driving a display panel (e.g. a liquid crystal display panel) often has the function of performing image scaling to enlarge or reduce an image. Such function may be used for generating pixel data matching the display panel resolution from input image data externally fed to the display panel driver, when the input image data do not match the display panel resolution.

Since recent display panels include an increasing number of pixels, the amount of pixel data to be handled in image scaling has been increased. In the meantime, it is necessary to perform image scaling on pixel data successively fed to a display panel driver within a limited period of time. Accordingly, the processing load of an image processing unit which performs image scaling processing (typically, a scaler circuit) has been intensively increased.

One approach to address this problem is to perform image scaling processing with multiple image processing units in parallel. For example, if image scaling processing is performed on pixel data corresponding to a divisional image of a display image to be displayed in a first region of a display panel with a first image processing unit and performed on pixel data corresponding to a divisional image to be displayed in a second region of the display panel with a second image processing unit, this effectively reduces the amount of pixel data to be processed in each of the first and second image processing units.

One issue in performing image scaling with multiple image processing units is that image discontinuity may be observed in the display image at the boundary between adjacent divisional images corresponding to pixel data generated by different image processing units. Improper image processing may undesirably cause a visually-perceivable boundary between adjacent divisional images on the display panel, and this is undesired in view of image quality improvement.

Various approaches have been proposed to address discontinuity in the display image caused by image scaling using multiple image processing units in parallel. Japanese Patent Application Publication No. 2009-294273 A discloses a technique which involves dividing an image into multiple regions, detecting a motion vector of an image element which bridges adjacent two regions and performing super resolution processing using the detected motion vector.

Japanese Patent Application Publication No. 2009-296410 A discloses a technique for performing super resolution processing by using multiple super resolution processors in parallel. This patent application publication discloses a black region is disposed at a boundary at which the image is divided.

Japanese Patent Application Publication No. 2005-164347 A discloses a technique for performing super resolution processing in which an input image is divided into multiple process regions. In this technique, when divided images are synthesized, an overlapping area is disposed near the synthesizing position and the images are synthesized depending on the correlation among scattered points in the overlapping area.

Japanese Patent Application Publication No. 2009-93442 A discloses a technique which selects positions at which super resolution processing is performed on the basis of the features and visual properties of an input image.

Japanese Patent Application Publication No. 2007-193508 A discloses a technique which involves dividing an interpolation image obtained by interpolation of pixel data into multiple blocks and optimizing parameters of super resolution processing for each block by calculating the frequency components of each block.

International Publication No. WO 2014/077024 A1 discloses a technique for generating a high resolution image from low resolution multi-view images so that the high resolution image have more frequency information than each of the low resolution multi-view images, and outputting the high resolution image as an output image. In this technique, partial regions obtained by dividing the input image are analyzed to calculate the likelihood among the partial regions and necessity of super resolution processing is determined on the basis of the calculated likelihood. Super resolution processing is performed on partial regions for which supper resolution processing is determined as necessary and synthesizing processing is performed on partial regions for which supper resolution processing is not determined as necessary.

According to an inventors' study, however, the above-described techniques undesirably suffer from a problem of increased processing amount, because advanced image processing, such as image analysis and noise removal, is performed. Implementing image processing accompanied by an increased processing amount in a display panel driver undesirably increases the circuit size.

SUMMARY OF INVENTION

In one embodiment, a display device configured to receive pixel data corresponding to an original image and to display an enlarged image obtained by enlarging the original image is provided. The display device includes a display panel, a first scaler circuit, a second scaler circuit, a pixel data feeding section, and a driver section. The display panel includes a first display region and a second display region. The pixel data feeding section is configured to feed to the first scaler circuit first divisional image pixel data which are pixel data of a first divisional image of the original image and to feed to the second scaler circuit second divisional image pixel data which are pixel data of a second divisional image of the original image. The pixel data feeding section feeds first boundary pixel data of pixels in a portion of the second divisional image, which is adjacent to the first divisional image, to the first scaler circuit, in addition to the first divisional image pixel data. The pixel data feeding section feeds second boundary pixel data of pixels in a portion of the first divisional image, which is adjacent to the second divisional image, to the second scaler circuit, in addition to the second divisional image pixel data. The first scaler circuit generate a first enlarged image pixel data through performing image scaling on the first divisional image pixel data and the first boundary pixel data. The second scaler circuit generate a second enlarged image pixel data through performing image scaling on the second divisional image pixel data and the second boundary pixel data. The driver section drives pixels in the first display region in response to the first enlarged image pixel data and drives pixels in the second display region in response to the second enlarged image pixel data.

In another embodiment, a display panel driver configured to receive pixel data corresponding to an original image and to display an enlarged image obtained by enlarging the original image on a display panel including a first display region and a second display region is provided. The display panel driver includes a first scaler circuit, a second scaler circuit, a pixel data feeding section, and a driver section. The pixel data feeding section is configured to feed to the first scaler circuit first divisional image pixel data which are pixel data of a first divisional image of the original image and to feed to the second scaler circuit second divisional image pixel data which are pixel data of a second divisional image of the original image. The pixel data feeding section feeds first boundary pixel data of pixels in a portion of the second divisional image, which is adjacent to the first divisional image, to the first scaler circuit, in addition to the first divisional image pixel data. The pixel data feeding section feeds second boundary pixel data of pixels in a portion of the first divisional image, which is adjacent to the second divisional image, to the second scaler circuit, in addition to the second divisional image pixel data. The first scaler circuit generate a first enlarged image pixel data through performing image scaling on the first divisional image pixel data and the first boundary pixel data. The second scaler circuit generate a second enlarged image pixel data through performing image scaling on the second divisional image pixel data and the second boundary pixel data. The driver section drives pixels in the first display region in response to the first enlarged image pixel data and drives pixels in the second display region in response to the second enlarged image pixel data.

In yet another embodiment, a display panel drive method for, in response to pixel data corresponding to an original image, displaying an enlarged image obtained by enlarging the original image on a display panel including a first display region and a second display region is provided. The method includes feeding to a first scaler circuit first divisional image pixel data which are pixel data of a first divisional image of the original image and first boundary pixel data of pixels in a first portion of a second divisional image of the original image, the first portion being adjacent to the first divisional image; feeding to a second scaler circuit second divisional image pixel data which are pixel data of the second divisional image and second boundary pixel data of pixels in a second portion of the first divisional image, the second portion being adjacent to the second divisional image; by the first scaler circuit, generating a first enlarged image pixel data through performing image scaling on the first divisional image pixel data and the first boundary pixel data; by the second scaler circuit, generating a second enlarged image pixel data through performing image scaling on the second divisional image pixel data and the second boundary pixel data; driving pixels in the first display region in response to the first enlarged image pixel data; and driving pixels in the second display region in response to the second enlarged image pixel data.

BRIEF DESCRIPTION OF THE DRAWINGS

The above and other advantages and features of the present disclosure will be more apparent from the following description taken in conjunction with the accompanied drawings, in which:

FIG. 6B illustrates details of calculation of pixels in a portion at the boundary between first and second enlarged divisional images of an enlarged image in the image scaling processing in the present embodiment;

FIG. 11A is a truth table illustrating one example of the operation of an X counter;

FIG. 11B is a truth table illustrating an example of the operation of a Y counter;

FIG. 12 is a timing chart illustrating one example of the operations of the X counter and the Y counter;

FIG. 13A is a truth table illustrating an example of the operation of a left address generator circuit;

FIG. 13B is a truth table illustrating an example of the operation of a right address generator circuit;

FIG. 14A is a truth table illustrating one example of the contents of access requests generated by the left and right address generator circuits;

FIG. 14B is a truth table illustrating another example of the contents of access requests generated by the left and right address generator circuits;

FIG. 16A is a truth table illustrating an exemplary operation of a left selector in the case when the count value Y is zero;

FIG. 16B is a truth table illustrating an exemplary operation of a right selector in the case when the count value Y is zero;

FIG. 17A is a truth table illustrating an exemplary operation of the left selector in the case when $((Y+1)/2)\%2=1$ for the count value Y;

FIG. 17B is a truth table illustrating an exemplary operation of the right selector in the case when ((Y+1)/2)%2=1 for the count value Y;

FIG. 18A is a truth table illustrating an exemplary operation of the left selector in the case when ((Y+1)/2)%2=0 for the count value Y;

FIG. 18B is a truth table illustrating an exemplary operation of the right selector in the case when ((Y+1)/2)%2=0 for the count value Y;

FIGS. 19A to 19D are timing charts illustrating an exemplary operation of the RAM access logic circuit when the count value Y is "0";

FIGS. 20A to 20D are timing charts illustrating an exemplary operation of the RAM access logic circuit when ((Y+1)/2)%2=1 for the count value Y;

FIGS. 21A to 21D are timing charts illustrating an exemplary operation of the RAM access logic circuit when ((Y+1)/2)%2=0 for the count value Y;

FIGS. 24A to 24C are timing charts illustrating an exemplary write operation of pixel data into the LRAM and the RRAM in the driver IC configured to receive pixel data of an original image on one port; and FIGS. 25A to 25D are timing charts illustrating the operation of a RAM access logic circuit in another embodiment of the present disclosure.

DETAILED DESCRIPTION

Introduction

Figure 1:
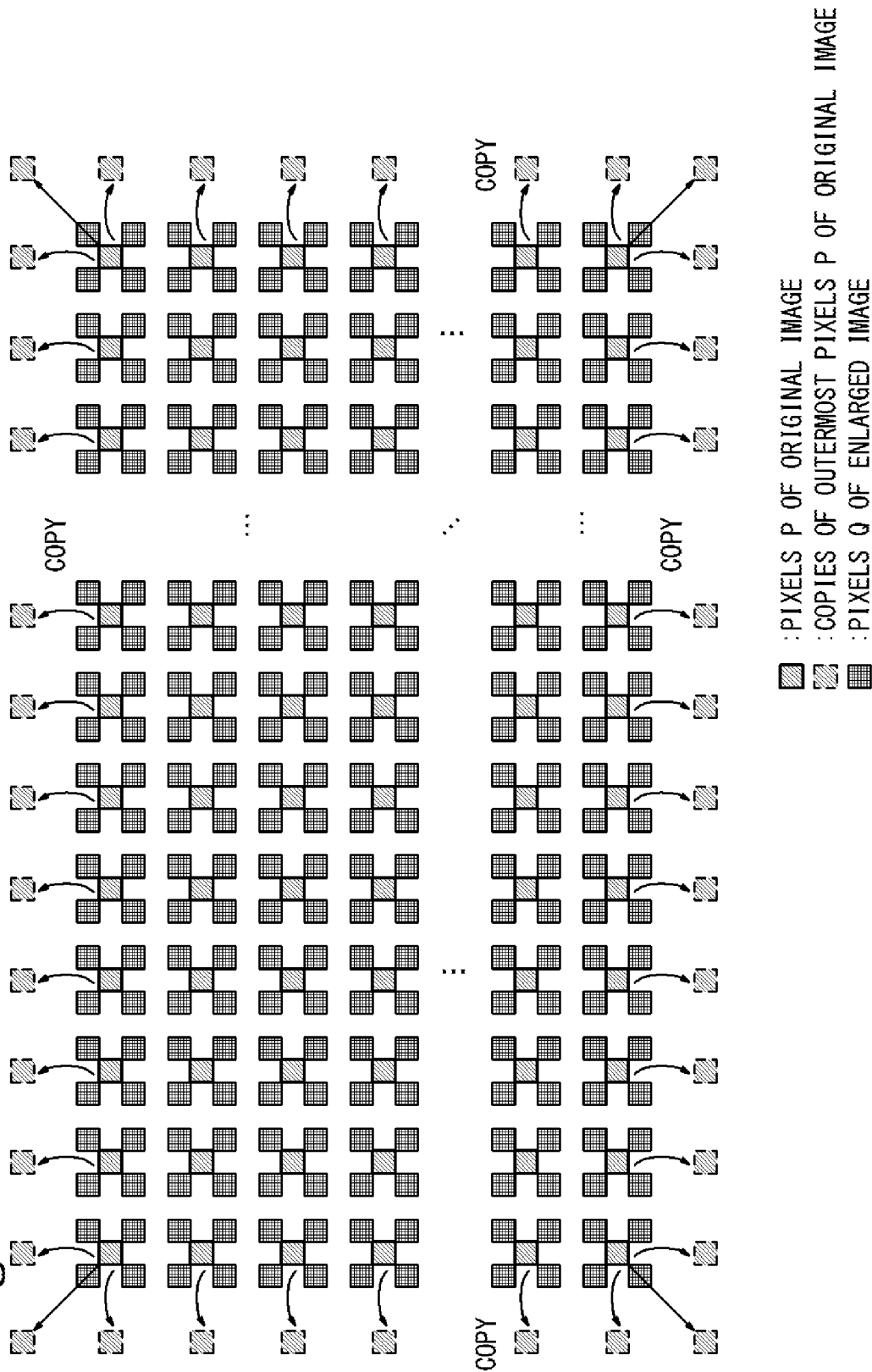
FIG. 1 illustrates an example of bilinear image scaling.

Therefore, an advantage of the present technology to suppress discontinuity of a display image with a reduced circuit size, with respect to a display device or a display driver configured to perform image scaling with multiple image processing units. Other advantages and new features of the present disclosure would be understood by a person skilled in the art from the following disclosure.

In one embodiment, a display device configured to receive pixel data corresponding to an original image and to display an enlarged image obtained by enlarging the original image is provided. The display device includes: a display panel including a first display region and a second display region; a first scaler circuit; a second scaler circuit; a pixel data feeding section configured to feed to the first scaler circuit first divisional image pixel data which are pixel data of a first divisional image of the original image and to feed to the second scaler circuit second divisional image pixel data which are pixel data of a second divisional image of the original image; and a driver section. The pixel data feeding section feeds first boundary pixel data of pixels in a portion of the second divisional image, which is adjacent to the first divisional image, to the first scaler circuit, in addition to the first divisional image pixel data. Also, the pixel data feeding section feeds second boundary pixel data of pixels in a portion of the first divisional image, which is adjacent to the second divisional image, to the second scaler circuit, in addition to the second divisional image pixel data. The first scaler circuit generate a first enlarged image pixel data through performing image scaling on the first divisional image pixel data and the first boundary pixel data. The second scaler circuit generate a second enlarged image pixel data through performing image scaling on the second divisional image pixel data and the second boundary pixel data. The driver section drives pixels in the first display region in response to the first enlarged image pixel data and drives pixels in the second display region in response to the second enlarged image pixel data.

Provided in another embodiment of the present disclosure is a display panel driver configured to receive pixel data corresponding to an original image and to display an enlarged image obtained by enlarging the original image on a display panel including a first display region and a second display region. The display panel driver includes: a first scaler circuit; a second scaler circuit; a pixel data feeding section configured to feed to the first scaler circuit first divisional image pixel data which are pixel data of a first divisional image of the original image and to feed to the second scaler circuit second divisional image pixel data which are pixel data of a second divisional image of the original image; and a driver section. The pixel data feeding section feeds first boundary pixel data of pixels in a portion of the second divisional image, which is adjacent to the first divisional image, to the first scaler circuit, in addition to the first divisional image pixel data. The pixel data feeding section also feeds second boundary pixel data of pixels in a portion of the first divisional image, which is adjacent to the second divisional image, to the second scaler circuit, in addition to the second divisional image pixel data. The first scaler circuit generate a first enlarged image pixel data through performing image scaling on the first divisional image pixel data and the first boundary pixel data. The second scaler circuit generate a second enlarged image pixel data through performing image scaling on the second divisional image pixel data and the second boundary pixel data. The driver section drives pixels in the first display region in response to the first enlarged image pixel data and drives pixels in the second display region in response to the second enlarged image pixel data.

Provided in still another embodiment of the present disclosure is a display panel drive method for, in response to pixel data corresponding to an original image, displaying an enlarged image obtained by enlarging the original image on a display panel including a first display region and a second display region.

The display panel drive method includes:

feeding to a first scaler circuit first divisional image pixel data which are pixel data of a first divisional image of the original image and first boundary pixel data of pixels in a first portion of a second divisional image of the original image, the first portion being adjacent to the first divisional image;

feeding to a second scaler circuit second divisional image pixel data which are pixel data of the second divisional image and second boundary pixel data of pixels in a second portion of the first divisional image, the second portion being adjacent to the second divisional image;

by the first scaler circuit, generating a first enlarged image pixel data through performing image scaling on the first divisional image pixel data and the first boundary pixel data;

by the second scaler circuit, generating a second enlarged image pixel data through performing image scaling on the second divisional image pixel data and the second boundary pixel data;

driving pixels in the first display region in response to the first enlarged image pixel data; and driving pixels in the second display region in response to the second enlarged image pixel data.

The present disclosure effectively suppresses discontinuity of a display image with a reduced circuit size, with respect to a display device or a display driver configured to perform image scaling with multiple image processing units.

The present technology will be now described herein with reference to illustrative embodiments. Those skilled in the art would recognize that many alternative embodiments can be accomplished using the teachings of the present technology and that the invention is not limited to the embodiments illustrated for explanatory purposed. It will be appreciated that for simplicity and clarity of illustration, elements in the Figures have not necessary drawn to scale. For example, the dimensions of some of the elements are exaggerated relative to other elements.

For a better understanding of the present technology, a description is first given of an overview of image scaling (image enlargement/reduction) and then a problem which may occur when image scaling is achieved by using multiple image processing units.

Figure 2:
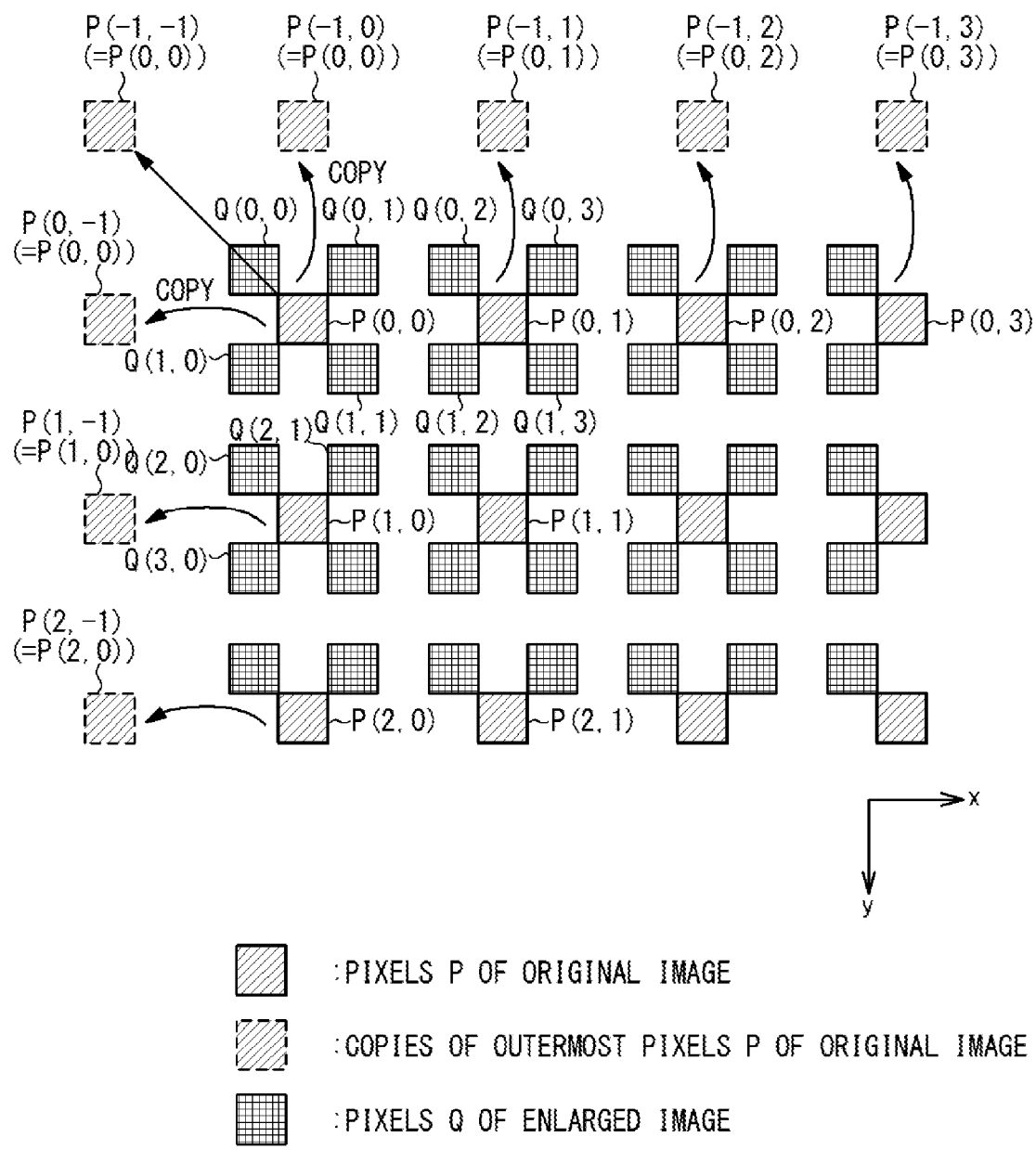
FIG. 2 is an enlarged view of the upper left portion of FIG. 1.

FIG. 1 is a conceptual diagram illustrating bilinear image scaling, which is one of typical image scaling techniques, and FIG. 2 is an enlarged view of the upper left section of FIG. 1. FIGS. 1 and 2 illustrate image scaling to enlarge an image with an enlargement factor of two (that is, double the number of pixels in both of the vertical and horizontal directions). In FIG. 1, pixels P are those of the original image and pixels Q are those of the enlarged image (the image obtained by image scaling). In FIG. 2, the symbol "P(i, j)" denotes the pixel P of the original image positioned in the i-th row and the j-th column) and the symbol "Q(i, j)" denotes the pixel Q of the enlarged image positioned in the i-th row and the j-th column), where i and j are integers.

In bilinear image scaling, the position of each pixel Q of the enlarged image are determined in accordance with the enlargement factor and pixel data of each pixel Q of the enlarged image (most typically, data indicative of the grayscale levels of the red (R), green (G) and blue (B) colors) are calculated through linear interpolation of pixel data of four pixels of the original image closest to each pixel Q. The weights (the interpolation coefficients) given to the four pixels of the original image are determined in accordance with the position of each pixel Q of the enlarged image (or reduced image).

Figure 3:
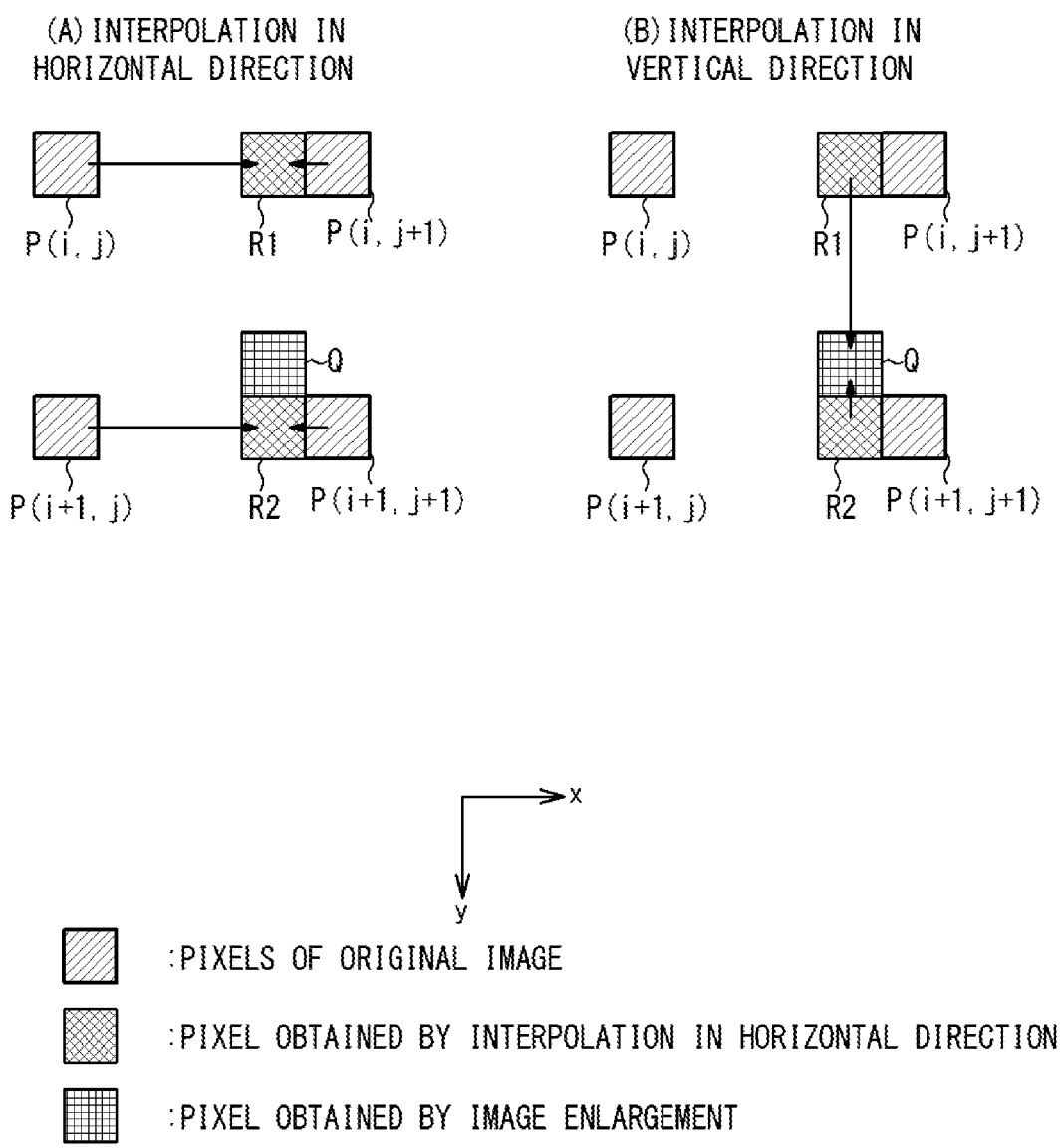
FIG. 3 is a diagram illustrating calculation of pixel data of a target pixel Q of an enlarged image through bilinear image scaling.

FIG. 3 is a diagram illustrating details of calculation of pixel data of a target pixel Q of an enlarged image through a bilinear method. The pixel data of the target pixel Q are calculated from pixel data of four pixels P(i, j), P(i, j+1), P(i+1, j) and P(i+1, j+1) of the original image, which are closest to the target pixel Q. More specifically, pixel data of pixel R1 are calculated by performing linear interpolation of the pixel data of pixels P(i, j) and P(i, j+1) in the horizontal direction and pixel data of pixel R2 are calculated by performing linear interpolation of the pixel data of pixels P(i+1, j) and P(i+1, j+1) in the horizontal direction, where pixel R1 is a virtual pixel positioned at the same horizontal position (position in the x-axis direction) as the target pixel Q and at the same vertical position (position in the y-axis direction) as pixels P(i, j) and P(i, j+1), and pixel R2 is a virtual pixel positioned at the same horizontal position (position in the x-axis direction) as the target pixel Q and at the same vertical position (position in the y-axis direction) as pixels P(i+1, j) and P(i+1, j+1). The pixel data of the target pixel Q are calculated through performing linear interpolation of the pixel data of pixels R1 and R2 in the vertical direction. It should be noted that, although FIG. 3 illustrates the calculation procedure in which the linear interpolation in the vertical direction follows the linear interpolation in the horizontal direction, the order may be reversed. In an actual implementation, a calculation in which linear interpolations in the horizontal and vertical directions may be performed at the same time.

Referring back to FIGS. 1 and 2, when an image is enlarged, some of the pixels of the enlarged image may be positioned outward from the outermost pixels of the original image. In the example of FIG. 2, the outermost pixels Q of the enlarged image (pixels Q(0, 0), Q(0, 1), Q(0, 2) . . . and Q(1, 0), Q(2, 0) . . . in FIG. 2) are positioned outward from the outermost pixels P of the original image. In this case, pixel data of pixels Q of the enlarged image which are positioned outward from the outermost pixels P of the original image are determined through virtually generating copy pixels which are copies of the outermost pixels P of the input image and have the same pixel data, and performing linear interpolation on the pixel data of the outermost pixels P and the copy pixels.

In FIG. 2, for example, pixel data of the leftmost pixels Q(1, 0), Q(2, 0) . . . of the enlarged image are calculated by linear interpolation of the four closest pixels selected from the leftmost pixels P(0, 0), P(1, 0), P(2, 0) . . . of the original image and the copy pixels P(0, −1), P(1, −1), P(2, −1) thereof. Note that pixel data of the copy pixels P(0, −1), P(1, —1), P(2, −1) are identical to those of the leftmost pixels P(0, 0), P(1, 0), P(2, 0) of the original image, respectively. Pixel data of pixels of the enlarged image which are positioned outward from the pixels at the corner of the original image in both of the horizontal and vertical directions are calculated through interpolation of pixel data of the pixels at the corner of the original image and pixel data of the copy pixels thereof; note that the result is that pixel data of the pixels at the corner of the enlarged image are identical to pixel data of the pixels at the corner of the original image. As illustrated in FIG. 2, for example, pixel data of pixel Q(0, 0), which are positioned at the upper left corner of the enlarged image, is calculated through linear interpolation of pixel data of pixel P(0, 0) at the upper left corner of the original image and pixel data of copy pixels P(−1, −1), P(−1, 0) and P(0, −1) of the pixel (0, 0).

As described above, since the amount of pixel data to be processed has been increased in recent years, a configuration in which image scaling is divisionally achieved with multiple image processing units may be used. In this case, the simplest scheme for achieving image scaling is to divide the original image into multiple divisional images and feeding pixel data of the respective divisional images to the multiple image processing units, to thereby perform image scaling in the respective image processing units. This approach, however, may cause unnatural discontinuity in a display image. In the following, as one example, a discussion is given of a problem which may occur in the case when the original image is divided into two divisional images and image scaling is individually performed on pixel data of the two divisional images by first and second scaler circuits, respectively.

Figure 4:
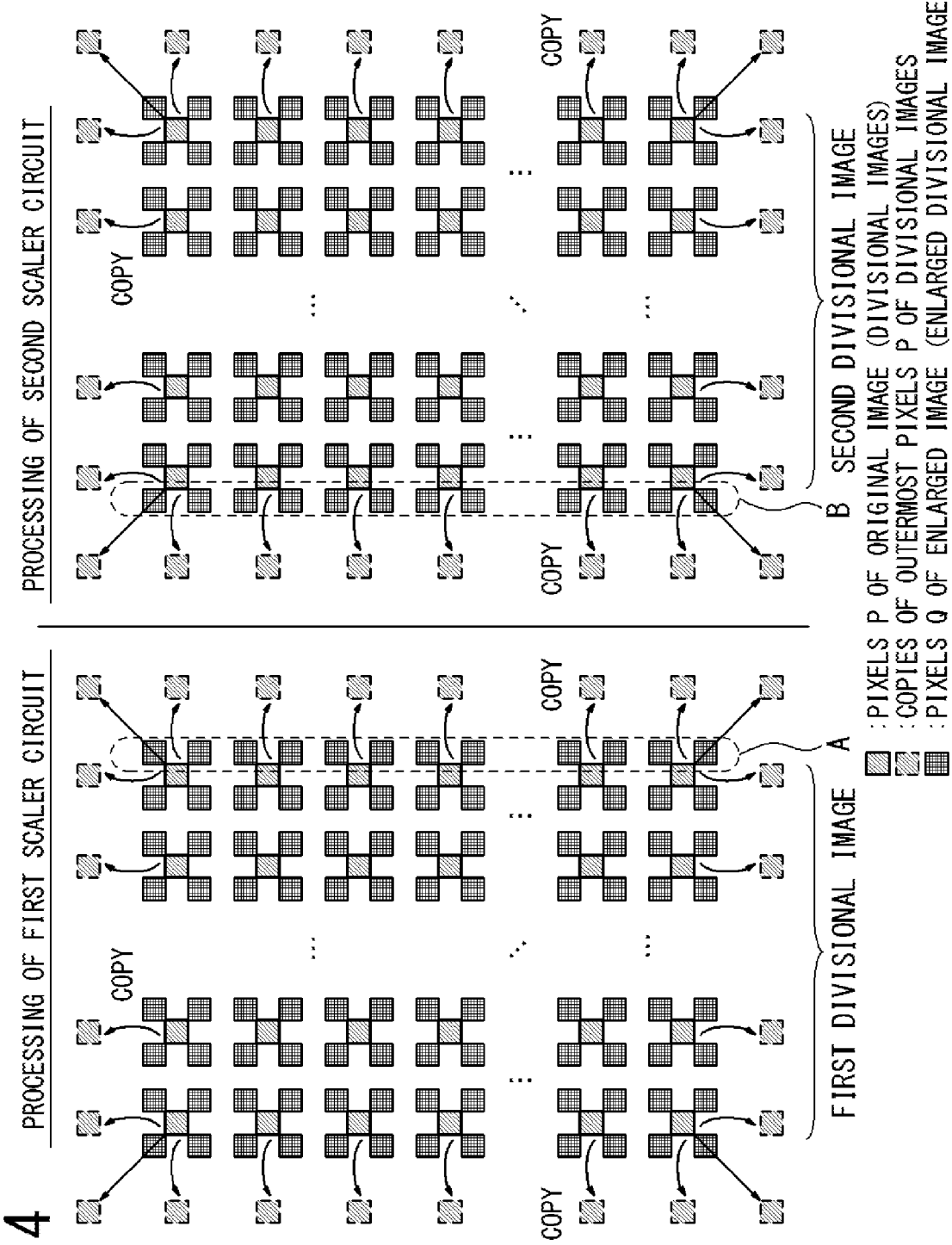
FIG. 4 illustrates one example of image scaling with an enlargement factor of two in which image scaling is individually performed by the first and second scaler circuits on pixel data of first and second divisional images obtained by dividing the original image, respectively.

FIG. 4 illustrates one example in which image scaling with an enlargement factor of two is individually performed by the first and second scaler circuits on pixel data of first and second divisional images obtained by dividing the original image, respectively. The first scaler circuit performs image scaling processing on pixel data of the first divisional image and the second scaler circuit performs image scaling processing on pixel data of the second divisional image. In the following, the enlarged image obtained from the first divisional image through image scaling processing by the first scaler circuit may be referred to as the first enlarged divisional image and the enlarged image obtained from the second divisional image through image scaling processing by the second scaler circuit may be referred to as the second enlarged divisional image. The first and second enlarged divisional images are displayed adjacently to each other on the display panel.

When the image scaling for image enlargement is individually performed in the first and second scaler circuits, the positions of certain pixels of the first and second enlarged divisional images are determined so that the certain pixels of the first and second enlarged divisional images are positioned outward from the outermost pixels of the first and second divisional images, respectively, in the first and second scaler circuits. Therefore, pixel data of the pixels of the first enlarged divisional image positioned outward from the outermost pixels of the first divisional image are calculated by the first scaler circuit from pixel data of the outermost pixels of the first divisional image and the copy pixels thereof and pixel data of the pixels of the second enlarged divisional image positioned outward from the outermost pixels of the second divisional image are calculated by the second scaler circuit from pixel data of the outermost pixels of the second divisional image and the copy pixels thereof.

According to a study of the inventors, such image scaling may cause unnatural discontinuity at the boundary between the first and second enlarged divisional images. An issue is that pixel data of the pixels adjacent to the boundary between the first and second enlarged divisional images are calculated from different pixel data. Referring to FIG. 4, pixel data of the pixels of the first enlarged divisional image which are adjacent to the boundary with the second enlarged divisional image (the pixels in the broken-lined area A in FIG. 4) are calculated from pixel data of the pixels of the first divisional image which are adjacent to the boundary with the second divisional image and pixel data of the copy pixels thereof. In the meantime, pixel data of the pixels of the second enlarged divisional image which are adjacent to the boundary with the first enlarged divisional image (the pixels in the broken-lined area B in FIG. 4) are calculated from pixel data of the pixels of the second divisional image which are adjacent to the boundary with the first divisional image and pixel data of the copy pixels thereof. Such difference in the pixel data may cause unnatural discontinuity of the display image.

Figure 5:
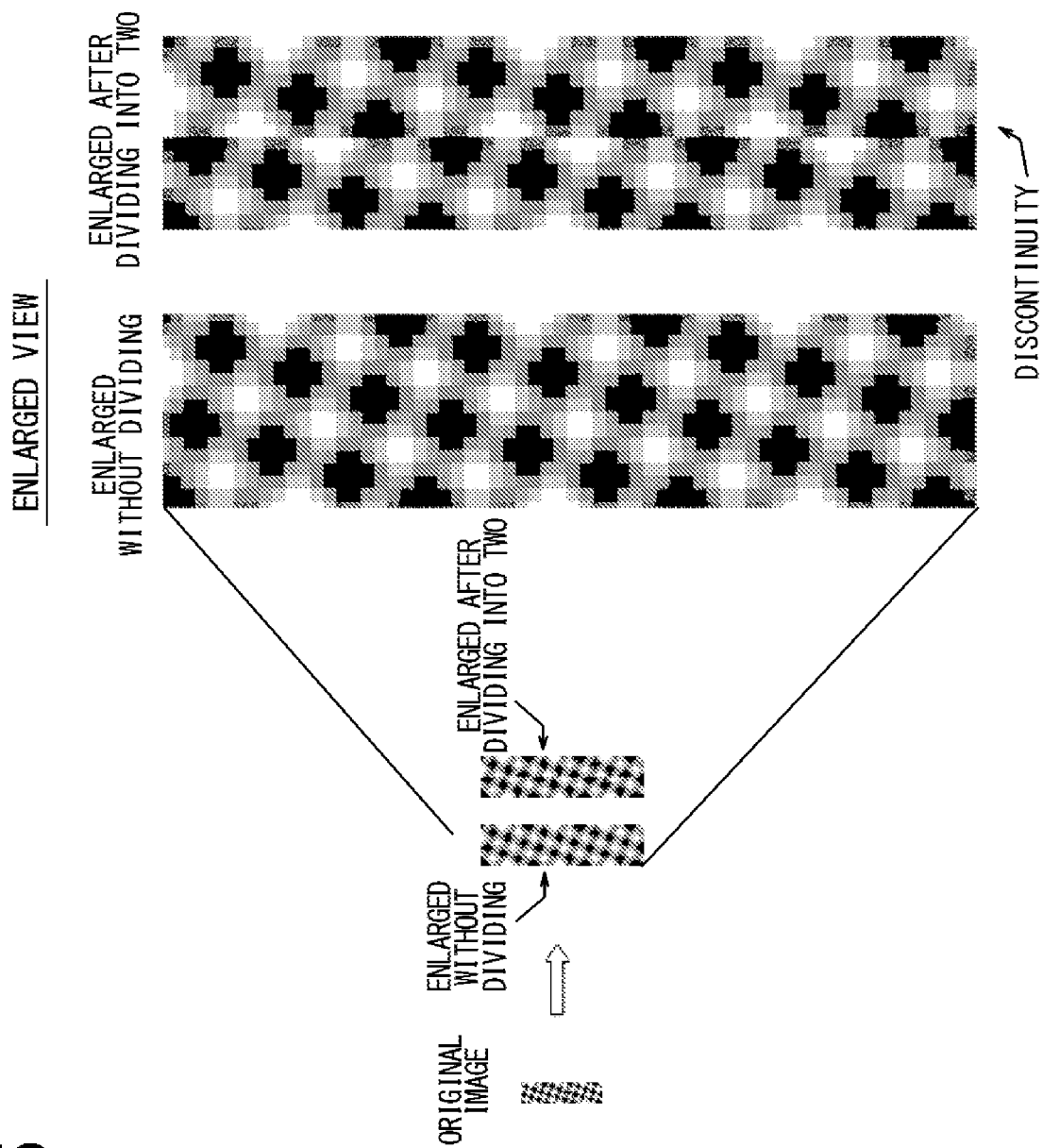
FIG. 5 is an example of discontinuity of a display image which may occur in the case when image scaling processing illustrated in FIG. 4 is performed.

FIG. 5 is an example of discontinuity of a display image which may occur in the case when image scaling processing is individually performed on first and second divisional images obtained by dividing an original image by first and second scaler circuits as illustrated in FIG. 4. The left section of FIG. 5 illustrates the original image and the center section illustrates an enlarged image obtained by image scaling without dividing the original image and an enlarged image obtained by image scaling with the original image divided into two divisional images. The right section of FIG. 5 illustrates enlarged views of the two enlarged images. It would be understood especially from the enlarged view that unnatural discontinuity occurs in the display image when image scaling is performed on the divisional images obtained by dividing the original image.

As is discussed below in detail, in image scaling according to an embodiment of the present disclosure, a beneficial approach is used to address the problem of discontinuity of the display image.

Figure 6A:
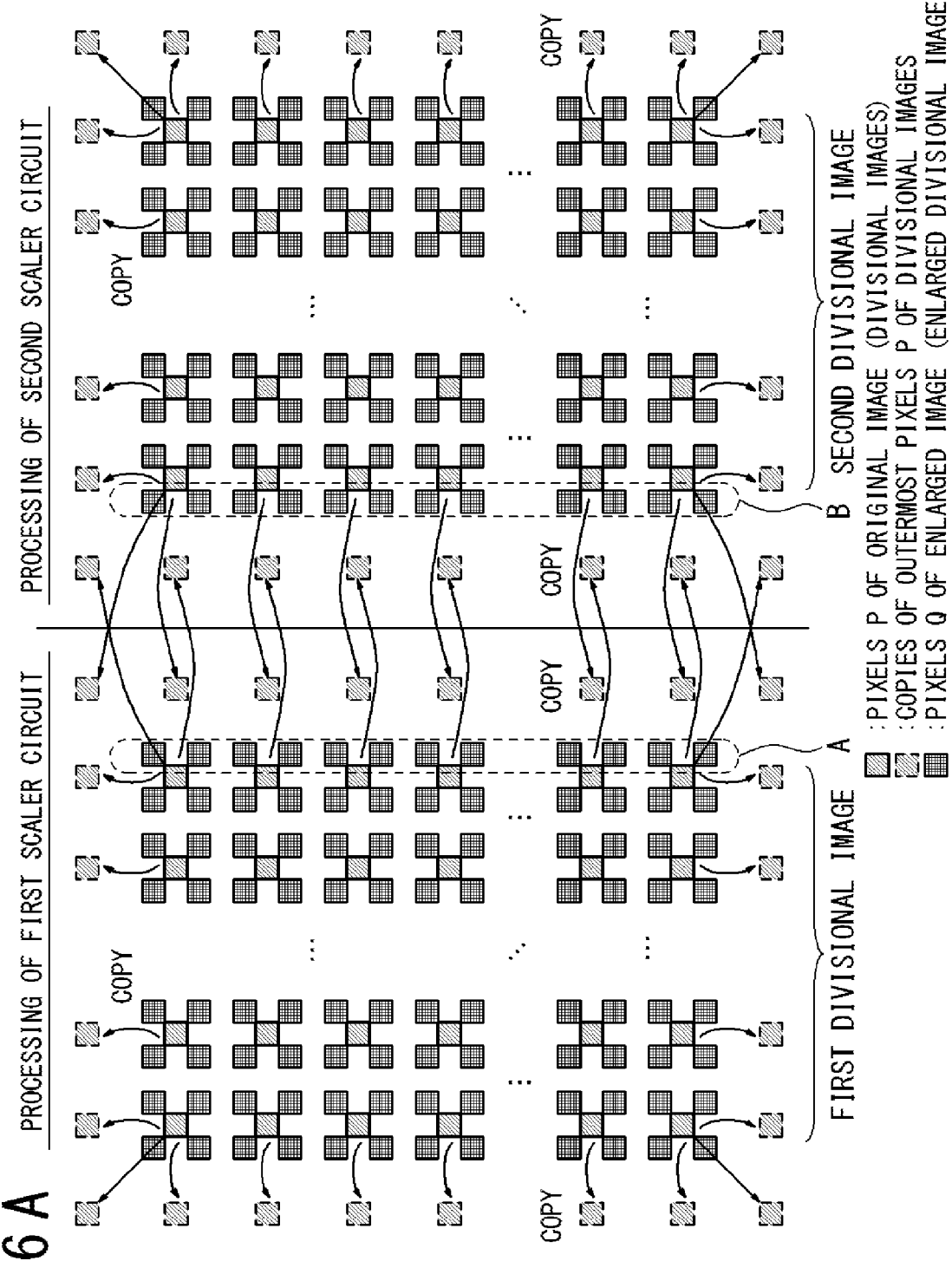
FIG. 6A is a conceptual diagram illustrating image scaling processing of the present embodiment.

FIGS. 6A and 6B are conceptual diagrams illustrating image scaling processing of the present embodiment. Referring to FIG. 6A, in image scaling of the present embodiment, pixel data of the pixels of the first enlarged divisional image adjacent to the boundary with the second enlarged divisional image (the pixels in the broken-lined area A in FIG. 6A) are calculated from pixel data of the pixels of the first divisional image adjacent to the boundary with the second divisional image and pixel data of copy pixels of the pixels of the second divisional image adjacent to the boundary with the first divisional image. Similarly, pixel data of the pixels of the second enlarged divisional image adjacent to the boundary with the first enlarged divisional image (the pixels in the broken-lined area B in FIG. 6A) are calculated from pixel data of the pixels of the second divisional image adjacent to the boundary with the first divisional image and pixel data of copy pixels of the pixels of the first divisional image adjacent to the boundary with the second divisional image. To perform such processing, the first scaler circuit is fed with pixel data of the first divisional image and further with pixel data of the pixels of the second divisional image adjacent to boundary with the first divisional image. Similarly, the second scaler circuit is fed with pixel data of the second divisional image and further with pixel data of the pixels of the first divisional image adjacent to boundary with the second divisional image.

FIG. 6B illustrates details of the calculation of pixel data of pixels of the enlarged image adjacent to the boundary between the first and second enlarged divisional images, in image scaling of the present embodiment. As described above, in image enlargement, some of pixels of each enlarged divisional images are determined as being positioned outward from the outermost pixels of each divisional image. In the example illustrated in FIG. 6B, the outermost pixels $Q_1(0, 2m-2)$ to $Q_1(0, 2m+1)$ and $Q_1(0, 2m+1)$ to $Q_1(4, 2m+1)$ of the first enlarged divisional image are positioned outward from the outmost pixels $P_1$ of the first divisional image of the original image, where $m=(M/2)-1$, M being the number of the pixels of the original image arrayed in the horizontal direction (the x-direction). Similarly, the outermost pixels $Q_2(0, 0)$ to $Q_2(0, 3)$ and $Q_2(0, 0)$ to $Q_2(4, 0)$ of the second enlarged divisional image are positioned outward from the outmost pixels $P_2$ of the second divisional image of the original image.

Pixel data of the outermost pixels $Q_1(0, 2m+1)$ to $Q_1(4, 2m+1)$ of the first enlarged divisional image which are adjacent to the boundary with the second enlarged divisional image are calculated through linear interpolation of pixel data of pixels $P_1(0, m)$ to $P_1(2, m)$ of the first divisional image which are adjacent to the boundary with the second divisional image and pixel data of copy pixels $P_1(0, m+1)$ to $P_1(2, m+1)$ of pixels $P_2$ of the second divisional image adjacent to the boundary with the first divisional image. It should be noted that the pixel data of copy pixels $P_1(0, m+1)$ to $P_1(2, m+1)$ are identical to those of pixels $P_2(0, 0)$ to $P_2(2, 0)$ of the second divisional image, respectively. For example, pixel data of the outermost pixel $Q_1(1, 2m+1)$ of the first enlarged divisional image are calculated through linear interpolation of pixel data of pixels $P_1(0, m)$ and $P_1(1, m)$ of the first divisional image and pixel data of copy pixels $P_1(0, m+1)$ and $P_1(1, m+1)$ (that is, the pixel data of the outermost pixels $P_2(0, 0)$ and $P_2(1, 0)$ of the second divisional image).

It should be noted that, since pixel $Q_1(0, 2m+1)$ positioned at the upper right corner of the first enlarged divisional image is positioned outward from the outermost pixels $P_1$ of the first divisional image in both of the vertical and horizontal directions, pixel data of pixel $Q_1(0, 2m+1)$ are calculated through linear interpolation of pixel data of pixel $P_1(0, m)$ of the first divisional image, pixel data of copy pixel $P_1(-1, m)$ of pixel $P_1(0, m)$ and pixel data of copy pixels $P_1(-1, m+1)$ and $P_1(0, m+1)$ of the outermost pixel $P_2(0, 0)$ of the second divisional image.

Similarly, Pixel data of the outermost pixels $Q_2(0, 0)$ to $Q_2(4, 0)$ of the second enlarged divisional image which are adjacent to the boundary with the first enlarged divisional image are calculated through linear interpolation of pixel data of pixels $P_2(0, 0)$ to $P_2(2, 0)$ of the second divisional image which are adjacent to the first divisional image and pixel data of copy pixels $P_2(0, -1)$ to $P_2(2, -1)$ of pixels $P_1$ of the first divisional image which are adjacent to the boundary with the second divisional image. It should be noted that the pixel data of the copy pixels $P_2(0, -1)$ to $P_2(2, -1)$ are identical to those of pixels $P_1(0, m)$ to $P_1(2, m)$ of the first divisional image, respectively. For example, pixel data of the outermost pixel $Q_2(1, 0)$ of the second enlarged divisional image are calculated through linear interpolation of pixel data of pixels $P_2(0, 0)$ and $P_2(1, 0)$ of the second divisional image and pixel data of copy pixels $P_2(0, -1)$ and $P_2(1, -1)$ (that is, the pixel data of the outermost pixels $P_1(0, m)$ and $P_1(1, m)$ of the first divisional image).

It should be noted that, since pixel $Q_2(0, 0)$ positioned at the upper left corner of the second enlarged divisional image is positioned outward from the outermost pixels $P_2$ of the second divisional image in both of the vertical and horizontal directions, pixel data of pixel $Q_2(0, 0)$ are calculated through linear interpolation of pixel data of pixel $P_2(0, 0)$ of the second divisional image, pixel data of copy pixel $P_2(-1, 0)$ of pixel $P_2(0, 0)$ and pixel data of copy pixels $P_2(-1, -1)$ and $P_2(0, -1)$ of the outermost pixel $P_1(0, m)$ of the first divisional image.

Such image scaling effectively suppresses occurrence of unnatural discontinuity in the display image, obtaining the same enlarged image as in the case when the original image is not divided. Although the above-described embodiment recites image processing in which two divisional images obtained by dividing the original image are processed by two scaler circuits, the technique disclosed in the above-described embodiment is applicable to the case when the original image is divided into three or more divisional images. In this case, the technique disclosed in the above-described embodiment is applied to each boundary between adjacent divisional images.

In the following, a description is given of embodiments of an exemplary hardware configuration for achieving the image scaling illustrated in FIGS. 6A and 6B.

Figure 7:
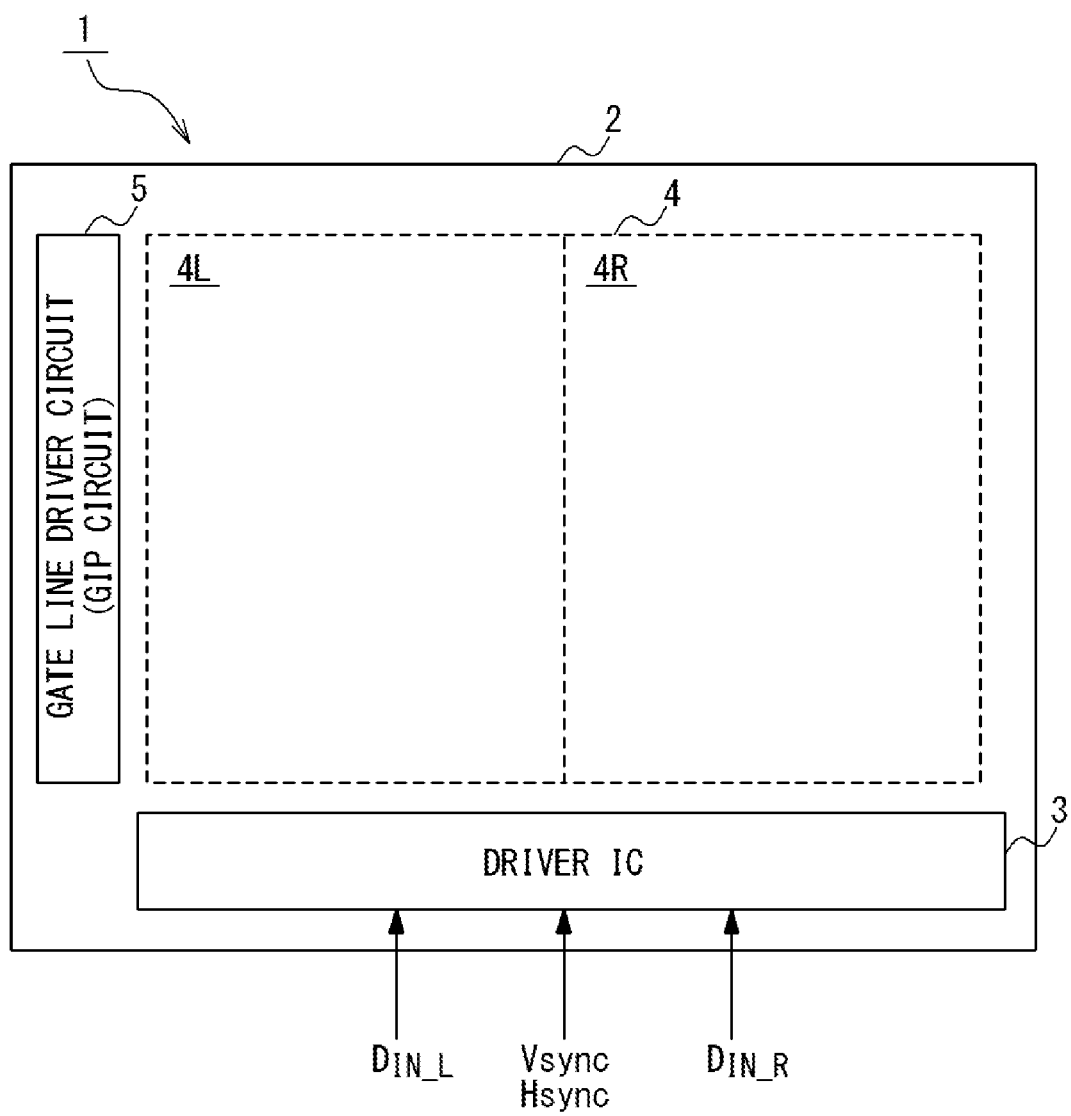
FIG. 7 is a block diagram illustrating an exemplary configuration of a display device in one embodiment of the present disclosure.

FIG. 7 is a block diagram illustrating an exemplary configuration of a display device in one embodiment of the present disclosure. The display device of the present disclosure, which is configured as a liquid crystal display device 1, includes a liquid crystal display panel 2 and a driver IC (integrated circuit) 3.

Figure 8:
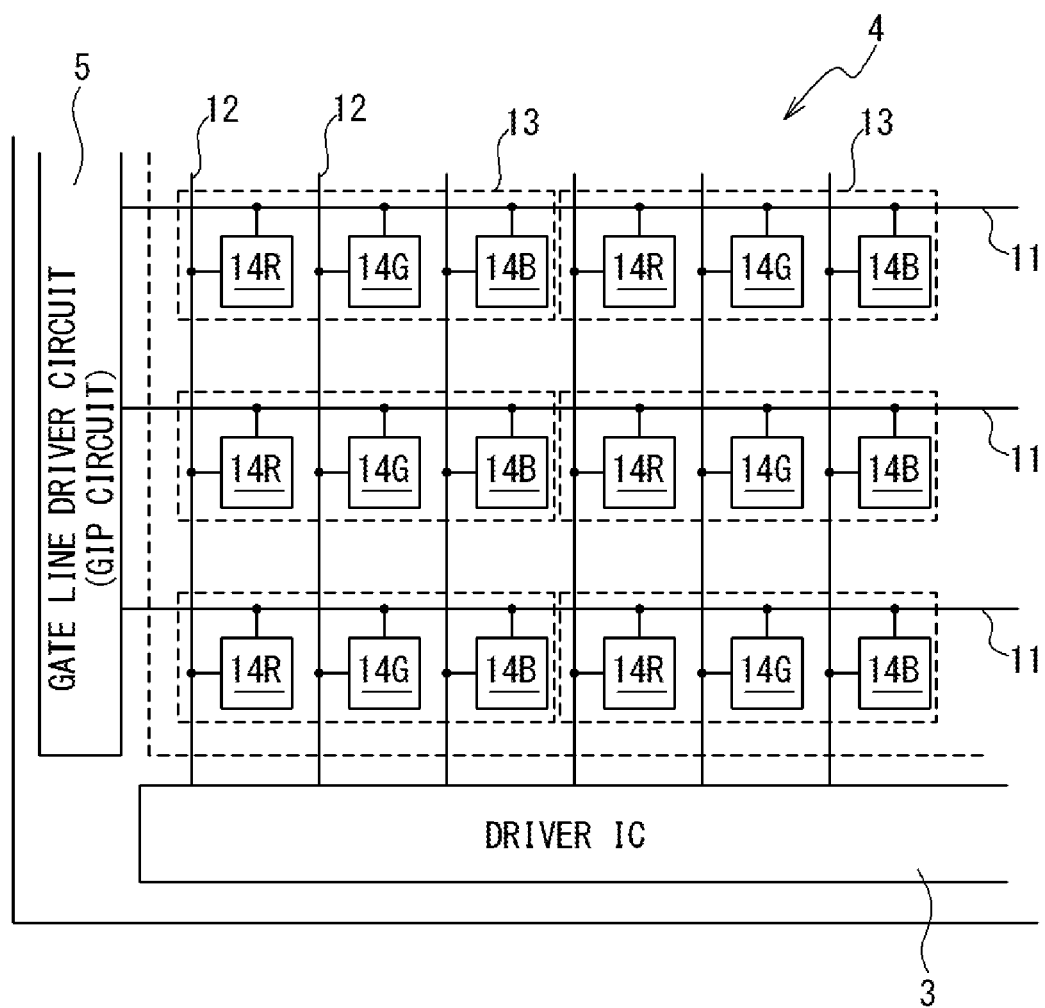
FIG. 8 illustrates an exemplary configuration of a display region of a liquid crystal display panel in the present embodiment.

The liquid crystal display panel 2 includes a display region 4 and a gate line driver circuit 5 (also referred to as GIP (gate-in-panel) circuit). Arranged in the display region 4 are, as illustrated in FIG. 8, a plurality of gate lines 11 (also referred to as scan lines or address lines), a plurality of source lines 12 (also referred to as signal lines or data lines) and pixels 13. In the present embodiment, each pixel 13 include an R subpixel 14R displaying the red color (R), a G subpixel 14G displaying the green color (G) and a B subpixel 14B displaying the blue color (B). The R, G and B subpixels 14R, 14G and 14B of each pixel 13 are connected to the same gate line 11 and also connected to different source lines 12. It would be apparent to a person skilled in the art that the configuration of each pixel 13 (such as the arrangement of the R, G and B subpixels 14R, 14G and 14B) may be variously modified. In the following, the horizontal direction of the display region 4, that is, the direction in which the gate lines 11 are extended may be referred to as the x-axis direction and the vertical direction of the display region 4, that is, the direction in which the source lines 12 are extended may be referred to as the y-axis direction. The gate line driver circuit 5 successively drives the gate lines 11. In driving the pixels 13 of the liquid crystal display panel 2, the gate lines 11 are successively selected and desired analog drive voltages are written into the subpixels (the R, G and B subpixels 14R, 14G and 14B) connected to the selected gate line 11 through the source lines 12. This allows setting the respective subpixels to desired grayscale levels, and thereby a desired image is displayed in the display region 4 of the liquid crystal display panel 2.

Referring back to FIG. 7, the driver IC 3 drives the source lines 12 of the display region 4 in response to pixel data externally fed to the driver IC (typically, from a processing unit). In the present embodiment, the driver IC 3 adopts a two-port configuration; pixel data corresponding to an image displayed in the left region (first region) 4L of the display region 4 and pixel data corresponding to an image displayed in the right region (second region) 4R of the display region 4 are fed to the driver IC 3 on the different ports. In the following, among pixel data of the original image fed to the driver IC 3, pixel data corresponding to the image to be displayed in the left region 4L may be referred to as "left image pixel data $D_{IN\_L}$" and pixel data corresponding to the image to be displayed in the right region 4R may be referred to as "right image pixel data $D_{IN\_R}$". In other words, the left image pixel data $D_{IN\_L}$ are pixel data of the left divisional image of the two divisional images obtained by dividing the original image and the right image pixel data $D_{IN\_R}$ are pixel data of the right divisional image. The configuration in which a driver IC externally receives pixel data on multiple ports as described above is often used for a driver IC driving a liquid crystal display panel with an increased number of pixels. The driver IC 3 drives the source lines 12 in synchronization with timing control signals externally fed to the driver IC 3, more specifically, a vertical sync signal Vsync and a horizontal sync signal Hsync. The driver IC 3 is mounted on the liquid crystal display panel 2 with a surface mounting technology, such as a COG (chip-on-glass) technology.

Figure 9:
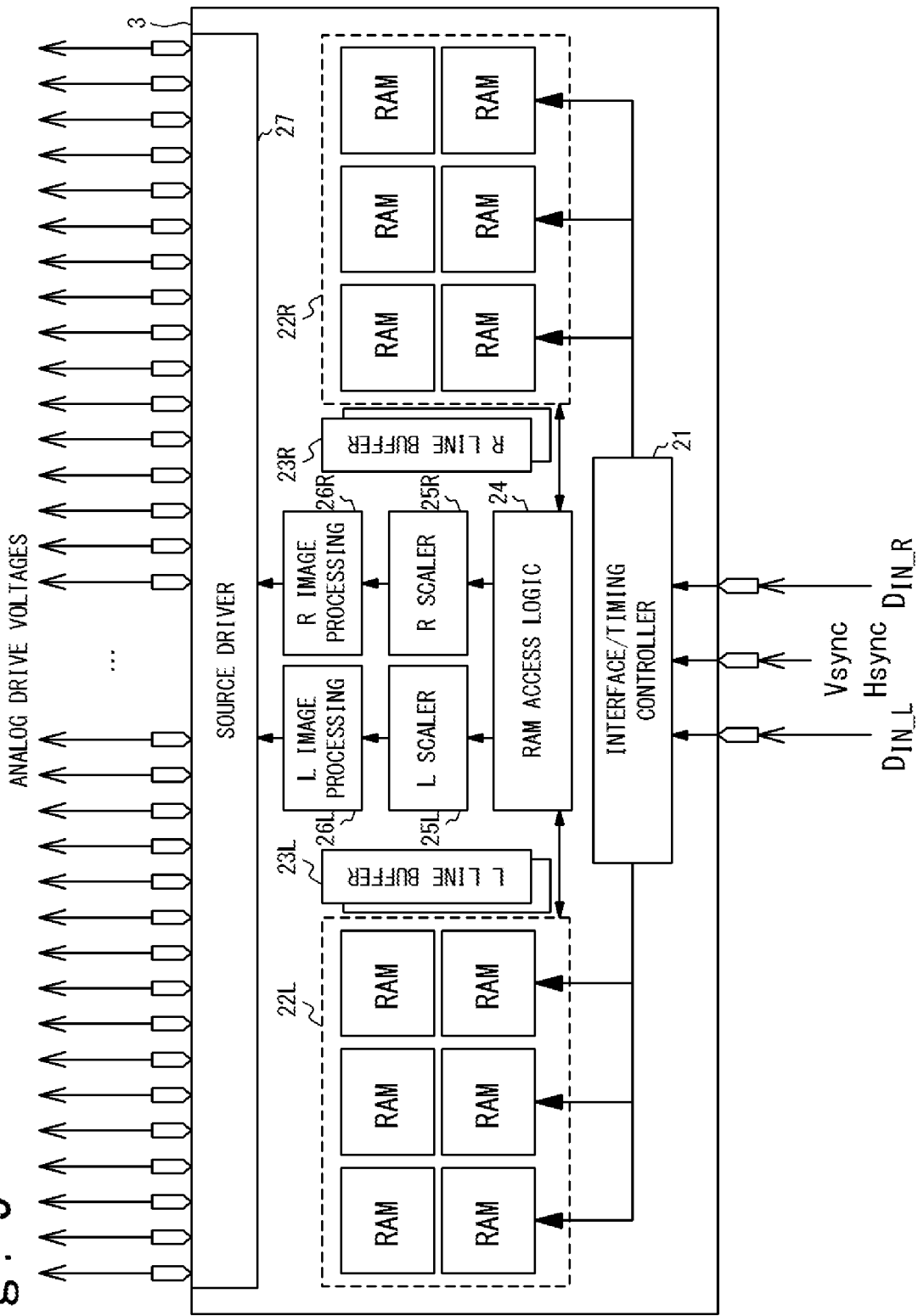
FIG. 9 is a block diagram illustrating one example of the configuration of a driver IC in the present embodiment.

FIG. 9 illustrates one example of the configuration of the driver IC 3 in the present embodiment. In the present embodiment, the driver IC 3 includes: an interface/timing controller 21, an LRAM (left RAM) 22L, an RRAM (right RAM) 22R, a left line buffer section 23L, a right line buffer section 23R, a RAM access logic circuit 24, a left scaler circuit 25L, a right scaler circuit 25R, a left image processing circuit 26L, a right image processing circuit 26R, and a source driver circuit 27.

The interface/timing controller 21, the LRAM 22L, the RRAM 22R, the left line buffer section 23L, the right line buffer section 23R and the RAM access logic circuit 24 form a pixel data feeding section which feeds pixel data to the left scaler circuit 25L and the right scaler circuit 25R.

In detail, the interface/timing controller 21 forwards the left image pixel data $D_{IN\_L}$ to the LRAM 22L and the right image pixel data $D_{IN\_R}$ to the RRAM 22R. The interface/timing controller 21 further controls the operation timing of the driver IC 3 in synchronization with the vertical sync signal Vsync and the horizontal sync signal Hsync.

The LRAM 22L stores therein the left image pixel data $D_{IN\_L}$ (the pixel data corresponding to the image displayed in the left region 4L) and the RRAM 22R stores therein the right image pixel data $D_{IN\_R}$ (the pixel data corresponding to the image displayed in the right region 4R). In the present embodiment, in total, the LRAM 22L and RRAM 22R have a capacity sufficient to store pixel data corresponding to one frame image (an image displayed in the display region 4 in each frame period (each vertical sync period)).

The left line buffer section 23L is used to temporally store the left image pixel data $D_{IN\_L}$ read out from the LRAM 22L and the right line buffer section 23R is used to temporally store the right image pixel data $D_{IN\_R}$ read out from the RRAM 22R. In the present embodiment, the left line buffer section 23L has a capacity sufficient to store left image pixel data $D_{IN\_L}$ corresponding to pixels 13 of two horizontal lines (pixels 13 connected to two gate lines 11) in the left region 4L of the display region 4. Similarly, the right line buffer section 23R has a capacity sufficient to store right image pixel data $D_{IN\_R}$ corresponding to pixels 13 of two horizontal lines (pixels 13 connected to two gate lines 11) in the right region 4R of the display region 4. As described later, the left line buffer section 23L and the right line buffer section 23R are used as work areas for forwarding the left image pixel data $D_{IN\_L}$ and the right image pixel data $D_{IN\_R}$ from the RAM access logic circuit 24 to the left scaler circuit 25L and the right scaler circuit 25R in a proper order.

The RAM access logic circuit 24 forwards the left image pixel data $D_{IN\_L}$ read out from the LRAM 22L to the left scaler circuit 25L and also forwards the right image pixel data $D_{IN\_R}$ read out from the RRAM 22R to the right scaler circuit 25R. Additionally, the RAM access logic circuit 24 has the function of forwarding first boundary pixel data extracted from the left image pixel data $D_{IN\_L}$ (that is, the pixel data of the left divisional image) to the right scaler circuit 25R, where the first boundary pixel data are pixel data of pixels of the left divisional image adjacent to the boundary with the right divisional image. Furthermore, the RAM access logic circuit 24 has the function of forwarding second boundary pixel data extracted from the right image pixel data $D_{IN\_R}$ (that is, the pixel data of the right divisional image) to the left scaler circuit 25L, where the second boundary pixel data are pixel data of pixels of the right divisional image adjacent to the boundary with the left divisional image. These functions are useful to achieve the above-described image scaling illustrated in FIG. 6.

The left scaler circuit 25L generates enlarged image pixel data by performing image scaling (in this embodiment, image enlargement) on the pixel data received from the RAM access logic circuit 24 and the left image processing circuit 26L generates output pixel data by performing predetermined image processing on the enlarged image pixel data obtained by the image scaling in the left scaler circuit 25L. The output pixel data output from the left image processing circuit 26L are used to drive the pixels 13 positioned in the left region 4L of the display region 4. The left scaler circuit 25L and the left image processing circuit 26L form a first image processing unit which generates pixel data of an image displayed in the left region 4L of the display region 4 from the pixel data received from the RAM access logic circuit 24, as a whole. In the present embodiment, the left scaler circuit 25L performs the above-described bilinear image scaling.

Similarly, the right scaler circuit 25R generates enlarged image pixel data by performing image scaling on the pixel data received from the RAM access logic circuit 24 and the right image processing circuit 26R generates output pixel data by performing predetermined image processing on the enlarged image pixel data obtained by the image scaling in the right scaler circuit 25R. The output pixel data output from the right image processing circuit 26R are used to drive the pixels 13 positioned in the right region 4R of the display region 4. The right scaler circuit 25R and the right image processing circuit 26R form a second image processing unit which generates pixel data of an image displayed in the right region 4R of the display region 4 from the pixel data received from the RAM access logic circuit 24, as a whole. In the present embodiment, the right scaler circuit 25R performs the above-described bilinear image scaling.

Examples of the image processing performed in the left image processing circuit 26L and the right image processing circuit 26R include edge enhancement. Since an edge-blurred image may be obtained by bilinear image scaling in general, it is preferable for obtaining a sharp image that edge enhancement is performed by the left image processing circuit 26L and the right image processing circuit 26R.

It should be noted that an image displayed in the display region 4, which is obtained by performing image enlargement on the original image (the image corresponding to the left image pixel data $D_{IN\_L}$ and the right image pixel data $D_{IN\_R}$), may be referred to as "enlarged image". Also, an image displayed in the left region 4L may be referred to as left enlarged divisional image and an image displayed in the right region 4R may be referred to as right enlarged divisional image.

In the present embodiment, the left scaler circuit 25L performs the image scaling processing of the first scaler circuit illustrated in FIGS. 6A and 6B and the right scaler circuit 25R performs the image scaling processing of the second scaler circuit illustrated in FIGS. 6A and 6B. In other words, the left scaler circuit 25L generates pixel data used to drive pixels 13 positioned in a portion of the left region 4L adjacent to the boundary with the right region 4R through linear interpolation of pixel data of pixels of the left divisional image of the original image adjacent to the boundary with the right divisional image (that is, first boundary pixel data) and pixel data of pixels of the right divisional image adjacent to the boundary with the left divisional image (that is, second boundary pixel data). Similarly, the right scaler circuit 25R generates pixel data used to drive pixels 13 positioned in a portion of the right region 4R adjacent to the boundary with the left region 4L through linear interpolation of pixel data of pixels of the right divisional image of the original image adjacent to the boundary with the left divisional image (that is, second boundary pixel data) and pixel data of pixels of the left divisional image adjacent to the boundary with the right divisional image (that is, first boundary pixel data).

The source driver circuit 27 operates as a driver section which drives the pixels 13 of the display region 4 in response to the output pixel data received from the left image processing circuit 26L and the right image processing circuit 26R. In detail, the source driver circuit 27 drives the pixels 13 in the left region 4L of the display region 4 in response to the output pixel data received from the left image processing circuit 26L and drives the pixels 13 in the right region 4R of the display region 4 in response to the output pixel data received from the right image processing circuit 26R.

Figure 10:
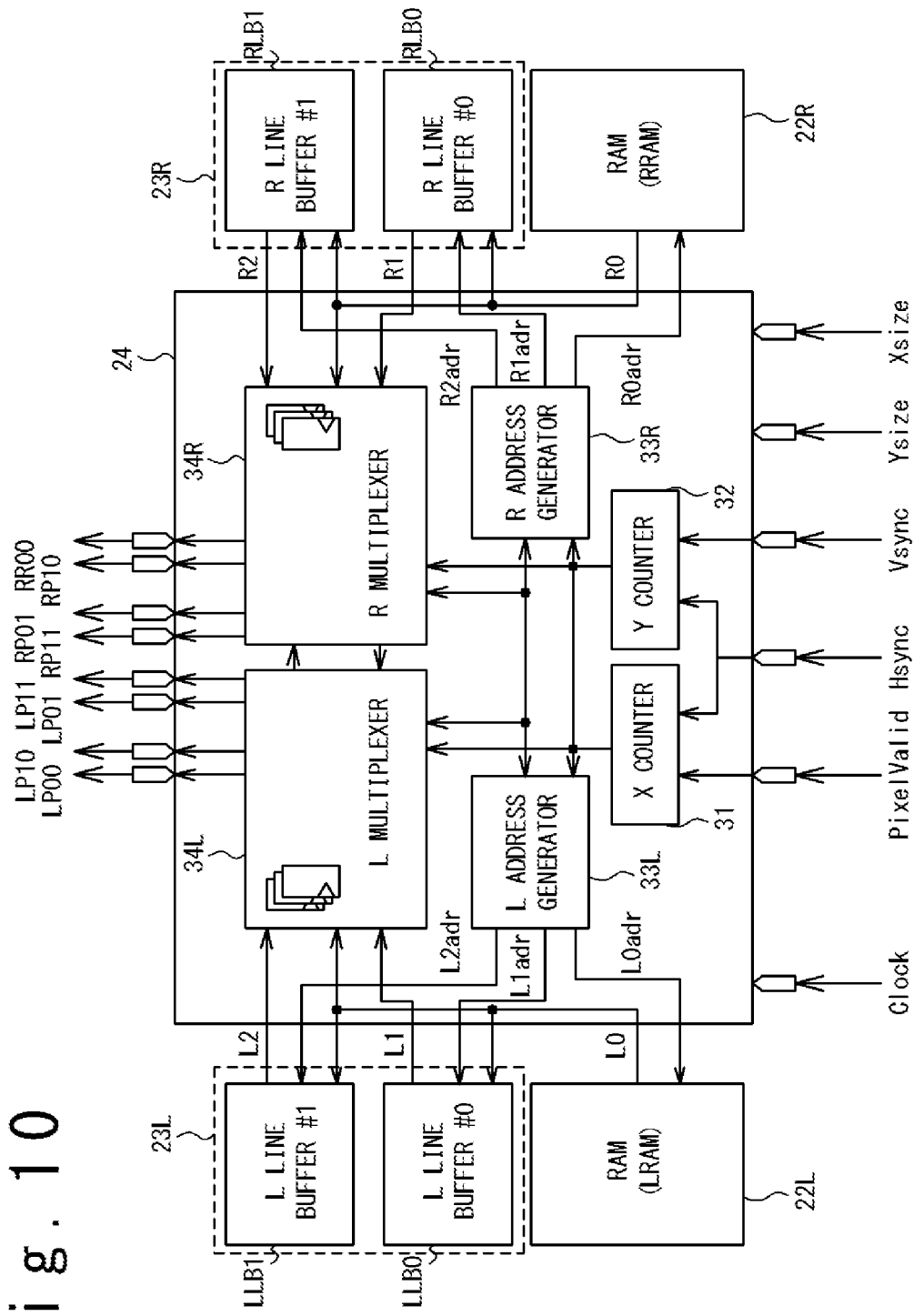
FIG. 10 is a block diagram illustrating one example of the configurations of line buffer sections and a RAM access logic circuit.

FIG. 10 is a block diagram illustrating one example of the configurations of the left line buffer section 23L, the right line buffer section 23R and the RAM access logic circuit 24.

In the present embodiment, the left line buffer section 23L includes two line buffers LLB0 and LLB1.

Similarly, the right line buffer section 23R includes two line buffers RLB0 and RLB1.

The RAM access logic circuit 24 includes an X counter 31, a Y counter 32, a left address generator circuit 33L, a right address generator circuit 33R, a left multiplexer circuit 34L and a right multiplexer circuit 34R.

The X counter 31 counts clock pulses of a clock signal Clock to output a count value X. The Y counter 32 counts pulses of the horizontal sync signal Hsync to output a count value Y. The count values X and Y are used to specify a target pixels of the image scaling performed in the left scaler circuit 25L and the right scaler circuit 25R, the target pixels being selected among from the pixels 13 in the left and right regions 4L and 4R of the display region 4, respectively.

The generation of the count value X by the X counter 31 is controlled on the horizontal sync signal Hsync and a pixel data valid signal PixelValid. Note that the pixel data valid signal PixelValid is asserted (in the present embodiment, set to value "0") during a period in which pixel data of the pixels 13 in the display region 4 are to be generated. It should be noted that the period during which the pixel data valid signal PixelValid is asserted is extended by one clock cycle of the clock signal Clock before and after the period during which pixel data of pixels 13 of the display region 4 are generated.

FIG. 11A is a truth table illustrating one example of the operation of the X counter 31. The X counter 31 is reset when the horizontal sync signal Hsync is asserted (in this embodiment, set to "0"). In the operation illustrated in FIG. 11A, the X counter 31 is set to "−1" when the X counter 31 is reset. When the horizontal sync signal Hsync is negated and the pixel data valid signal PixelValid is asserted, the X counter 31 counts clock pulses of the clock signal Clock to increment the count value X one by one. When both of the horizontal sync signal Hsync and the pixel data valid signal PixelValid are negated, the X counter 31 keeps the count value X unchanged.

The generation of the count value Y by the Y counter 32 is controlled on the vertical sync signal Vsync and the horizontal sync signal Hsync. FIG. 11B is a truth table illustrating an example of the operation of the Y counter 32. The Y counter 32 is reset when the vertical sync signal Vsync is asserted (in this embodiment, set to "0"). The Y counter 32 increments the counter value Y by one when the vertical sync signal Vsync is negated and the horizontal sync signal Hsync is asserted. The Y counter 32 keeps the count value Y unchanged when both of the vertical sync signal Vsync and the horizontal sync signal Hsync are negated.

FIG. 12 is a timing chart illustrating one example of the operations of the X counter 31 and the Y counter 32. The vertical sync signal Vsync is asserted at the beginning of each vertical sync period (each frame period) and thereby the count value Y of the Y counter 32 is reset to "−1". When the horizontal sync signal Hsync is then asserted to initiate the first horizontal sync period, the count value Y of the Y counter 32 is counted up to "0" and the count value X of the X counter 31 is reset to "−1". Subsequently, when the pixel data valid signal PixelValid is then asserted, the X counter 31 counts clock pulses of the clock signal Clock to increment the count value X one by one. The X counter 31 counts the clock pulses of the clock signal Clock while the pixel data valid signal PixelValid is asserted. The count value X of the X counter 31 is counted up to Xsize+1, where Xsize is the number of pixels 13 arrayed in each of the left and right regions 4L and 4R of the display region 4 in the horizontal direction (the x-axis direction).

When the horizontal sync signal Hsync is then asserted again to initiate the next horizontal sync period, the count value X of the X counter 31 is reset to "−1". The X counter 31 then counts clock pulses of the clock signal Clock until the count value X is counted up to Xsize+1, similarly to the first horizontal sync period. The same goes until the next vertical sync period is initiated.

Referring back to FIG. 10, the left address generator circuit 33L generates access requests for the LRAM 22L, the left line buffers LLB0 and LLB1 and addresses L0adr, L1adr and L2adr which specify the access destinations. The address L0adr specifies the access address of the LRAM 22L and the addresses L1adr and L2adr specify the access addresses of the left line buffers LLB0 and LLB1, respectively.

Similarly, the right address generator circuit 33R generates access requests for the RRAM 22R, the right line buffers RLB0 and RLB1 and addresses R0adr, R1adr and R2adr which specify the access destinations. The address R0adr specifies the access address of the RRAM 22R and the addresses R1adr and R2adr specify the access addresses of the right line buffers RLB0 and RLB1, respectively.

FIG. 13A is a truth table illustrating an example of the operation of the left address generator circuit 33L. The addresses L1adr and L2adr, which specify the access destinations of the left line buffers LLB0 and LLB1, are calculated on the basis of the count value X of the X counter 31. The address L0adr, which specifies the access destination of the LRAM 22L, is calculated on the basis of the count value X of the X counter 31 and the count value Y of the Y counter 32.

FIG. 13B is a truth table illustrating an example of the operation of the right address generator circuit 33R. The addresses R1adr and R2adr, which specify the access destinations of the right line buffers RLB0 and RLB1, are calculated on the basis of the count value X of the X counter 31. The address R0adr, which specifies the access destination of the RRAM 22R, is calculated on the basis of the count value X of the X counter 31 and the count value Y of the Y counter 32.

FIG. 14A is a truth table illustrating one example of the contents of the access requests generated by the left address generator circuit 33L and the right address generator circuit 33R. Both of write and read accesses may occur to the left line buffers LLB0 and LLB1. Which of write and read accesses occurs to the left line buffers LLB0 and LLB1 depends on the count value Y of the Y counter 32. The similar goes for the right line buffers RLB0 and RLB1. Which of write and read accesses occurs to the right line buffers RLB0 and RLB1 depends on the count value Y of the Y counter 32. It should be noted that "Y %4" indicates the remainder in division of the count value Y by four in FIG. 14A. That is, in the operation illustrated in FIG. 14A, the contents of the access requests for the left line buffers LLB0 and LLB1 and the right line buffers RLB0 and RLB1 are determined in response to the remainder in division of the count value Y by four. It should be noted that the RAM access logic circuit 24 does not write pixel data into the LRAM 22L and RRAM 22R, although the RAM access logic circuit 24 reads out pixel data from the LRAM 22L and RRAM 22R.

FIG. 14B is a truth table illustrating another example of the contents of the access requests generated by the left address generator circuit 33L and the right address generator circuit 33R. It should be noted that "Y %2" indicates the remainder in division of the count value Y by two in FIG. 14B. In other words, in the operation illustrated in FIG. 14B, the contents of the access requests for the left line buffers LLB0 and LLB1 and the right line buffers RLB0 and RLB1 are determined in response to the remainder in division of the count value Y by two. The operation illustrated in FIG. 14B effectively simplifies the generation logic of the access requests, although unnecessary write accesses occur which overwrite the same pixel data.

Referring back to FIG. 10, the left multiplexer circuit 34L collects pixel data to be fed to the left scaler circuit 25L from the LRAM 22L and the left line buffers LLB0 and LLB1, and forwards the collected pixel data to the left scaler circuit 25L. In FIG. 10, pixel data read out from the LRAM 22L, the left line buffers LLB0 and LLB1 are denoted by symbols "L0", "L1" and "L2", respectively. As is understood from FIG. 3, pixel data of each pixel of the enlarged image are calculated from pixel data of four pixels of the original image in the bilinear image scaling, and therefore the left multiplexer circuit 34L forwards the pixel data read out from the LRAM 22L, the left line buffers LLB0 and LLB1 to the left scaler circuit 25L in units of pixel data of four pixels. In the present embodiment, the left multiplexer circuit 34L is configured to forward pixel data LP00, LP01, LP10 and LP11 of four pixels to the left scaler circuit 25L.

Similarly, the right multiplexer circuit 34R collects pixel data to be forwarded to the right scaler circuit 25R from the RRAM 22R and the right line buffers RLB0 and RLB1, and forwards the collected pixel data to the right scaler circuit 25R. In FIG. 10, pixel data read out from the RRAM 22R, the right line buffers RLB0 and RLB1 are denoted by symbols "R0", "R1" and "R2", respectively. In the present embodiment, the right multiplexer circuit 34R is configured to forward pixel data RP00, RP01, RP10 and RP11 of four pixels to the right scaler circuit 25R.

Figure 15:
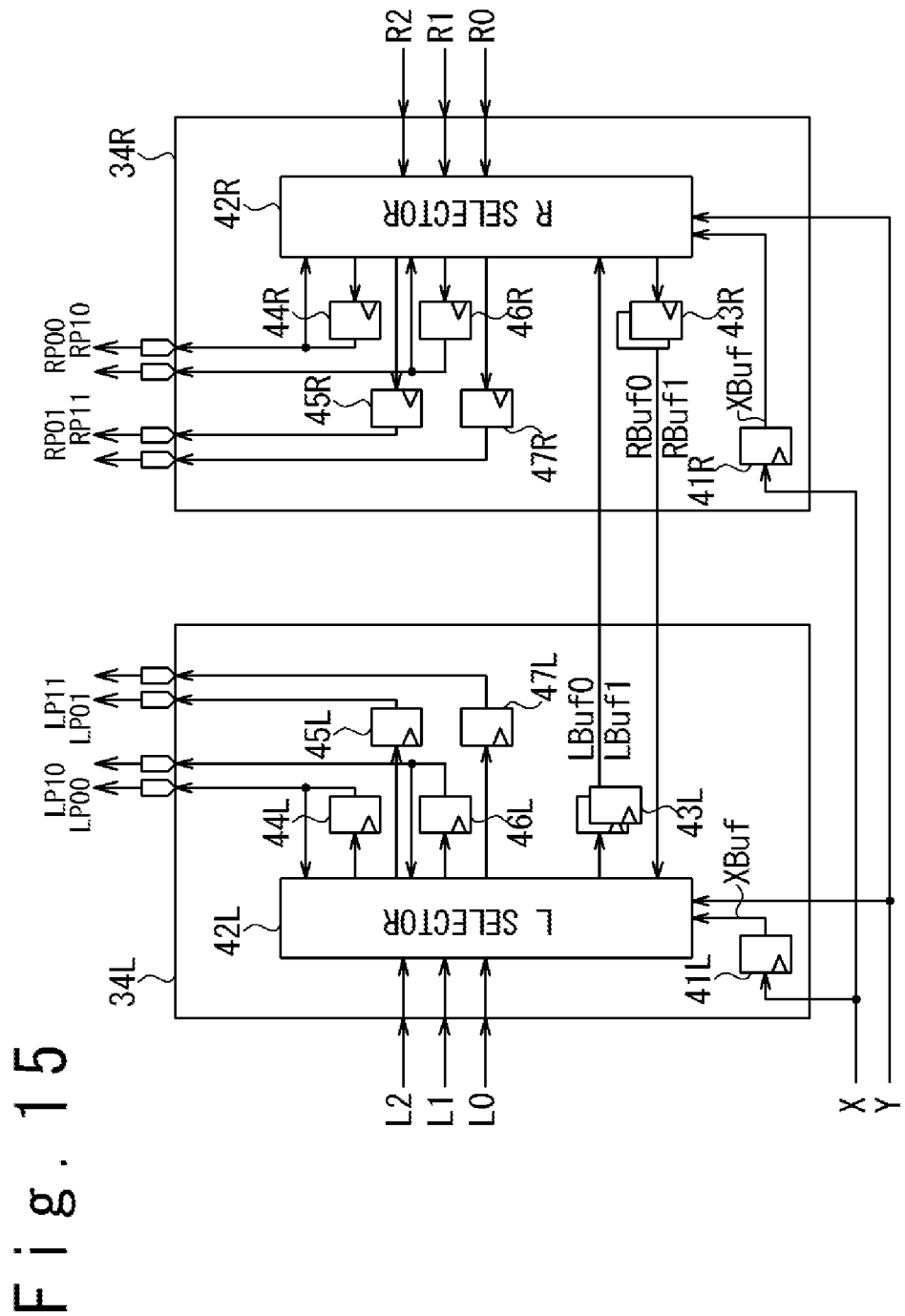
FIG. 15 is a block diagram illustrating one example of the configurations of a left multiplexer circuit and a right multiplexer circuit.

FIG. 15 is a block diagram illustrating one example of the configurations of the left multiplexer circuit 34L and the right multiplexer circuit 34R. The left multiplexer circuit 34L includes an X address flipflop 41L, a left selector 42L and pixel data flipflops 43L to 47L. Similarly, the right multiplexer circuit 34R includes an X address flipflop 41R, a right selector 42R and pixel data flipflops 43R to 47R.

The X address flipflops 41L and 41R latches the count value X from the X counter 31 and outputs the latched count value X with a delay of one clock cycle. In FIG. 15, the count values output from the X address flipflops 41L and 41R are denoted by symbol "Xbuf".

The left selector 42L has the function of selecting pixel data LP00, LP01, LP10 and LP11 to be forwarded to the left scaler circuit 25L from various pixel data fed to the left selector 42L. In addition, the left selector 42L has the function of selecting pixel data to be forwarded to the right scaler circuit 25R from various pixel data fed to the left selector 42L.

Similarly, the right selector 42R has the function of selecting pixel data RP00, RP01, RP10 and RP11 to be forwarded to the right scaler circuit 25R from various pixel data fed to the right selector 42R. In addition, the right selector 42R has the function of selecting pixel data to be forwarded to the left scaler circuit 25L from various pixel data fed to the left selector 42L. Details of the selection of pixel data by the left and right selectors 42L and 42R will be described later.

The pixel data flipflop 43L has an input connected to the left selector 42L and an output connected to the right selector 42R. The pixel data flipflop 43L operates as a latch section which temporarily stores pixel data to be transferred from the left selector 42L to the right selector 42R and outputs the stored pixel data to the right selector 42R. The pixel data flipflop 43L is used as a route through which pixel data of pixels in a portion of the left divisional image of the original image adjacent to the right divisional image (that is, boundary pixel data) are forwarded from the left selector 42L to the right scaler circuit 25R through the right selector 42R. In the present embodiment, pixel data of two pixels are output from the pixel data flipflop 43L; the pixel data of the two pixels are denoted by symbols "LBuf0" and "LBuf1" in FIG. 15.

The pixel data flipflop 43R, on the other hand, has an input connected to the right selector 42R and an output connected to the left selector 42L. The pixel data flipflop 43R operate as a latch section which temporarily stores pixel data to be transferred from the right selector 42R to the left selector 42L and outputs the stored pixel data to the left selector 42L. The pixel data flipflop 43R is used as a route through which pixel data of pixels in a portion of the right divisional image of the original image adjacent to the left divisional image (that is, boundary pixel data) are forwarded from the right selector 42R to the left scaler circuit 25L through the left selector 42L. In the present embodiment, pixel data of two pixels are output from the pixel data flipflop 43R; the pixel data of the two pixels are denoted by symbols "RBuf0" and "RBuf1" in FIG. 15.

The pixel data flipflops 44L to 47L respectively receive pixel data LP00, LP01, LP10 and LP11, which are to be forwarded to the left scaler circuit 25L, from the left selector 42L, and outputs the stored pixel data to the left selector 42L and outputs the pixel data LP00, LP01, LP10 and LP11 to the left scaler circuit 25L. Similarly, the pixel data flipflops 44R to 47R receive pixel data RP00, RP01, RP10 and RP11, which are to be forwarded to the right scaler circuit 25R, from the right selector 42R, and outputs the pixel data RP00, RP01, RP10 and RP11 to the right scaler circuit 25R.

Next, a description is given of details of the operations of the left selector 42L and the right selector 42R. The left selector 42L is fed with pixel data listed below and selects the pixel data LP00, LP01, LP10 and LP11, which are to be forwarded to the left scaler circuit 25L, and pixel data LBuf0 and LBuf1, which are to be forwarded to the right selector 42R, from among the pixel data fed to the left selector 42L:
(1) pixel data L0 received from the LRAM 22L;
(2) pixel data L1 and L2 received from the left line buffers LLB0 and LLB1;
(3) pixel data LP00 and LP10 received from the pixel data flipflops 44L and 46L; and
(4) pixel data RBuf0, RBuf1 received from the pixel data flipflop 43R of the right multiplexer circuit 34R.

Similarly, the right selector 42R is fed with pixel data listed below and selects the pixel data RP00, RP01, RP10 and RP11, which are to be forwarded to the right scaler circuit 25R, and pixel data RBuf0 and RBuf1, which are to be forwarded to the left selector 42L, from among the pixel data fed to the right selector 42R:
(1) pixel data R0 received from the RRAM 22R;
(2) pixel data R1 and R2 received from the right line buffers RLB0 and RLB1;
(3) pixel data RP00 and RP10 received from the pixel data flipflops 44R and 46R; and
(4) pixel data LBuf0 and LBuf1 received from the pixel data flipflop 43L of the left multiplexer circuit 34L.

The pixel data LP00, LP01, LP10, LP11, LBuf0 and LBuf1 are selected by the left selector 42L in response to the count value Y received from the Y counter 32 and the count value XBuf received from the X address flipflop 41L. FIGS. 16A, 17A and 18A are truth tables illustrating the operations of the left selector 42L in the case when the count value Y is zero, the case when $((Y+1)/2)\%2=1$, and the case when $((Y+1)/2)\%2=0$, respectively.

Attention should be paid to two features in the operations of the left selector 42L. One feature is that the left selector 42L selects pixel data L0 received from the LRAM 22L and pixel data L1 and L2 received from the left line buffers LLB0 and LLB1 as the pixel data LBuf0 and LBuf1, which are to be forwarded to the right selector 42R, when the count value XBuf is "−1". More specifically, when the count value Y is zero and the count value XBuf is "−1", the pixel data L0 received from the LRAM 22L are selected as the pixel data LBuf0 and LBuf1 to be forwarded to the right selector 42R. When it holds $((Y+1)/2)\%2=1$ and the count value XBuf is "−1", the pixel data L1 received from the left line buffer LLB0 and the pixel data L0 received from the LRAM 22L are selected as the pixel data LBuf0 and LBuf1 to be forwarded to the right selector 42R. Furthermore, when it holds $((Y+1)/2)\%2=0$ and the count value XBuf is "−1", the pixel data L2 received from the left line buffer LLB1 and the pixel data L0 received from the LRAM 22L are selected as the pixel data LBuf0 and LBuf1 to be forwarded to the right selector 42R. These operations are relevant to the forwarding of the pixel data of pixels positioned in a portion of the left divisional image of the original image adjacent to the right divisional image (boundary pixel data), to the right scaler circuit 25R through the right selector 42R.

Another feature is that the left selector 42L selects pixel data RBuf0 and RBuf1 received from the pixel data flipflop 43R of the right multiplexer circuit 34R as the pixel data LP00 and LP10 to be forwarded to the left scaler circuit 25L for any count value Y, when the count value XBuf is Xsize−1. This operation is relevant to the forwarding of the pixel data of pixels positioned in a portion of the right divisional image of the original image adjacent to the left divisional image (boundary pixel data), to the left scaler circuit 25L through the left selector 42L.

Similarly, the pixel data RP00, RP01, RP10, RP11, RBuf0 and RBuf1 are selected by the right selector 42R in response to the count value Y received from the Y counter 32 and the count value XBuf received from the X address flipflop 41R. FIGS. 16B, 17B and 18B are truth tables illustrating the operation of the right selector 42R in the case when the count value Y is zero, the case when $((Y+1)/2)\%2=1$, and the case when $((Y+1)/2)\%2=0$, respectively.

Similarly to the operations of the left selector 42L, attention should be paid to two features in the operations of the right selector 42R. One feature is that the right selector 42R selects pixel data R0 received from the RRAM 22R and pixel data R1 and R2 received from the right line buffers RLB0 and RLB1 as the pixel data RBuf0 and RBuf1, which are to be forwarded to the left selector 42L, when the count value XBuf is "0". More specifically, when the count value Y is zero and the count value XBuf is "0", the pixel data R0 received from the RRAM 22R are selected as the pixel data RBuf0 and RBuf1 to be forwarded to the left selector 42L. When it holds $((Y+1)/2)\%2=1$ and the count value XBuf is "0", the pixel data R1 received from the right line buffer RLB0 and the pixel data R0 received from the RRAM 22R are selected as the pixel data RBuf0 and RBuf1 to be forwarded to the left selector 42L. Furthermore, when it holds $((Y+1)/2)\%2=0$ and the count value XBuf is "0", the pixel data R2 received from the right line buffer RLB1 and the pixel data R0 received from the RRAM 22R are selected as the pixel data RBuf0 and RBuf1 to be forwarded to the left selector 42L. These operations are relevant to the forwarding of the pixel data of pixels positioned in a portion of the right divisional image of the original image adjacent to the left divisional image (boundary pixel data), to the left scaler circuit 25L through the left selector 42L.

Another feature is that the right selector 42R selects pixel data LBuf0 and LBuf1 received from the pixel data flipflop 43L of the left multiplexer circuit 34L as the pixel data RP01 and RP11 to be forwarded to the right scaler circuit 25R for any count value Y, when the count value XBuf is zero. This operation is relevant to the forwarding of the pixel data of pixels positioned in a portion of the left divisional image of the original image adjacent to the right divisional image (boundary pixel data), to the right scaler circuit 25R through the right selector 42R.

Next, a description is given of an exemplary operation of the RAM access logic circuit 24 in the present embodiment. In the present embodiment, the RAM access logic circuit 24 feeds pixel data (boundary pixel data) of pixels in a portion of the right divisional image adjacent to the left divisional image (in detail, pixels in the leftmost column of the right divisional image) to the left scaler circuit 25L, in addition to pixel data of respective pixels of the left divisional image of the original image. Additionally, the RAM access logic circuit 24 feeds pixel data (boundary pixel data) of pixels in a portion of the left divisional image adjacent to the right divisional image (in detail, pixels in the rightmost column of the left divisional image) to the right scaler circuit 25R, in addition to pixel data of respective pixels of the right divisional image of the original image. The left scaler circuit 25L performs image scaling (image enlargement) on the pixel data fed thereto to calculate pixel data associated with the pixels 13 in the left region 4L, and the right scaler circuit 25R performs image scaling (image enlargement) on the pixel data fed thereto to calculate pixel data associated with the pixels 13 in the right region 4R. This operation effectively suppresses image discontinuity between the left region 4L and the right region 4R in the display image displayed in the display region 4.

FIGS. 19A to 19D, 20A to 20D and 21A to 21D are timing charts illustrating the operation of the RAM access logic circuit 24, particularly, the operations of the left multiplexer circuit 34L and the right multiplexer circuit 34R. In FIGS. 19A to 19D, 20A to 20D and 21A to 21D, the row labeled with legend "LRAM address" indicates the access address (read address) of the LRAM 22L and the row labeled with legend "RRAM address" indicates the access address (read address) of the RRAM 22R. The rows labeled with legends "LLB0 write data" and "LLB1 write data" indicate pixel data written into the left line buffers LLB0 and LLB1. The rows labeled with legends "RLB0 write data" and "RLB1 write data" indicate pixel data written into the right line buffers RLB0 and RLB1. Furthermore, in FIGS. 19A to 19D, 20A to 20D and 21A to 21D, a pair of numbers "y, x" indicates the y and x coordinates of a pixel, respectively.

FIGS. 19A to 19D illustrate an exemplary operation in the case when the count value Y of the Y counter 32 is "0". In detail, FIG. 19A illustrates the operation of the left multiplexer circuit 34L near the beginning of the horizontal sync period for y=0, and FIG. 19B illustrates the operation of the right multiplexer circuit 34R near the beginning of the horizontal sync period for y=0. FIG. 19C illustrates the operation of the left multiplexer circuit 34L near the end of the horizontal sync period for y=0, and FIG. 19D illustrates the operation of the right multiplexer circuit 34R near the beginning of the horizontal sync period for y=0. When the count value Y is "0", pixel data associated with the uppermost pixels 13 of the display region 4 (the left region 4L and the right region 4R) are generated. When the count value Y is "0", pixel data of the uppermost pixels of the original image are read out from the LRAM 22L and the RRAM 22R.

In the clock cycle in which the count value X of the X counter 31 is "−1", as illustrated in FIGS. 19A and 19B, the read addresses of the LRAM 22L and the RRAM 22R are set to specify the addresses of the pixel data of the rightmost pixels of the left divisional image and the right divisional image, respectively. Note that the read addresses of the LRAM 22L and the RRAM 22R are set to "0, (Xsize−1)/2" in the clock cycle in which the count value X of the X counter 31 is "−1", where Xsize is the number of pixels 13 arrayed in the x-axis direction in each of the left and right regions 4L and 4R of the display region 4.

In the clock cycle in which the count value X is "0" (that is, the clock cycle in which the count values XBuf output from the X address flipflops 41L and 41R are "−1"), pixel data of the rightmost pixel of the left divisional image are then read out from the LRAM 22L and pixel data of the rightmost pixel of the right divisional image are read out from the RRAM 22R. Furthermore, the pixel data of the rightmost pixel of the left divisional image, which are read out from the LRAM 22L, are written into the left line buffer LLB0 and the pixel data of the rightmost pixel of the right divisional image, which are read out from the RRAM 22R, are written into the right line buffer RLB0.

In this clock cycle, the pixel data of the rightmost pixel of the left divisional image are further selected by the left selector 42L as the pixel data LBuf0 and LBuf1 to be forwarded to the right selector 42R. This operation allows the right selector 42R to be ready to receive the pixel data of the rightmost pixels of the left divisional image in the next clock cycle or later.

In the clock cycle in which the count value X is "1" (that is, the clock cycle in which the count values XBuf are "0"), pixel data of the leftmost pixels 13 of the left region 4L and the right region 4R are calculated. In detail, pixel data of the leftmost pixel of the left divisional image are read out from the LRAM 22L and pixel data of the leftmost pixel of the right divisional image are read out from the RRAM 22R. Furthermore, the pixel data of the leftmost pixel of the left divisional image, which are read out from the LRAM 22L, are written into the left line buffer LLB0 and the pixel data of the leftmost pixel of the right divisional image, which are read out from the RRAM 22R, are written into the right line buffer RLB0.

In the meantime, the left selector 42L selects the pixel data of the leftmost pixel of the left divisional image, which are read out from the LRAM 22L, as the pixel data LP00, LP01, LP10 and LP11 to be fed to the left scaler circuit 25L. As a result, the left scaler circuit 25L calculates pixel data of the pixel 13 at the upper left corner of the left region 4L through linear interpolation of pixel data of the pixel at the upper left corner of the left divisional image and pixel data of the copy pixels thereof. In an actual implementation, the pixel data LP00, LP01, LP10 and LP11 of the relevant four pixels are the same, and therefore the pixel data of the pixel 13 at the upper left corner of the left region 4L are calculated as being identical to the pixel data of the pixel at the upper left corner of the left divisional image.

On the other hand, the right selector 42R selects pixel data of the leftmost pixel of the right divisional image, which are read out from the RRAM 22R, as the pixel data RP00 and RP10, which are to be forwarded to the right scaler circuit 25R, and further selects the pixel data LBuf0 and LBuf1 received from the left selector 42L as the pixel data RP01 and RP11. This operation allows forwarding the pixel data of the rightmost pixel of the left divisional image to the right scaler circuit 25R via the right selector 42R. The right scaler circuit 25R calculates pixel data of the pixel 13 at the upper left corner of the right region 4R through linear interpolation of the pixel data of the pixel at the upper left corner of the right divisional image and the pixel data of the pixel at the upper right corner of the left divisional image. This operation, which is equivalent to the operation in the case when image scaling is performed without dividing the original image, effectively suppresses unnatural discontinuity at the boundary between the left region 4L and the right region 4R.

Thereafter, pixel data of the uppermost pixels 13 of the left region 4L and the right region 4R are successively calculated until the clock cycle in which the count value X becomes "Xsize−1". The left selector 42L selects pixel data of relevant two of the uppermost pixels of the left divisional image and pixel data of copy pixels of the two relevant pixels as pixel data LP00, LP01, LP10 and LP11 to be forwarded to the left scaler circuit 25L and the right selector 42R selects pixel data of relevant two of the uppermost pixels of the right divisional image and pixel data of copy pixels of the two relevant pixels as pixel data RP00, RP01, RP10 and RP11 to be forwarded to the right scaler circuit 25R. The left scaler circuit 25L calculates pixel data of the uppermost pixels 13 of the left region 4L through linear interpolation of pixel data of relevant two of the uppermost pixels of the left divisional image and pixel data of the copy pixels thereof, and the right scaler circuit 25R calculates pixel data of the uppermost pixels 13 of the right region 4R through linear interpolation of pixel data of relevant two of the uppermost pixels of the right divisional image and pixel data of the copy pixels thereof.

As illustrated in FIGS. 19C and 19D, in the clock cycle in which the count values XBuf are "Xsize−1" (that is, the next clock cycle of the clock cycle in which the count value X is "Xsize−1"), pixel data of the rightmost pixels 13 of the left region 4L and the right region 4R are calculated. The left selector 42L selects the pixel data RBuf0 and RBuf1 received from the right selector 42R as the pixel data LP00 and LP10 to be forwarded to the left scaler circuit 25L and further selects pixel data of the rightmost pixel of the left divisional image, read out from the LRAM 22L, as the pixel data LP01 and LP11. This operation allows forwarding the pixel data of the leftmost pixel of the right divisional image to the left scaler circuit 25L via the left selector 42L. The left scaler circuit 25L calculates pixel data of the pixel 13 at the upper right corner of the left region 4L through linear interpolation of the pixel data of the pixel at the upper right corner of the left divisional image and the pixel data of the pixel at the upper left corner of the right divisional image. This operation, which is equivalent to the operation in the case when image scaling is performed without dividing the original image, effectively suppresses unnatural discontinuity at the boundary between the left region 4L and the right region 4R.

In the meantime, the right selector 42R selects the pixel data of the rightmost pixel of the right divisional image, which are read out from the RRAM 22R, as the pixel data RP00, RP01, RP10 and RP11 to be forwarded to the right scaler circuit 25R. As a result, the right scaler circuit 25R calculates pixel data of the pixel 13 at the upper right corner of the right region 4R through linear interpolation of pixel data of the pixel at the upper right corner of the right divisional image and pixel data of the copy pixels thereof. In an actual implementation, the pixel data RP00, RP01, RP10 and RP11 of the relevant four pixels are the same, and therefore the pixel data of the pixel 13 at the upper right corner of the right region 4R are calculated as being identical to the pixel data of the pixel at the upper right corner of the right divisional image.

FIGS. 20A to 20D and FIGS. 21A to 21D illustrate the operations for calculating pixel data of pixels 13 which are positioned away from the upper and lower ends of the display region 4. In detail, FIGS. 20A to 20D illustrate the operation in the case when it hold ((Y+1)/2)%2=1 for the count value Y of the Y counter 32, and FIGS. 21A to 21D illustrate the operation in the case when it hold ((Y+1)/2)%2=0. The overall operations in these cases are almost similar to that in the case when the count value Y of the Y counter 32 is "0" (see FIGS. 19A to 19D), although the access destinations of the pixel data are different.

More specifically, the operation in the case when ((Y+1)/2)%2=1 is as follows (refer to FIGS. 20A to 20D): In the clock cycle in which the count value X of the X counter 31 is "−1", as illustrated in FIGS. 20A and 20B, the read addresses of the LRAM 22L and the RRAM 22R are set to specify the addresses of the pixel data of the two rightmost pixels of the left divisional image and the right divisional image, respectively. It should be noted that, in the clock cycle in which the count value X of the X counter 31 is "−1", as illustrated in FIGS. 20A and 20B, the read addresses of the LRAM 22L and the RRAM 22R are set to "1, (Xsize−1)/2" and the read addresses of the left line buffer LLB0 and right line buffer RLB0 are set to "0, (Xsize−1)/2" (in an actual implementation, it is not necessary to set the y addresses of the left line buffer LLB0 and right line buffer RLB0).

In the clock cycle in which the count value X is "0" (that is, the clock cycle in which the count values XBuf output from the X address flipflops 41L and 41R are "−1"), the pixel data of the two rightmost pixels of the left divisional image are then read out from the LRAM 22L and the left line buffer LLB0 and the pixel data of the two rightmost pixels of the right divisional image are read out from the RRAM 22R and the right line buffer RLB0. Furthermore, the pixel data of the rightmost pixel of the left divisional image read out from the LRAM 22L are written into the left line buffer LLB1 and the pixel data of the rightmost pixel of the right divisional image read out from the RRAM 22R are written into the right line buffer RLB1.

In this clock cycle, the pixel data of the two rightmost pixels of the left divisional image are further selected by the left selector 42L as the pixel data LBuf0 and LBuf1 to be forwarded to the right selector 42R. This operation allows the right selector 42R to be ready to receive the pixel data of the two rightmost pixels of the left divisional image in the next clock cycle or later.

In the clock cycle in which the count value X is "1" (that is, the clock cycle in which the count values XBuf are "0"), pixel data of the leftmost pixels 13 of the left region 4L and the right region 4R are calculated. In detail, pixel data of the two leftmost pixels of the left divisional image are read out from the LRAM 22L and the left line buffer LLB0 and pixel data of the two leftmost pixels of the right divisional image are read out from the RRAM 22R and the right line buffer RLB0. Furthermore, the pixel data of the leftmost pixel of the left divisional image read out from the LRAM 22L are written into the left line buffer LLB1 and the pixel data of the leftmost pixel of the right divisional image read out from the RRAM 22R are written into the right line buffer RLB1.

In the meantime, the left selector 42L selects the pixel data of the two leftmost pixels of the left divisional image read out from the LRAM 22L and the left line buffer LLB0, as the pixel data LP00, LP01, LP10 and LP11 to be fed to the left scaler circuit 25L. As a result, the left scaler circuit 25L calculates pixel data of the leftmost pixel 13 of the left region 4L through linear interpolation of pixel data of the leftmost pixels of the left divisional image and pixel data of the copy pixels thereof.

On the other hand, the right selector 42R selects pixel data of the two leftmost pixels of the right divisional image read out from the RRAM 22R and the right line buffer RLB0, as the pixel data RP00 and RP10 of two pixels, which are to be forwarded to the right scaler circuit 25R, and selects the pixel data LBuf0 and LBuf1 received from the left selector 42L as the pixel data RP01 and RP11. This operation allows forwarding the pixel data of the two rightmost pixels of the left divisional image to the right scaler circuit 25R via the right selector 42R. The right scaler circuit 25R calculates pixel data of the leftmost pixel 13 of the right region 4R through linear interpolation of the pixel data of the two leftmost pixels of the right divisional image and the pixel data of the two rightmost pixels of the left divisional image. This operation, which is equivalent to the operation in the case when image scaling is performed without dividing the original image, effectively suppresses unnatural discontinuity at the boundary between the left region 4L and the right region 4R.

Thereafter, pixel data of the pixels 13 of the left region 4L and the right region 4R are successively calculated until the clock cycle in which the count value X becomes "Xsize−1". The left selector 42L selects pixel data of relevant four of the pixels of the left divisional image as pixel data LP00, LP01, LP10 and LP11 to be forwarded to the left scaler circuit 25L and the right selector 42R selects pixel data of relevant four of the pixels of the right divisional image as pixel data RP00, RP01, RP10 and RP11 to be forwarded to the right scaler circuit 25R. The left scaler circuit 25L calculates pixel data of the pixels 13 of the left region 4L through linear interpolation of pixel data of the relevant four pixels of the left divisional image, and the right scaler circuit 25R calculates pixel data of the pixels 13 of the right region 4R through linear interpolation of pixel data of the relevant four pixels of the right divisional image.

As illustrated in FIGS. 20C and 20D, in the clock cycle in which the count values XBuf are "Xsize−1" (that is, the next clock cycle of the clock cycle in which the count value X is "Xsize−1"), pixel data of the rightmost pixels 13 of the left region 4L and the right region 4R are calculated. The left selector 42L selects the pixel data RBuf0 and RBuf1 received from the right selector 42R as the pixel data LP00 and LP10 to be forwarded to the left scaler circuit 25L and further selects pixel data of the two rightmost pixels of the left divisional image read out from the LRAM 22L and the left line buffer LLB0 as the pixel data LP01 and LP11. This operation allows forwarding the pixel data of the two leftmost pixels of the right divisional image to the left scaler circuit 25L via the left selector 42L. The left scaler circuit 25L calculates pixel data of the rightmost pixel 13 of the left region 4L through linear interpolation of the pixel data of the two rightmost pixels of the left divisional image and the pixel data of the two leftmost pixels of the right divisional image. This operation, which is equivalent to the operation in the case when image scaling is performed without dividing the original image, effectively suppresses unnatural discontinuity at the boundary between the left region 4L and the right region 4R.

In the meantime, the right selector 42R selects the pixel data of the two rightmost pixel of the right divisional image read out from the RRAM 22R and the right line buffer RLB0, as the pixel data RP00, RP01, RP10 and RP11 to be forwarded to the right scaler circuit 25R. As a result, the right scaler circuit 25R calculates pixel data of the rightmost pixel 13 of the right region 4R through linear interpolation of pixel data of the two rightmost pixels of the right divisional image and pixel data of the copy pixels thereof.

The operation in the case when ((Y+1)/2)%2=0 (see FIGS. 21A to 21D) is almost similar to that in the case when ((Y+1)/2)%2=1 (see FIGS. 20A to 20D), except for that pixel data read out from the LRAM 22L and the RRAM 22R are written into the left line buffer LLB0 and the right line buffer RLB0, respectively, and pixel data to be forwarded to the left scaler circuit 25L and the right scaler circuit 25R are read out from the left line buffer LLB1 and the right line buffer RLB1 in place of the left line buffer LLB0 and the right line buffer RLB0, respectively.

It should be noted that, in the above-described image scaling processing of the present embodiment, the timing at which the left selector 42L receives pixel data from the right selector 42R and the timing at which the right selector 42R receives pixel data from the left selector 42L are determined depending on the order in which the left scaler circuit 25L and the right scaler circuit 25R process the received pixel data. In the operations illustrated in FIGS. 19A to 19D, FIGS. 20A to 20D and FIGS. 21A to 21D, the left scaler circuit 25L and the right scaler circuit 25R generates pixel data of the pixels 13 of the left region 4L and the right region 4R, respectively, from left to right. Accordingly, the right selector 42R selects the pixel data LBuf0 and LBuf1 received from the left selector 42L in selecting the pixel data RP00, RP01, RP10 and RP11 to be first forwarded to the right scaler circuit 25R (that is, in generating the leftmost pixel 13 of the right region 4R). Also, the left selector 42L selects the pixel data RBuf0 and RBuf1 received from the right selector 42R in selecting the pixel data LP00, LP01, LP10 and LP11 to be finally forwarded to the left scaler circuit 25L (that is, in generating the rightmost pixel of the left region 4L).

It is notable that the pixel data flipflop 43L of the left multiplexer circuit 34L holds pixel data which are read out from the LRAM 22L and the left line buffers LLB0 and LLB1 and forwarded to the right scaler circuit 25R until when the right scaler circuit 25R actually needs the pixel data read out from the LRAM 22L and the left line buffers LLB0 and LLB1. Similarly, it is significant that the pixel data flipflop 43R of the right multiplexer circuit 34R holds pixel data which are read out from the RRAM 22R and the right line buffers RLB0 and RLB1 and forwarded to the left scaler circuit 25L, until when the left scaler circuit 25L actually requires the pixel data read out from the RRAM 22R and the right line buffers RLB0 and RLB1.

For example, the pixel data flipflop 43L of the left multiplexer circuit 34L holds the pixel data of the rightmost two pixels of the left divisional image until when the right selector 42R selects the pixel data LBuf0 and LBuf1 (that is, until when the pixel data of the leftmost pixel 13 of the right region 4R is generated). Also, the pixel data flipflop 43R of the right multiplexer circuit 34R holds the pixel data of the leftmost two pixels of the right divisional image until when the left selector 42L selects the pixel data RBuf0 and RBuf1 (that is, until when the pixel data of the rightmost pixel 13 of the left region 4L is generated).

It should be noted that the order in which the left scaler circuit 25L and the right scaler circuit 25R process pixel data may be arbitrary modified. In this case, the timing at which the left selector 42L receives pixel data from the right selector 42R and the timing at which the right selector 42R receives pixel data from the left selector 42L are properly modified depending on the order in which the left scaler circuit 25L and the right scaler circuit 25R process the received pixel data.

Discussed below is an example in which the left scaler circuit 25L generates pixel data of the pixels 13 in the left region 4L in the order from left to right and the right scaler circuit 25R generates pixel data of the pixels 13 in the right region 4R in the order from right to left. In this case, pixel data of the pixels 13 adjacent to the boundary between the left region 4L and the right region 4R are finally generated. Also in this case, the pixel data flipflops 43L and 43R of the left and right multiplexer circuits 34L and 34R hold pixel data read out from the LRAM 22L and RRAM 22R, respectively, until when the right scaler circuit 25R and the left scaler circuit 25L actually require the pixel data read out from the LRAM 22L and the RRAM 22R. The pixel data flipflop 43L holds the pixel data LBuf0 and LBuf1 to be forwarded from the left selector 42L to the right selector 42R until when the right selector 42R selects the pixel data RP00, RP01, RP10 and RP11 finally forwarded to the right scaler circuit 25R (that is, until when the pixel data of the leftmost pixel 13 of the right region 4R is generated). Similarly, the pixel data flipflop 43R holds the pixel data RBuf0 and RBuf1 to be forwarded from the right selector 42R to the left selector 42L until when the left selector 42L selects the pixel data LP00, LP01, LP10 and LP11 finally forwarded to the left scaler circuit 25L (that is, until when the pixel data of the rightmost pixel 13 of the left region 4L is generated).

As thus described, in image scaling in the present embodiment, the left scaler circuit 25L is fed with the pixel data of the pixels in a portion of the right divisional image of the original image adjacent to the left divisional image (boundary pixel data), in addition to pixel data of the respective pixels of the left divisional image and the left scaler circuit 25L generates pixel data of the pixels 13 of the left region 4L through performing image scaling (image enlargement) on the pixel data fed thereto. Furthermore, the right scaler circuit 25R is fed with the pixel data of the pixels in a portion of the left divisional image of the original image adjacent to the right divisional image (boundary pixel data), in addition to pixel data of the respective pixels of the right divisional image and the right scaler circuit 25R generates pixel data of the pixels 13 of the right region 4R through performing image scaling (image enlargement) on the pixel data fed thereto. This operation effectively suppresses discontinuity between the left region 4L and the right region 4R in the display image displayed in the display region 4.

It should be noted that the pixels 13 for which pixel data are generated by the left scaler circuit 25L and the pixels 13 for which pixel data are generated by the right scaler circuit 25R are different from each other. The left scaler circuit 25L, which calculates the pixel data of the pixels 13 in the left region 4L, is not engaged in calculating the pixel data of the pixels 13 in the right region 4R. Similarly, the right scaler circuit 25R, which calculates the pixel data of the pixels 13 in the right region 4R, is not engaged in calculating the pixel data of the pixels 13 in the left region 4L. This is advantageous for achieving image scaling with simple processing. In the super resolution processing disclosed in Japanese Patent Application Publication No. 2005-164347 A, complex processing is required because an overlapping area is defined in synthesizing enlarged divisional images. In the present embodiment, in which the pixels 13 for which pixel data are generated by the left scaler circuit 25L and the pixels 13 for which pixel data are generated by the right scaler circuit 25R are different from each other, image scaling can be achieved through simple processing. This effectively reduces the circuit sizes of the left scaler circuit 25L and the right scaler circuit 25R.

Although the above-described embodiments recite that the left scaler circuit 25L and the right scaler circuit 25R perform bilinear image scaling (image enlargement), image scaling may be achieved through other interpolation methods. For example, the left scaler circuit 25L and the right scaler circuit 25R may perform bicubic image scaling. In this case, the left scaler circuit 25L is fed with pixel data of leftmost two columns of pixels of the right divisional image of the original image in addition to pixel data of the pixels of the left divisional image, and the right scaler circuit 25R is fed with pixel data of right most two columns of pixels of the left divisional image of the original image in addition to pixel data of the pixels of the right divisional image. The left scaler circuit 25L performs bicubic image scaling on the pixel data fed thereto to generate pixel data of the pixels 13 of the left region 4L and the right scaler circuit 25R performs bicubic image scaling on the pixel data fed thereto to generate pixel data of the pixels 13 of the right region 4R.

Although the above-described embodiments recite that the LRAM 22L stores the left image pixel data $D_{IN\_L}$ corresponding to the left divisional image of the original image and the RRAM 22R stores the right image pixel data $D_{IN\_R}$ corresponding to the right divisional image of the original image, the LRAM 22L may store pixel data of the pixels in a leftmost portion of the right divisional image (boundary pixel data) in addition to the left image pixel data $D_{IN\_L}$, and the RRAM 22R may store pixel data of the pixels in a rightmost portion of the left divisional image (boundary pixel data) in addition to the right image pixel data $D_{IN\_R}$. When the left scaler circuit 25L and the right scaler circuit 25R perform bilinear image scaling, for example, the LRAM 22L stores pixel data of the leftmost column of pixels of the right divisional image in addition to the left image pixel data $D_{IN\_L}$ and the RRAM 22R stores pixel data of the rightmost column of pixels of the left divisional image in addition to the right image pixel data $D_{IN\_R}$. When the left scaler circuit 25L and the right scaler circuit 25R perform bicubic image scaling, the LRAM 22L stores pixel data of the leftmost two columns of pixels of the right divisional image in addition to the left image pixel data $D_{IN\_L}$ and the RRAM 22R stores pixel data of the rightmost two columns of pixels of the left divisional image in addition to the right image pixel data $D_{IN\_R}$. In such cases, pixel data of pixels in the rightmost portion of the left divisional image and those in the leftmost portion of the right divisional image are stored in both of the LRAM 22L and the RRAM 22R. These pixel data may be referred to as duplicated pixel data, hereinafter.

Figure 22:
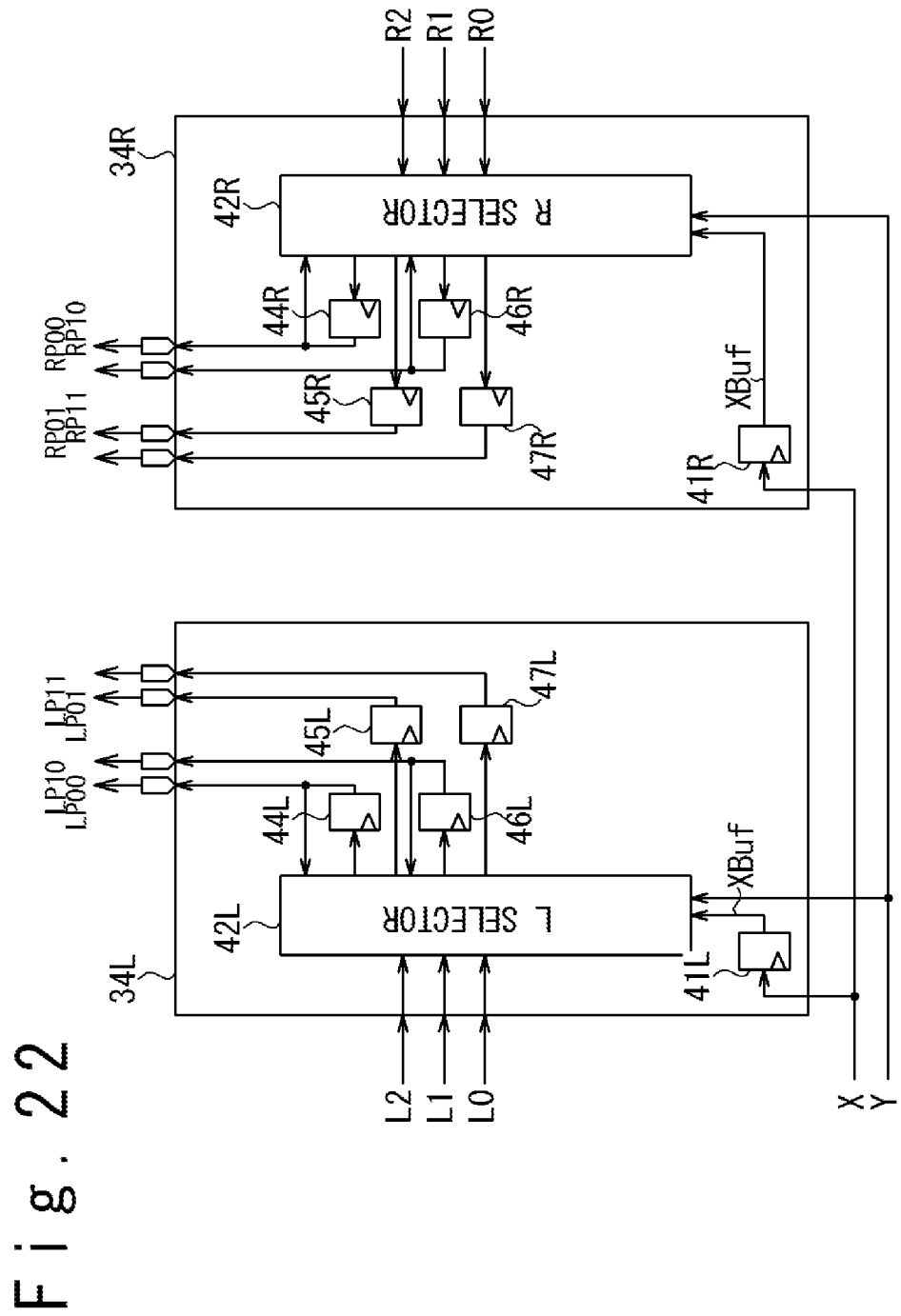
FIG. 22 is a block diagram illustrating exemplary configurations of a left multiplexer circuit and a right multiplexer circuit when pixel data of rightmost pixels of the left divisional image and those of leftmost pixels of the right divisional image are stored in both of an LRAM and an RRAM.

When pixel data of pixels in the rightmost portion of the left divisional image and those in the leftmost portion of the right divisional image are stored in both of the LRAM 22L and the RRAM 22R, it is not necessary for the left multiplexer circuit 34L and the right multiplexer circuit 34R of the RAM access logic circuit 24 to have the function of exchanging pixel data therebetween. FIG. 22 is a block diagram illustrating exemplary configurations of the left multiplexer circuit 34L and the right multiplexer circuit 34R in this case. In the configurations illustrated in FIG. 22, differently from the configurations illustrated in FIG. 15, the pixel data flipflop 43L is removed from the left multiplexer circuit 34L and the pixel data flipflop 43R is removed from the right multiplexer circuit 34R. When pixel data of the rightmost pixels 13 of the left region 4L are calculated, the left multiplexer circuit 34L forwards pixel data of the rightmost pixels of the left divisional image stored in the LRAM 22L and pixel data of the leftmost pixels of the right divisional image also stored in the LRAM 22L to the left scaler circuit 25L. When pixel data of the leftmost pixels 13 of the right region 4R are calculated, the right multiplexer circuit 34R forwards pixel data of the leftmost pixels of the right divisional image stored in the RRAM 22R and pixel data of the rightmost pixels of the left divisional image also stored in the RRAM 22R to the right scaler circuit 25R. This effectively achieves image scaling similar to that performed in the above-described embodiments.

Figure 23:
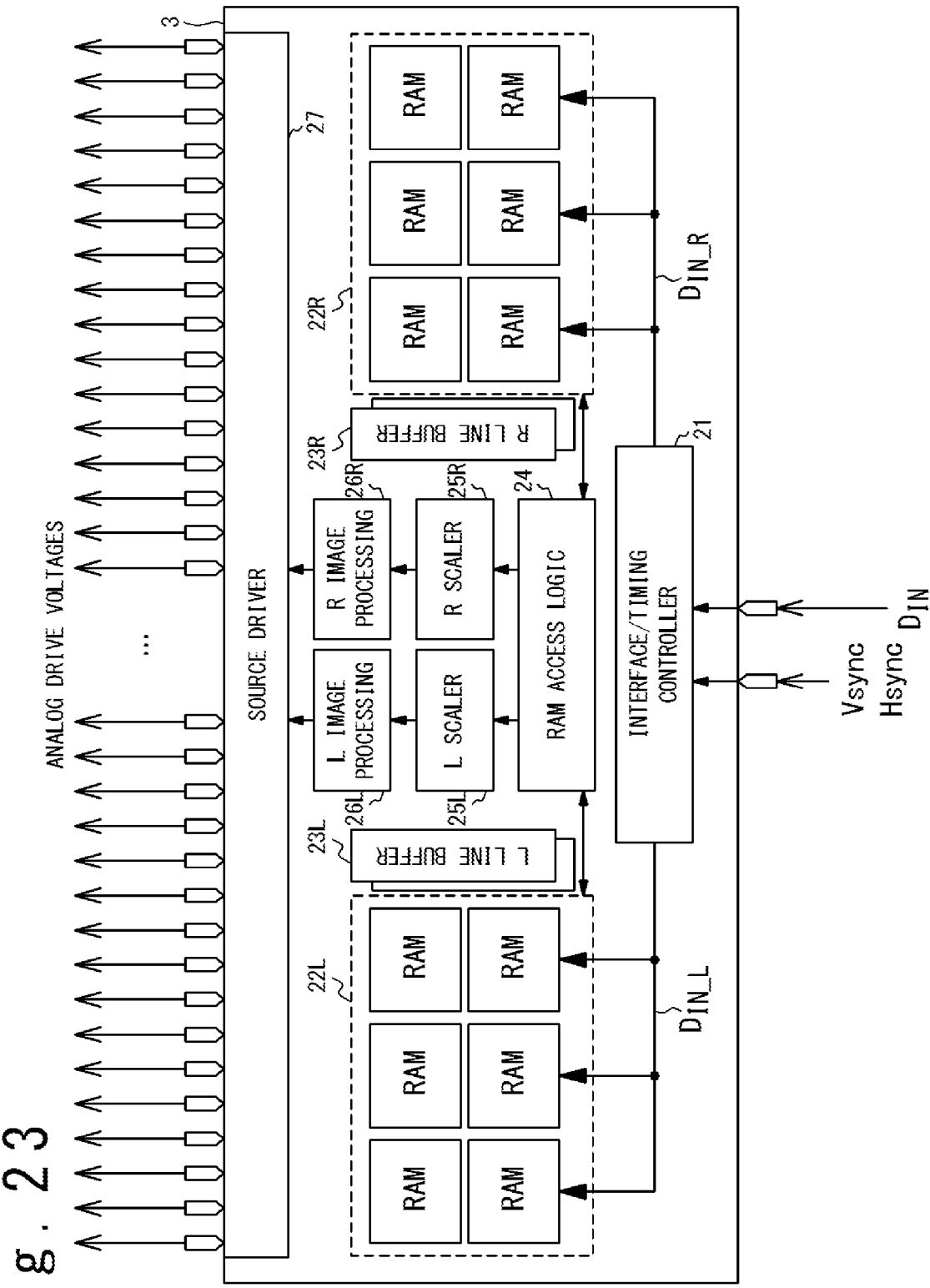
FIG. 23 is a block diagram illustrating the configuration of a driver IC in another embodiment of the present disclosure.

Although the driver IC 3 is configured to receive the left image pixel data $D_{IN\_L}$ of the left divisional image of the original image and the right image pixel data $D_{IN\_R}$ of the right divisional image on two ports in the configuration illustrated in FIG. 9, the driver IC 3 may be configured to receive pixel data $D_{IN}$ of the original image on a single port as illustrated in FIG. 23. In this case, the interface/timing controller 21 forwards the left image pixel data $D_{IN\_L}$ of the left divisional image of the original image to the LRAM 22L, and forwards the right image pixel data $D_{IN\_R}$ of the right divisional image to the RRAM 22R.

Pixel data of pixels in the rightmost portion of the left divisional image and those in the leftmost portion of the right divisional image (boundary pixel data) may be stored in both of the LRAM 22L and the RRAM 22R, also in the configuration illustrated in FIG. 23. In this case, the interface/timing controller 21 forwards to the LRAM 22L pixel data of pixels in the leftmost portion of the right divisional image of the original image, as well as the left image pixel data $D_{IN\_L}$ of the left divisional image, and forwards to the RRAM 22R pixel data of pixels in the rightmost portion of the left divisional image of the original image, as well as the right image pixel data $D_{IN\_R}$ of the right divisional image.

Figure 24A:
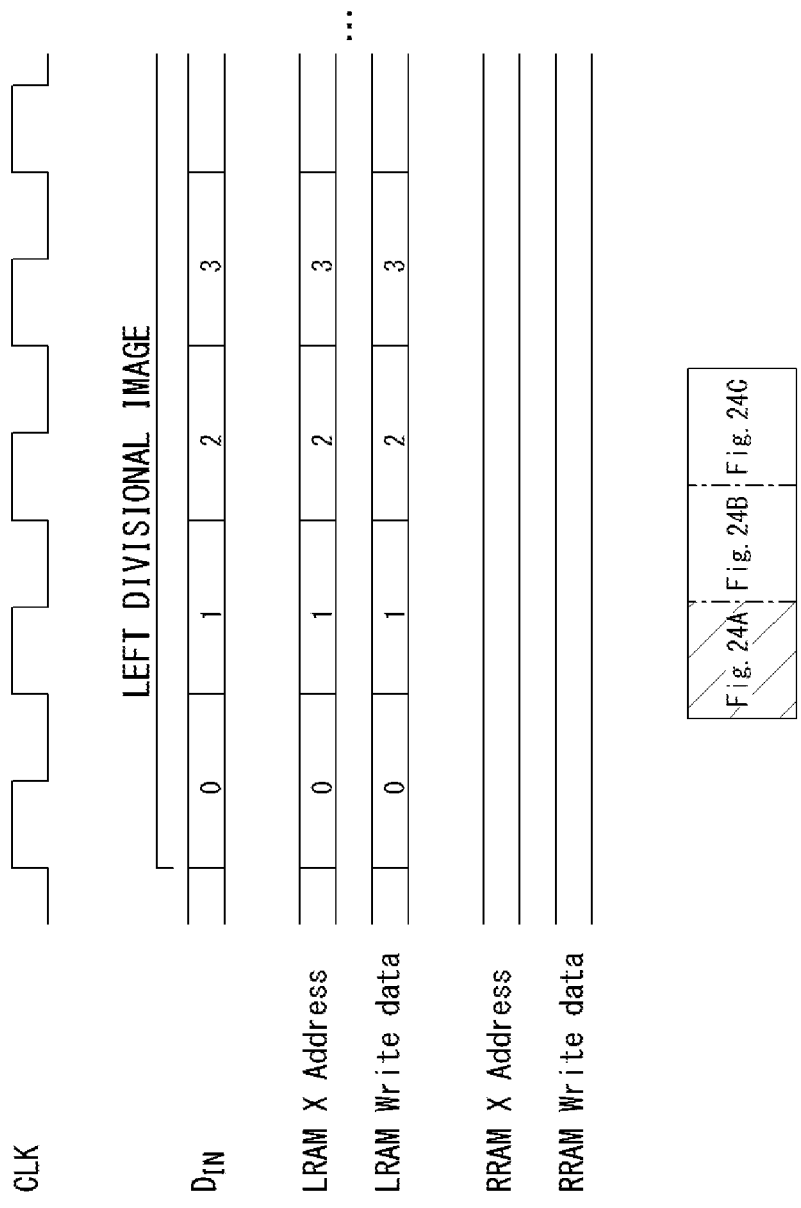

FIGS. 24A to 24C are timing charts illustrating an exemplary write operation of pixel data into the LRAM 22L and the RRAM 22R in the driver IC 3 configured to receive pixel data $D_{IN}$ of the original image on a single port. For simplicity, FIGS. 24A to 24C illustrate an exemplary write operation of pixel data of pixels in one horizontal line of the original image.

First, as illustrated in FIG. 24A, pixel data of pixels of the left divisional image are successively fed to the interface/timing controller 21 as the pixel data $D_{IN}$ of the original image. In the operation illustrated in FIG. 24A, the pixel data of the pixels of the left divisional image are successively fed to the interface/timing controller 21 in the order from the leftmost pixel to the rightmost pixel.

The interface/timing controller 21 successively stores the pixel data of the pixels of the left divisional image (left image pixel data $D_{IN\_L}$) into the LRAM 22L. When pixel data of the rightmost pixel of the left divisional image are fed, as illustrated in FIG. 24B, the interface/timing controller 21 stores the pixel data of the rightmost pixel into not only the LRAM 22L but also the RRAM 22R. This results in that the pixel data of the rightmost pixel of the left divisional image are stored in both of the LRAM 22L and the RRAM 22R.

Subsequently, pixel data of pixels of the right divisional image are successively fed to the interface/timing controller 21 as the pixel data $D_{IN}$ of the original image. As illustrated in FIGS. 24B and 24C, pixel data of the pixels of the right divisional image are successively fed to the interface/timing controller 21 also in the order from the leftmost pixel to the rightmost pixel.

The interface/timing controller 21 successively stores the pixel data of the pixels of the right divisional image (right image pixel data $D_{IN\_R}$) into the RRAM 22R. When pixel data of the leftmost pixel of the right divisional image are fed, as illustrated in FIG. 24B, the interface/timing controller 21 stores the pixel data of the leftmost pixel into not only the RRAM 22R but also the LRAM 22L. This results in that the pixel data of the leftmost pixel of the right divisional image are stored in both of the LRAM 22L and the RRAM 22R.

Figure 25A:
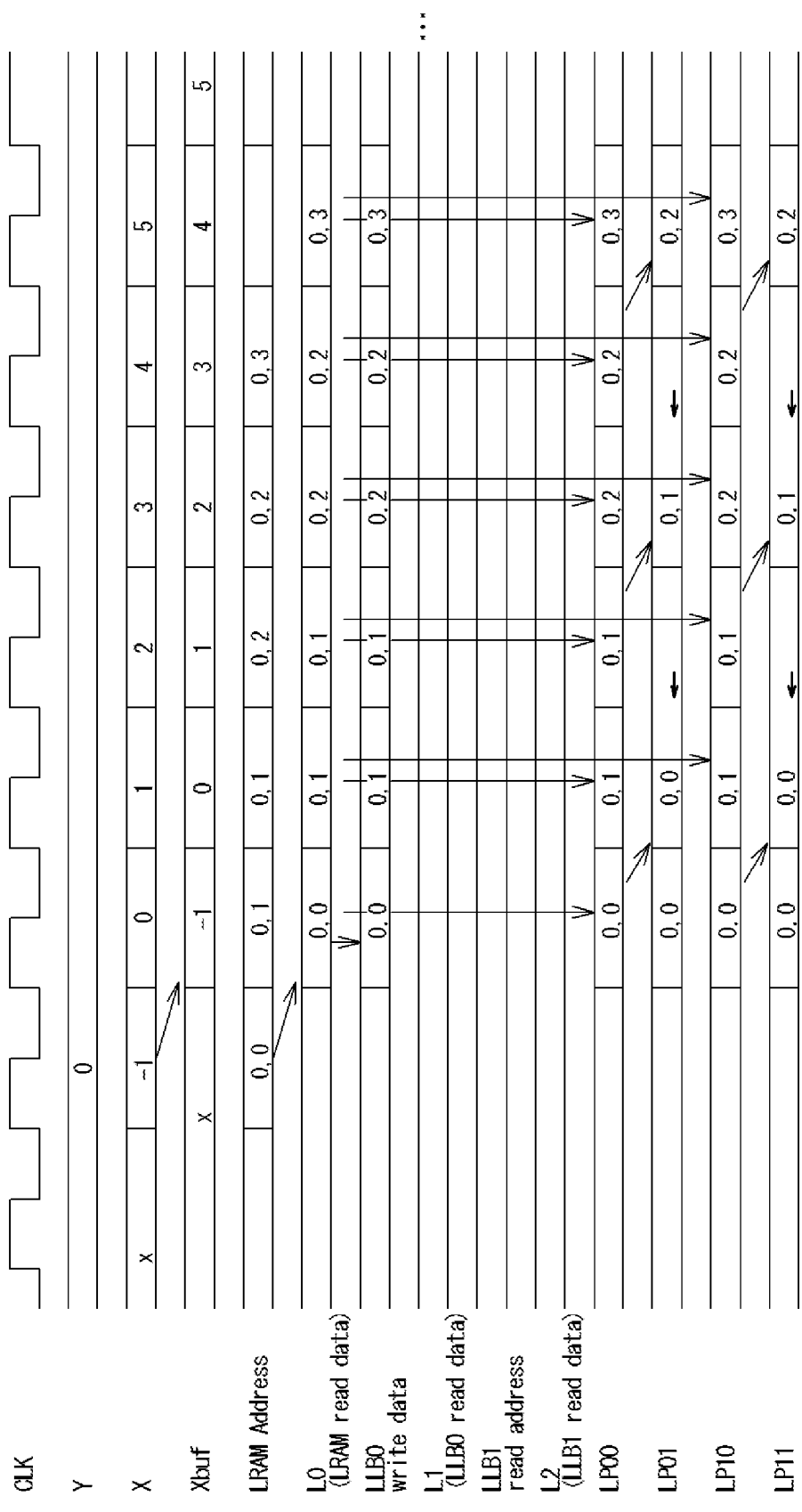

FIGS. 25A to 25D are timing charts illustrating an exemplary operation of the RAM access logic circuit 24, more particularly, exemplary operations of the left multiplexer circuit 34L and the right multiplexer circuit 34R, in the case when the LRAM 22L stores pixel data of the pixels in the leftmost portion of the right divisional image in addition to the left image pixel data $D_{IN\_L}$, and the RRAM 22R stores pixel data of the pixels in the rightmost portion of the left divisional image in addition to the right image pixel data $D_{IN\_R}$. In detail, FIG. 25A illustrates the operation of the left multiplexer circuit 34L near the beginning of the horizontal sync period for y=0, and FIG. 25B illustrates the operation of the right multiplexer circuit 34R near the beginning of the horizontal sync period for y=0. FIG. 25C illustrates the operation of the left multiplexer circuit 34L near the end of the horizontal sync period for y=0, and FIG. 25D illustrates the operation of the right multiplexer circuit 34R near the end of the horizontal sync period for y=0. Although FIGS. 25A to 25C illustrate the operation for Y=0, that is, the operation in which pixel data of the uppermost pixels 13 of the display region 4 are generated, a person skilled in the art would appreciate that a similar operation is performed for other values of the count value Y except for that the accesses to the left line buffers LLR0 and LLR1 and the accesses to the right line buffers RLR0 and RLR1 are performed in a different way.

Also in the operation illustrated in FIGS. 25A to 25D, the RAM access logic circuit 24 feeds to the left scaler circuit 25L pixel data of pixels in a portion of the right divisional image adjacent to the left divisional image (in detail, the leftmost column of pixels of the right divisional image) as well as pixel data of the respective pixels of the left divisional image. The RAM access logic circuit 24 also feeds to the right scaler circuit 25R pixel data of pixels in a portion of the left divisional image adjacent to the right divisional image (in detail, the rightmost column of pixels of the left divisional image) as well as pixel data of the respective pixels of the right divisional image. The left scaler circuit 25L calculates pixel data of the pixels 13 in the left region 4L by performing image scaling (image enlargement) on the pixel data fed thereto, and the right scaler circuit 25R calculates pixel data of the pixels 13 in the right region 4R by performing image scaling (image enlargement) on the pixel data fed thereto. This operation effectively suppresses discontinuity between the left region 4L and the right region 4R in the display image displayed in the display region 4.

More specifically, the RAM access logic circuit 24 operates as follows: In the clock cycle in which the count value X of the X counter 31 is "−1", the read address of the LRAM 22L are set to specify the address of pixel data of the leftmost pixel of the left divisional image, and the read address of the RRAM 22R are set to specify the address of pixel data of the rightmost pixel of the left divisional image. It should be noted that the read addresses of the LRAM 22L and the RRAM 22R are set to "0, 0" in the clock cycle in which the count value X is "−1".

In the clock cycle in which the count value X is "0" (that is, the clock cycle in which the count values XBuf of the X address flipflop 41L and 41R are "−1"), pixel data of the leftmost pixel of the left divisional image are then read out from the LRAM 22L and pixel data of the rightmost pixel of the left divisional image are read out from the RRAM 22R. Furthermore, the pixel data of the leftmost pixel of the left divisional image read out from the LRAM 22L are written into the left line buffer LLB0, and the pixel data of the rightmost pixel of the left divisional image read out from the RRAM 22R are written into the right line buffer RLB0.

In addition, pixel data of the leftmost pixel 13 of the left region 4L are calculated in the clock cycle in which the count value X is "0". The left selector 42L selects pixel data of the leftmost pixel of the left divisional image read out from the LRAM 22L as pixel data LP00, LP01, LP10 and LP11 to be fed to the left scaler circuit 25L. As a result, the left scaler circuit 25L calculates the pixel data of the leftmost pixel 13 of the left region 4L through linear interpolation of the pixel data of the pixel at the upper left corner of the left divisional image and pixel data of copy pixels thereof. In this operation, the pixel data of the leftmost pixel of the left divisional image are stored in each of the pixel data flipflops 44L to 47L of the left multiplexer circuit 34L.

In the meantime, the pixel data of the rightmost pixel of the left divisional image read out form the RRAM 22R are stored in each of the pixel data flipflops 44R and 46R of the right multiplexer circuit 34R.

In the clock cycle in which the count value X is "1" (that is, the clock cycle in which the count values XBuf of the X address flipflop 41L and 41R are "0"), pixel data of the second leftmost pixel 13 of the left region 4L and pixel data of the leftmost pixel 13 of the right region 4R are calculated. In detail, pixel data of the second leftmost pixel of the left divisional image are read out from the LRAM 22L and pixel data of the leftmost pixel of the right divisional image are read out from the RRAM 22R.

In the meantime, the left selector 42L selects pixel data stored in the pixel data flipflops 44L and 46L (the pixel data LP00 and LP10) as the pixel data LP01 and LP11 to be forwarded to the left scaler circuit 25L and selects the pixel data of the second leftmost pixel of the left divisional image read out from the LRAM 22L as the pixel data LP00 and LP10 to be forwarded to the left scaler circuit 25L. As a result, the left scaler circuit 25L calculates the pixel data of the second leftmost pixel 13 at the uppermost end of the left region 4L through linear interpolation of pixel data of the pixel at the upper left corner of the left divisional image, the second leftmost pixel at the uppermost end of the left divisional image and copy pixels of these pixels.

The right selector 42R, on the other hand, selects the pixel data of the leftmost pixel of the right divisional image read out from the RRAM 22R as the pixel data RP00 and RP10 to be forwarded to the right scaler circuit 25R, and selects pixel data stored in the pixel data flipflops 44R and 46R as the pixel data RP01 and RP11 to be forwarded to the right scaler circuit 25R. The right scaler circuit 25R calculates pixel data of the pixel 13 at the upper left corner of the right region 4R through linear interpolation of pixel data of the pixel at the upper left corner of the right divisional image and the pixel at the upper right corner of the left divisional image. This operation, which is equivalent to the operation in the case when image scaling is performed without dividing the original image, effectively suppresses unnatural discontinuity at the boundary between the left region 4L and the right region 4R.

Thereafter, pixel data of the uppermost pixels 13 of the left region 4L and the right region 4R are successively calculated until the clock cycle in which the count value X becomes "Xsize−1". The left selector 42L selects pixel data of relevant two of the uppermost pixels of the left divisional image and pixel data of copy pixels of the two relevant pixels as pixel data LP00, LP01, LP10 and LP11 to be forwarded to the left scaler circuit 25L and The right selector 42R selects pixel data of relevant two of the uppermost pixels of the right divisional image and pixel data of copy pixels of the two relevant pixels as pixel data RP00, RP01, RP10 and RP11 to be forwarded to the right scaler circuit 25R. The left scaler circuit 25L calculates pixel data of the uppermost pixels 13 of the left region 4L through linear interpolation of pixel data of the relevant two of the uppermost pixels of the left divisional image and pixel data of the copy pixels thereof, and the right scaler circuit 25R calculates pixel data of the uppermost pixels 13 of the right region 4R through linear interpolation of pixel data of the relevant two of the uppermost pixels of the right divisional image and pixel data of the copy pixels thereof.

In the clock cycle in which the count value X is "Xsize−1", pixel data of the rightmost pixel 13 of the left region 4L and pixel data of the second rightmost pixel 13 of the right region 4R are calculated. In this operation, the left selector 42L selects pixel data of the leftmost pixel of the right divisional image read out from the LRAM 22L as the pixel data LP00 and LP10 to be fed to the left scaler circuit 25L, and further selects the pixel data stored in the pixel data flipflops 44L and 46L, that is, pixel data of the rightmost pixel of the left divisional image as the pixel data LP01 and LP11. The left scaler circuit 25L calculates pixel data of the pixel 13 at the upper right corner of the left region 4L through linear interpolation of the pixel data of the pixel at the upper right corner of the left divisional image and the pixel data of the pixel at the upper left corner of the right divisional image. This operation, which is equivalent to the operation in the case when image scaling is performed without dividing the original image, effectively suppresses unnatural discontinuity at the boundary between the left region 4L and the right region 4R.

It should be noted that, in this clock cycle, the right selector 42R selects the pixel data of the second rightmost pixel at the upper end of the right divisional image and the pixel at the upper right corner of the right divisional image as the pixel data RP00, RP01, RP10 and RP11 to be fed to the right scaler circuit 25R. The right scaler circuit 25R calculates pixel data of the second rightmost pixel 13 at the upper end of the right region 4R through linear interpolation of pixel data of the second rightmost pixel at the upper end of the right divisional image and pixel data of the pixel at the upper right corner of the right divisional image.

In the clock cycle in which the count values XBuf are "Xsize−1" (that is, the next clock cycle of the clock cycle in which the count value X is "Xsize−1"), pixel data of the rightmost pixel 13 of the right region 4R are calculated. In this operation, the right selector 42R selects pixel data of the pixel at the upper right corner of the right divisional image and pixel data of copy pixels thereof, as the pixel data RP00, RP01, RP10 and RP11 to be forwarded to the right scaler circuit 25R. The right scaler circuit 25R calculates pixel data of the pixel 13 at the upper right corner of the right region 4R through linear interpolation of pixel data of the pixel at the upper right corner of the right divisional image and pixel data of copy pixels thereof.

Although specific embodiments of the present technology have been described above, the present disclosure must not be construed as being limited to the above-described embodiments; it would be apparent to a person skilled in the art that the present technology may be implemented with various modifications. It should be especially noted that, although the above-described embodiments recite that the present disclosure is applied to a driver IC driving a liquid crystal display panel in a liquid crystal display device, the present disclosure is applicable to a display panel driver driving a different display panel (such as an OLED (organic light emitting diode) display panel and a plasma display panel) in a display device.

What is claimed is:

1. A display device configured to receive pixel data corresponding to an original image and to display an enlarged image obtained by enlarging the original image, the display device comprising:
   a display panel including a first display region and a second display region;
   a first scaler circuit;
   a second scaler circuit;
   a pixel data feeding section configured to feed to the first scaler circuit first divisional image pixel data which are pixel data of a first divisional image of the original image and to feed to the second scaler circuit second divisional image pixel data which are pixel data of a second divisional image of the original image; and
   a driver section,
   wherein the first divisional image and the second divisional image are defined to be adjacent to each other in the original image,
   wherein the pixel data feeding section feeds first boundary pixel data of pixels in a portion of the second divisional image, which is adjacent to the first divisional image, to the first scaler circuit, in addition to the first divisional image pixel data,
   wherein the pixel data feeding section feeds second boundary pixel data of pixels in a portion of the first divisional image, which is adjacent to the second divisional image, to the second scaler circuit, in addition to the second divisional image pixel data,
   wherein the first scaler circuit generates a first enlarged image pixel data through performing image scaling on the first divisional image pixel data and the first boundary pixel data,
   wherein the second scaler circuit generates a second enlarged image pixel data through performing image scaling on the second divisional image pixel data and the second boundary pixel data,
   wherein the driver section drives pixels in the first display region in response to the first enlarged image pixel data and drives pixels in the second display region in response to the second enlarged image pixel data, and
   wherein pixels for which the first scaler circuit generates the first enlarged image pixel data are different than those for which the second scaler circuit generates the second enlarged image pixel data.

2. The display device according to claim 1, wherein the pixel data feeding section includes:
   a first memory section storing the first divisional image pixel data;
   a second memory section storing the second divisional image pixel data; and
   a memory access logic circuit configured to receive the first divisional image pixel data from the first memory section, to extract the first boundary pixel data from the second divisional image pixel data stored in the second memory section and to feed the first divisional image pixel data received from the first memory section and the first boundary pixel data extracted from the second divisional image pixel data, to the first scaler circuit, and wherein the memory access logic circuit is further configured to receive the second divisional image pixel data from the second memory section, to extract the second boundary pixel data from the first divisional image pixel data stored in the first memory section and to feed the second divisional image pixel data received from the second memory section and the second boundary pixel data extracted from the first divisional image pixel data, to the second scaler circuit.

3. The display device according to claim 2, wherein the memory access logic circuit includes:
a first latch section;
a first selector receiving the first divisional image pixel data from the first memory section and outputting the second boundary pixel data extracted from the first divisional image pixel data to the first latch section;
a second latch section; and
a second selector receiving the second divisional image pixel data from the second memory section and outputting the first boundary pixel data extracted from the second divisional image pixel data to the second latch section;
wherein the first latch section stores the second boundary pixel data,
wherein the second latch section stores the first boundary pixel data,
wherein the first selector receives the first boundary pixel data from the second latch section and feeds the first divisional image pixel data and the first boundary pixel data received from the second latch section to the first scaler circuit, and
wherein the second selector receives the second boundary pixel data from the first latch section and feeds the second divisional image pixel data and the second boundary pixel data received from the first latch section to the second scaler circuit.

4. The display device according to claim 1, wherein the pixel data feeding section includes:
a first memory;
a second memory;
an interface configured to externally receive the first divisional image pixel data and the second divisional image pixel data, to store into the first memory the first divisional image pixel data and the first boundary pixel data extracted from the second divisional image pixel data, and to store into the second memory the second divisional image pixel data and the second boundary pixel data extracted from the first divisional image pixel data,
wherein the first divisional image pixel data and the first boundary pixel data which are stored in the first memory are fed from the first memory to the first scaler circuit, and
wherein the second divisional image pixel data and the second boundary pixel data which are stored in the second memory are fed from the second memory to the second scaler circuit.

5. The display device according to claim 1, wherein the first enlarged image pixel data are not used to drive the pixels in the second display region, and
wherein the second enlarged image pixel data are not used to drive the pixels in the first display region.

6. A display panel driver configured to receive pixel data corresponding to an original image and to display an enlarged image obtained by enlarging the original image on a display panel including a first display region and a second display region, the display panel driver comprising:
a first scaler circuit;
a second scaler circuit;
a pixel data feeding section configured to feed to the first scaler circuit first divisional image pixel data which are pixel data of a first divisional image of the original image and to feed to the second scaler circuit second divisional image pixel data which are pixel data of a second divisional image of the original image; and
a driver section,
wherein the first divisional image and the second divisional image are defined to be adjacent to each other in the original image,
wherein the pixel data feeding section feeds first boundary pixel data of pixels in a portion of the second divisional image, which is adjacent to the first divisional image, to the first scaler circuit, in addition to the first divisional image pixel data,
wherein the pixel data feeding section feeds second boundary pixel data of pixels in a portion of the first divisional image, which is adjacent to the second divisional image, to the second scaler circuit, in addition to the second divisional image pixel data,
wherein the first scaler circuit generates a first enlarged image pixel data through performing image scaling on the first divisional image pixel data and the first boundary pixel data,
wherein the second scaler circuit generates a second enlarged image pixel data through performing image scaling on the second divisional image pixel data and the second boundary pixel data,
wherein the driver section drives pixels in the first display region in response to the first enlarged image pixel data and drives pixels in the second display region in response to the second enlarged image pixel data, and
wherein pixels for which the first scaler circuit generates the first enlarged image pixel data are different than those for which the second scaler circuit generates the second enlarged image pixel data.

7. The display panel driver according to claim 6, wherein the pixel data feeding section includes:
a first memory section storing the first divisional image pixel data;
a second memory section storing the second divisional image pixel data; and
a memory access logic circuit configured to receive the first divisional image pixel data from the first memory section, to extract the first boundary pixel data from the second divisional image pixel data stored in the second memory section and to feed the first divisional image pixel data received from the first memory section and the first boundary pixel data extracted from the second divisional image pixel data, to the first scaler circuit, and
wherein the memory access logic circuit is further configured to receive the second divisional image pixel data from the second memory section, to extract the second boundary pixel data from the first divisional image pixel data stored in the first memory section and to feed the second divisional image pixel data received from the second memory section and the second boundary pixel data extracted from the first divisional image pixel data, to the second scaler circuit.

8. The display panel driver according to claim 7, wherein the memory access logic circuit includes:
a first latch section;
a first selector receiving the first divisional image pixel data from the first memory section and outputting the second boundary pixel data extracted from the first divisional image pixel data to the first latch section;
a second latch section; and
a second selector receiving the second divisional image pixel data from the second memory section and outputting the first boundary pixel data extracted from the second divisional image pixel data to the second latch section;
wherein the first latch section stores the second boundary pixel data,
wherein the second latch section stores the first boundary pixel data,
wherein the first selector receives the first boundary pixel data from the second latch section and feeds the first divisional image pixel data and the first boundary pixel data received from the second latch section to the first scaler circuit, and
wherein the second selector receives the second boundary pixel data from the first latch section and feeds the second divisional image pixel data and the second boundary pixel data received from the first latch section to the second scaler circuit.

9. The display panel driver according to claim 6, wherein the pixel data feeding section includes:
a first memory;
a second memory;
an interface configured to externally receive the first divisional image pixel data and the second divisional image pixel data, to store into the first memory the first divisional image pixel data and the first boundary pixel data extracted from the second divisional image pixel data, and to store into the second memory the second divisional image pixel data and the second boundary pixel data extracted from the first divisional image pixel data,
wherein the first divisional image pixel data and the first boundary pixel data which are stored in the first memory are fed from the first memory to the first scaler circuit, and
wherein the second divisional image pixel data and the second boundary pixel data which are stored in the second memory are fed from the second memory to the second scaler circuit.

10. The display panel driver according to claim 6, wherein the first enlarged image pixel data are not used to drive the pixels in the second display region, and
wherein the second enlarged image pixel data are not used to drive the pixels in the first display region.

11. The display panel driver according to claim 7, wherein the first enlarged image pixel data are not used to drive the pixels in the second display region, and
wherein the second enlarged image pixel data are not used to drive the pixels in the first display region.

12. The display panel driver according to claim 8, wherein the first enlarged image pixel data are not used to drive the pixels in the second display region, and
wherein the second enlarged image pixel data are not used to drive the pixels in the first display region.

13. The display panel driver according to claim 9, wherein the first enlarged image pixel data are not used to drive the pixels in the second display region, and
wherein the second enlarged image pixel data are not used to drive the pixels in the first display region.

14. A display panel drive method for, in response to pixel data corresponding to an original image, displaying an enlarged image obtained by enlarging the original image on a display panel including a first display region and a second display region, the method comprising:
feeding to a first scaler circuit first divisional image pixel data which are pixel data of a first divisional image of the original image and first boundary pixel data of pixels in a first portion of a second divisional image of the original image, the first portion being adjacent to the first divisional image, wherein the first divisional image and the second divisional image are defined to be adjacent to each other in the original image;
feeding to a second scaler circuit second divisional image pixel data which are pixel data of the second divisional image and second boundary pixel data of pixels in a second portion of the first divisional image, the second portion being adjacent to the second divisional image;
by the first scaler circuit, generating a first enlarged image pixel data through performing image scaling on the first divisional image pixel data and the first boundary pixel data;
by the second scaler circuit, generating a second enlarged image pixel data through performing image scaling on the second divisional image pixel data and the second boundary pixel data;
driving pixels in the first display region in response to the first enlarged image pixel data; and
driving pixels in the second display region in response to the second enlarged image pixel data, wherein pixels for which the first scaler circuit generates the first enlarged image pixel data are different than those for which the second scaler circuit generates the second enlarged image pixel data.

* * * * *